US008862551B2

(12) United States Patent
Lim

(10) Patent No.: US 8,862,551 B2
(45) Date of Patent: Oct. 14, 2014

(54) DETECTING BEHAVIORAL PATTERNS AND ANOMALIES USING ACTIVITY DATA

(75) Inventor: Keng Lim, Atherton, CA (US)

(73) Assignee: NextLabs, Inc., San Mateo, CA (US)

(*) Notice: Subject to any disclaimer, the term of this patent is extended or adjusted under 35 U.S.C. 154(b) by 1831 days.

(21) Appl. No.: 11/615,657

(22) Filed: Dec. 22, 2006

(65) Prior Publication Data

US 2007/0156696 A1    Jul. 5, 2007

Related U.S. Application Data

(63) Continuation-in-part of application No. 11/383,159, filed on May 12, 2006, now Pat. No. 8,627,490, and a continuation-in-part of application No. 11/383,161, filed on May 12, 2006, now Pat. No. 8,621,549, and a continuation-in-part of application No. 11/383,164, filed on May 12, 2006.

(60) Provisional application No. 60/755,019, filed on Dec. 29, 2005, provisional application No. 60/766,036, filed on Dec. 29, 2005, provisional application No. 60/743,121, filed on Jan. 11, 2006, provisional application No. 60/821,050, filed on Aug. 1, 2006, provisional application No. 60/870,195, filed on Dec. 15, 2006.

(51) Int. Cl.
*G06F 17/30* (2006.01)
*G06F 21/62* (2013.01)

(52) U.S. Cl.
CPC .... *G06F 21/6218* (2013.01); *G06F 2221/2101* (2013.01)
USPC .......................................... 707/648; 707/758

(58) Field of Classification Search
USPC ................................................. 707/648, 758
See application file for complete search history.

(56) References Cited

U.S. PATENT DOCUMENTS 5,410,598 A * 4/1995 Shear .............................. 705/53
5,629,980 A   5/1997 Stefik et al.
(Continued)

FOREIGN PATENT DOCUMENTS

JP       1021625      1/1989
WO    2004040464     5/2004

OTHER PUBLICATIONS

Tim Moses et al. eXtensible Access Control Markup Language (XACML) Version 2.0 OASIS Standard Feb. 1, 2005 OASIS Open. (Source: http://docs.oasis-open.org/xacml/2.0/access_control-xacml-2.0-core-spec-os.pdf see also http://www.oasis-open.org/committees/tc_home.php?wg_abbrev=xacml#XACML20).

(Continued)

*Primary Examiner* — Son T Hoang
(74) *Attorney, Agent, or Firm* — Aka Chan LLP

(57) ABSTRACT

Activity data is analyzed or evaluated to detect behavioral patterns and anomalies. When a particular pattern or anomaly is detected, a system may send a notification or perform a particular task. This activity data may be collected in an information management system, which may be policy based. Notification may be by way e-mail, report, pop-up message, or system message. Some tasks to perform upon detection may include implementing a policy in the information management system, disallowing a user from connecting to the system, and restricting a user from being allowed to perform certain actions. To detect a pattern, activity data may be compared to a previously defined or generated activity profile.

38 Claims, 50 Drawing Sheets

(56) References Cited

U.S. PATENT DOCUMENTS

| | | | |
|---|---|---|---|
| 5,634,012 A | 5/1997 | Stefik et al. | |
| 5,638,443 A | 6/1997 | Stefik et al. | |
| 5,715,403 A | 2/1998 | Stefik | |
| 5,848,396 A | 12/1998 | Gerace | |
| 5,991,735 A | 11/1999 | Gerace | |
| 6,161,139 A * | 12/2000 | Win et al. | 709/225 |
| 6,236,971 B1 | 5/2001 | Stefik et al. | |
| 6,373,935 B1 | 4/2002 | Afsar et al. | |
| 6,446,092 B1 * | 9/2002 | Sutter | 1/1 |
| 6,463,470 B1 | 10/2002 | Mohaban et al. | |
| 6,480,844 B1 | 11/2002 | Cortes et al. | |
| 6,647,388 B2 | 11/2003 | Numao et al. | |
| 6,701,342 B1 | 3/2004 | Bartz et al. | |
| 6,789,202 B1 | 9/2004 | Ko et al. | |
| 6,910,135 B1 | 6/2005 | Grainger | |
| 6,915,435 B1 | 7/2005 | Merriam | |
| 6,938,021 B2 | 8/2005 | Shear et al. | |
| 7,020,667 B2 | 3/2006 | Guest et al. | |
| 7,065,556 B1 | 6/2006 | Hickey et al. | |
| 7,082,429 B2 | 7/2006 | Lin et al. | |
| 7,627,893 B2 * | 12/2009 | Corley et al. | 726/3 |
| 2003/0004734 A1 | 1/2003 | Adler et al. | |
| 2003/0014418 A1 | 1/2003 | Adler et al. | |
| 2003/0014654 A1 | 1/2003 | Adler et al. | |
| 2003/0115344 A1 | 6/2003 | Tang et al. | |
| 2003/0195959 A1 | 10/2003 | Labadie et al. | |
| 2003/0204438 A1 | 10/2003 | Connelly et al. | |
| 2003/0208754 A1 | 11/2003 | Sridhar et al. | |
| 2004/0024767 A1 | 2/2004 | Chen | |
| 2004/0111643 A1 * | 6/2004 | Farmer | 713/201 |
| 2004/0143661 A1 * | 7/2004 | Higashi et al. | 709/224 |
| 2004/0254988 A1 | 12/2004 | Rodriguez | |
| 2004/0268314 A1 | 12/2004 | Kollman et al. | |
| 2005/0027583 A1 | 2/2005 | Smit et al. | |
| 2005/0044406 A1 | 2/2005 | Stute | |
| 2005/0071642 A1 | 3/2005 | Moghe et al. | |
| 2005/0071643 A1 | 3/2005 | Moghe | |
| 2005/0071644 A1 | 3/2005 | Moghe et al. | |
| 2005/0091524 A1 | 4/2005 | Abe et al. | |
| 2005/0102515 A1 * | 5/2005 | Jaworski et al. | 713/168 |
| 2005/0108568 A1 | 5/2005 | Bussiere et al. | |
| 2005/0138642 A1 | 6/2005 | Breh et al. | |
| 2005/0154900 A1 * | 7/2005 | Muttik | 713/188 |
| 2005/0160280 A1 | 7/2005 | Caslin et al. | |
| 2005/0182712 A1 | 8/2005 | Angell | |
| 2005/0185779 A1 | 8/2005 | Toms | |
| 2005/0222928 A1 | 10/2005 | Steier et al. | |
| 2005/0222929 A1 | 10/2005 | Steier et al. | |
| 2005/0243984 A1 | 11/2005 | Mahone et al. | |
| 2005/0249341 A1 | 11/2005 | Mahone et al. | |
| 2005/0249384 A1 | 11/2005 | Fouquet et al. | |
| 2005/0268113 A1 | 12/2005 | Mahone et al. | |
| 2006/0075469 A1 * | 4/2006 | Vayman | 726/2 |
| 2006/0075492 A1 * | 4/2006 | Golan et al. | 726/22 |
| 2006/0130071 A1 | 6/2006 | Martin et al. | |
| 2006/0190592 A1 | 8/2006 | Fujita et al. | |
| 2006/0233313 A1 | 10/2006 | Adams, Jr. et al. | |
| 2007/0028117 A1 * | 2/2007 | Wong | 713/182 |
| 2007/0226204 A1 * | 9/2007 | Feldman | 707/5 |

OTHER PUBLICATIONS

Scott Cantor et al. Assertions and Protocols for the OASIS Security Assertion Markup Language (SAML) V2.0 OASIS Standard Mar. 15, 2005 OASIS Open. (Source: http://docs.oasis-open.org/security/saml/v2.0/saml-core-2.0-os.pdf; see also http://www.oasis-open.org/committees/tc_home.php?wg_abbrev=security).

Kelvin Lawrence et al. Web Services Security: SOAP Message Security 1.1 (WS-Security 2004) OASIS Standard Specification Feb. 1, 2006 OASIS Open. (Source: http://www.oasis-open.org/committees/download.php/16790/wss-v1.1-spec-os-SOAPMessageSecurity.pdf; see also http://www.oasis-open.org/committees/tc_home.php?wg_bbrev=wss).

Kelvin Lawrence et al. Web Services Security Rights Expression Language (REL) Token Profile 1.1 Oasis Standard Feb. 1, 2006 OASIS Open. (Source: http://www.oasis-open.org/committees/download.php/16687/oasis-wss-rel-token-profile-1.1.pdf; see also http://www.oasis-open.org/committees/tc_home.php?wg_abbrev=wss).

Technical Standard: Systems Management: Application Response Measurement (ARM) API Jul. 1998 The Open Group. (Source: http://www.opengroup.org/tech/management/arm/uploads/40/2459/ARM3Final.pdf; see also http://www.opengroup.org/tech/management/arm).

Mark W. Johnson Monitoring and Diagnosing Applications with ARM 4.0 Dec. 15, 2004 IBM Corporation. (Source: http://www.opengroup.org/tech/management/arm/uploads/40/63571ARM_4.0_paper.pdf; see also http://www.opengroup.org/tech/management/arm).

Paul Ashley Satoshi Hada Günter Karjoth Calvin Powers Matthias Schunter Enterprise Privacy Authorization Language (EPAL 1.1) Oct. 1, 2003 IBM Research mts at zurich.ibm.com. (Source: http://www.zurich.ibm.com/security/enterprise-privacy/epal/Specification/).

Paul Ashley Satoshi Hada Günter Karjoth Calvin Powers Matthias Schunter The Enterprise Privacy Authorization Language (EPAL)—How to Enforce Privacy throughout an Enterprise, 2003, IBM Research mts@zurich.ibm.com. (Source: http://www.w3.org/2003/p3p-ws/pp/ibm3.html).

Prateek Mishra et al. Security Services Markup Language Draft Version 0.8a Jan. 8, 2001 OASIS Open. (Source: http://www.oasis-open.org/committees/security/docs/draft-s2ml-v08a.pdf; see also ).

Portable Document Rights Language (PDRL) Specification Version 7.2 Jul. 2006 Adobe Systems Incorporated. (Source: http://www.adobe.com/devnet/livecycle/policyserver/articles/pdrl.pdf; see also http://www.adobe.com/devnet/livecycle/security.html).

John S. Erickson OpenDRM: A Standards Framework for Digital Rights Expression Messaging and Enforcement Revised Sep. 2002 Hewlett-Packard Laboratories. (Source: http://xml.coverpages.org/EricksonOpenDRM20020902.pdf).

Renato Iannella Karen Henricksen and Ricky Robinson A Policy Oriented Architecture for the Web: New Infrastructure and New Opportunities Oct. 2006 W3C Workshop on Languages for Privacy Policy Negotiation and Semantics-Driven Enforcement (Source: http://www.w3.org/2006/07/privacy-ws/presentations/05-iannella-policy-oriented-architecture.pdf).

* cited by examiner

A Policy Enforcer that Supports Multiple Policy Enforcement Points

A Policy Enforcer that Supports Policy Enforcement Point Plug-in Architecture

I&CA – Interceptor and Consequence Applicator

I&CA–Interceptor and Consequence Applicator

DETECTING BEHAVIORAL PATTERNS AND ANOMALIES USING ACTIVITY DATA

CROSS-REFERENCE TO RELATED APPLICATIONS

This application claims the benefit of U.S. provisional patent application 60/755,019 and 60/776,036, filed Dec. 29, 2005; 60/743,121, filed Jan. 11, 2006; 60/821,050, filed Aug. 1, 2006; and 60/870,195, filed Dec. 15, 2006. This application is also a continuation in part of U.S. patent application Ser. Nos. 11/383,159, 11/383,161, and 11/383,164, filed May 12, 2006. These applications are incorporated by reference along with all other references cited in this application.

A portion of the disclosure of this patent document contains material which is subject to copyright protection. The copyright owner has no objection to the facsimile reproduction by any one of the patent document or the patent disclosure, as it appears in the U.S. Patent and Trademark Office patent file or records, but otherwise reserves all copyright rights whatsoever.

BACKGROUND OF THE INVENTION

The present invention relates to field of information and document management, and more specifically, a policy language system for managing information.

Networked computer systems have evolved over the years from simple serially connected computer systems to massively networked computer systems connected via large internal networks, intranets, and the Internet. During this evolution, many different concepts were developed to manage how users are granted access to electronic information stored in the computer systems. How a computer system determines if a user or an application has permission to access information (such as a file) has been a complex problem to solve.

Some operating systems use a simple approach to determining whether a user has permission to access a file. For example the Unix® operating system gives the system administrator or file owner the ability to attach access permissions to directories and files. Unix is a trademark of the Open Group. There are three types of access permissions that the system administrator or file owner can select from. The permissions are: read, write, and execute. These permissions can then be limited to three types of users: the owner of the file, the group that the owner belongs to, and other users. Each permission and user type has two states: allowed or denied.

Whenever a user accesses a file, the Unix operating system first checks the permissions set for a file against the user's type. The operating system checks if the user falls into any of the three user types. If the user is a member of any of the user types and the user type has been specified as allowed, then the operating system checks which of the permissions are set as allowed. The user is then allowed to perform any access that falls under an allowed permission.

This approach does not offer much flexibility to the system administrator. The system administrator cannot specify particular users other than the owner or particular groups. The permissions are limited to directories and files within the file system and do not cover nonfile system objects such as e-mails and Web pages. Further, the operating system checks permissions for file accesses based only on user and it does not restrict file accesses based on application programs.

A more advanced approach that is commonly used is called access control lists (ACL). An access control list uses a language that allows the system administrator or file owner to set read, write, and execute permissions for specific users and groups of users for accesses to files. In some approaches, each set of access control lists for a particular directory resides in a file stored in that directory. The access control lists apply to files that are contained within that directory.

When a user attempts to access a file in a directory, the operating system loads the access control list file and reads the access control list rules that were created by the system administrator or user. The operating system determines if the user is allowed to access the file by parsing the access control list rule. In other approaches, a set of access control lists associated with a file is stored as one or more extended file system attributes of the file. In another implementation, access control and auditing access control lists are stored in a security descriptor associated with a file or a directory.

There are many drawbacks to the access control list approach. The access control list approach applies only to files within a file system and does not apply to nonfile system objects such as e-mails and Web pages. The access control list support is built into the operating system kernel and cannot be extended.

The access control list approach is not very portable because it is file system specific and is therefore not universal which means that not all file systems support the same access control list and not all operating systems have the same interpretation of an access control list. When a file is copied from one file system to another (or from one operating system to another), some of the control information may be lost due to compatibility issues. Further, an access control list is difficult to apply to users outside of a company's file system (e.g., a customer). Finally, as with the operating system example above, an access control list is capable of controlling file accesses by a user but is not capable of controlling file accesses by a particular application program or at a particular time or location.

Applications such as document management systems require a user to check a document in and out of a library system. Once the document has been checked out, it can be distributed and modified in any manner. This means that there is no control over how a document is used once the document leaves the document management system.

An information management system should control access by users or applications, or a combination of these to information of the system. The information being controlled should include not only files and document, but also e-mails, access to Web sites, access to applications, instant messenger messages, databases, and much more. The information management system should have a flexible rule or policy language that allows for implementing simple or relatively complex controls on many aspects to the information. The information management system should also be capable of being used to secure the information to ensure confidentiality, to implement ethical walls, and more.

Therefore, there is a need for improved techniques and systems for managing information of a network, where this information includes documents and e-mail.

BRIEF SUMMARY OF THE INVENTION

Activity data is analyzed or evaluated to detect behavioral patterns and anomalies. When a particular pattern or anomaly is detected, a system may send a notification or perform a particular task. This activity data may be collected in an information management system, which may be policy based. Notification may be by way e-mail, report, pop-up message, or system message. Some tasks to perform upon detection may include implementing a policy in the information management system, disallowing a user from connecting to the system, and restricting a user from being allowed to perform certain actions. To detect a pattern, activity data may be compared to a previously defined or generated activity profile.

An example of a behavioral pattern that may be detected by the system includes a frequency at which a user attempts to access information. A formula that may be used is when an entity has attempted to access information more than X times in a Y time period. Values for X and Y may be selected by the administrator user. So, for example, if a person or device attempts to access or accesses a file more than one time every six seconds, this may be potentially flagged as something to investigate further.

Another example of a behavioral pattern that may be detected by the system includes when a user or username has accessed a system from different locations within a short time period. There is a potential another person has compromised another user's sign in information. A formula that may be used is when a username has connected to the system from a first location X at a first time T1 and the username has connected to the system from a second location Y at second time T2, and a distance between X and Y divided by (T2−T1) is greater than Z.

The value of T2−T1 may be arranged (T1−T2 or T2−T1, as appropriate) so the result is positive or an absolute value (i.e., |T2−T1|) may be used. The term Z is a value that may be selected by an administrator user of the system. And by selecting an appropriate value of Z, potential security breaches of the system may be detected. For example, if a value of Z is selected so the user must travel more than 700 miles per hour to log in at two locations, then there may be a potential problem.

In an implementation, the invention is a method of managing information of a system including providing a number of information management rules, providing an activity database, gathering activity data from a first target in the activity database, and gathering activity data from a second target in the activity database. The activity database may store historical data. The method further includes associating at least a first rule of the information management rules to the first target, evaluating the data stored in the activity database according to a detection algorithm, and based on the detection algorithm, associating a second rule to the first target. For the first target, usage of information will be controlled based on the at least first rule of information management rules and the second rule.

In an implementation, the invention is a method of operating a system including providing a number of devices, providing an activity database, and collecting information usage data from the devices in the activity database. The method includes analyzing the information usage data in the activity database to detect a condition and, when the condition is detected, generating a notification of the condition. Alternatively, the invention may collect and analyze external event data from outside the system.

In an implementation, the invention is a method of an information management system including providing a number of devices, providing an activity database, providing a first activity profile, collecting information usage data from the number of devices and storing in the activity database, and analyzing the information usage data in the activity database to generate a second activity profile. The method further includes comparing the second activity profile with first activity profile to determine a set of differences; using the set of differences, detecting whether a condition has occurred; and when the condition has occurred, generating a notification of the condition.

The condition may occur when (X−Y) is greater than a threshold value Z, where X is a value in the first activity profile and Y is a value in the second activity profile. The condition may occur when (X−Y) is greater than a threshold value Z, where X is a value derived from the first activity profile and Y is a value derived from the second activity profile. In a specific embodiment, the condition will not occur when the difference is zero.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
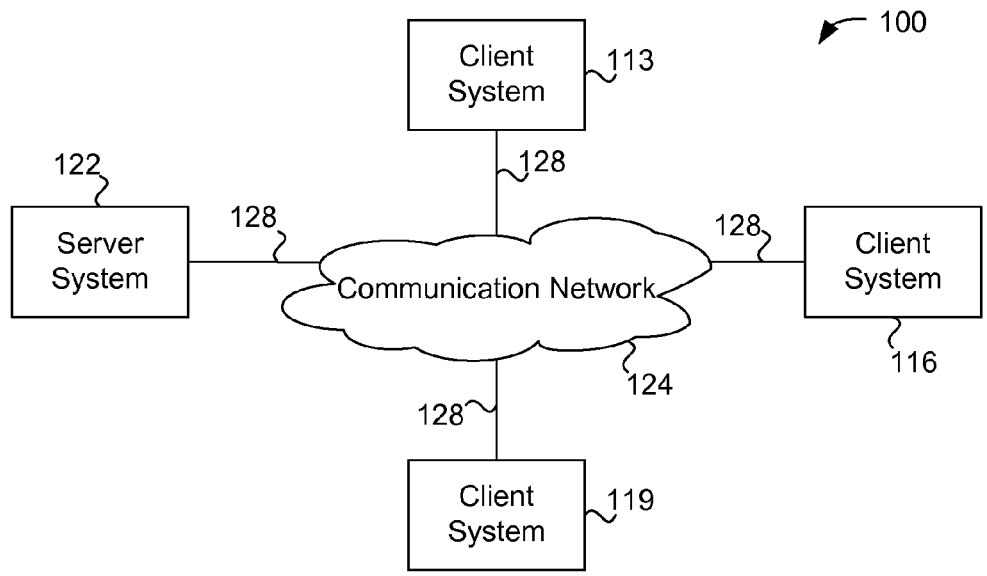
FIG. 1 shows a diagram of distributed computing network connecting a server and clients.

FIG. 1 is a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser by Microsoft Corporation, the Firefox® browser by Mozilla Foundation, and others.

Figure 2:
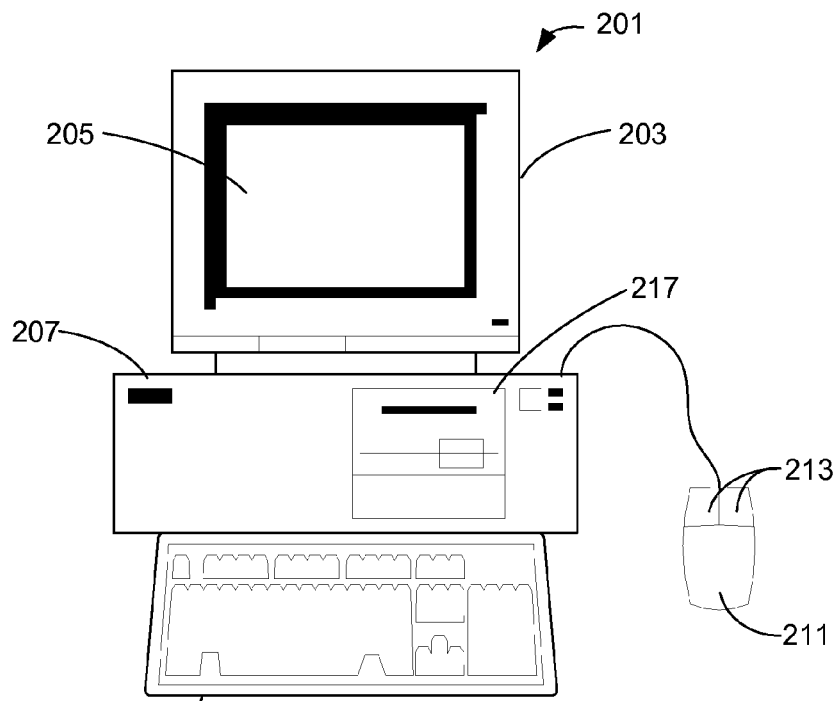
FIG. 2 shows a more detailed diagram of a computer system which may be a client or server.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, USB removable storage, magnetic disks, fixed disks, hard disks, hard drives including both magnetic and flash storage in a single drive unit, CD-ROMs, recordable CDs, DVDs, DVD-R, DVD-RW, HD-DVD, Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
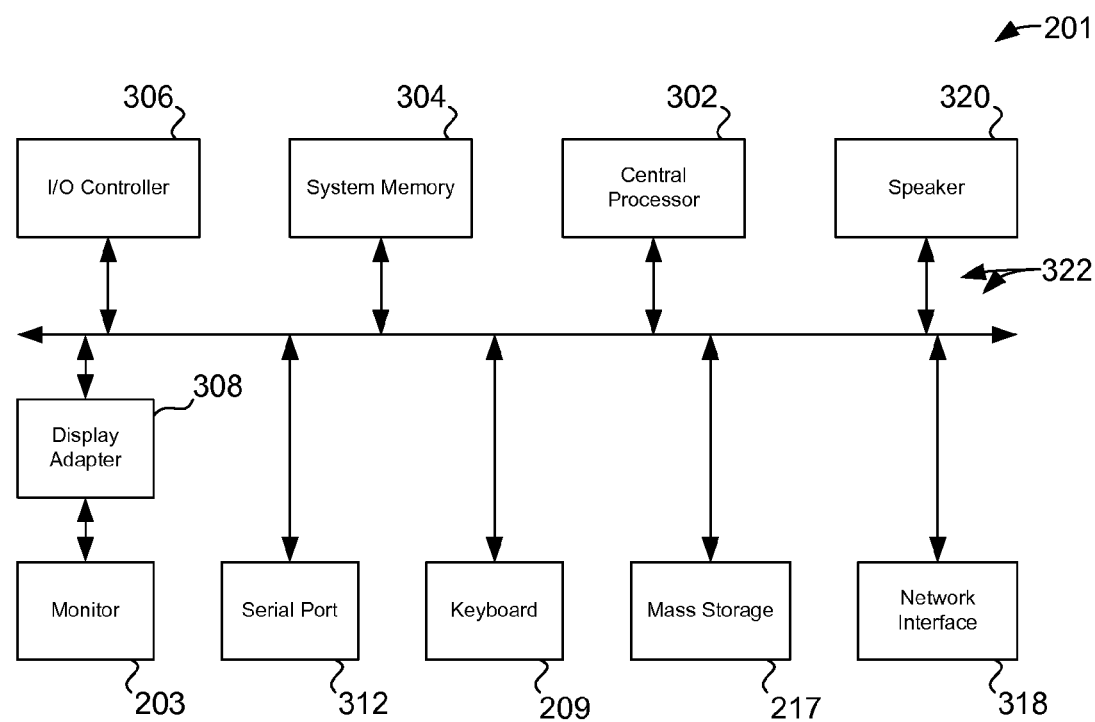
FIG. 3 shows a system block diagram of a computer system.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core 2 Duo, Intel Pentium® D, AMD Athlon™ 64×2 Dual-Core, or Microsoft Xbox 360 central processing unit (CPU).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). An operating system for the system may be one of the Microsoft Windows® family of operating systems (e.g., Windows 95, 98, Me, Windows NT, Windows 2000, Windows XP, Windows Vista, Windows CE, Windows Mobile), Linux, UNIX, Sun OS, Ubuntu, or Macintosh OS X. Other operating systems may be used. Microsoft Windows is a trademark of Microsoft Corporation.

Figure 4:
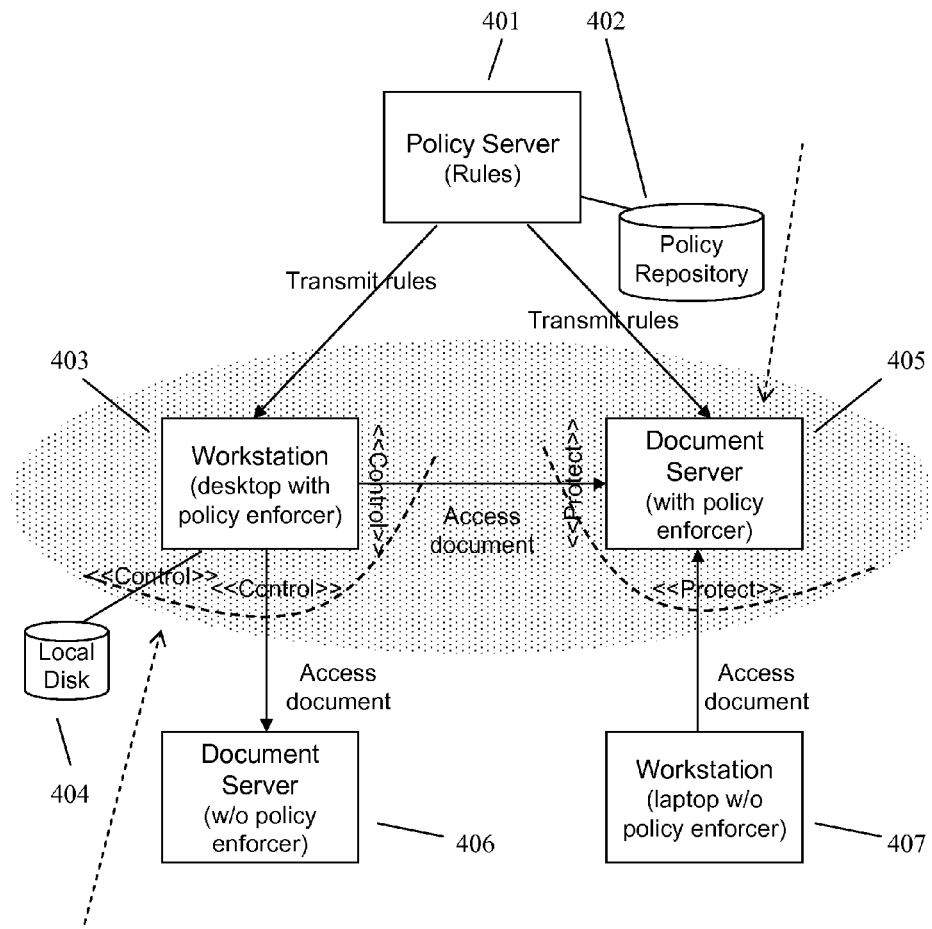
FIG. 4 shows a block diagram of a policy server that centrally manages policies that are used by workstations and servers according to a specific implementation of the invention.

FIG. 4 shows an overall architecture of an information management system of the invention. An embodiment of the invention centrally manages policies or rules pertaining to the controlling of access to and usage of information including documents. Documents can be file system or nonfile system objects. For example, a file system object may be an Excel spreadsheet. A nonfile system object may be an e-mail message or data delivered to an SAP Frontend client application (e.g., information about an employee) by an SAP human resource module running on a server. Some examples of disk file systems include FAT, NTFS, HFS, ext2, ext3, ISO 9660, ODS-5, and UDF.

A document may encompass objects such as a file, an e-mail message, a Web page, an on-line report, an on-line form, a discussion thread, a result set generated by a database query, an on-line form, a bitmap, a file system object, a data object managed by a document management system, a data object managed by a content management server, a data object in a product lifecycle management system, a source code file or a code fragment managed by a source code management system, a data object managed by a configuration management system, a data object managed by a project management system, a data object in an enterprise resource planning system, a data object in a customer relationship management system, a data object managed or served, or both, by a portal server, a data object served by a Web server, a data object managed or served by any application server, or any unit of information content stored using volatile or nonvolatile memory.

The policies allow policy enforcers (which may be called agents in specific embodiments) to make decisions on whether to allow or deny access to a particular information, execute a particular application function, or operate on a particular application data object or fragment. The policy enforcers are able to perform information access control for operations resulted from user action through an application program and execution of application program logic.

Referring to FIG. 4, policies are created and managed by a policy server 401. As discussed below, a policy may define to whom and under what conditions (or conditions) access to a document is granted or denied. The policies are stored and manipulated by the policy author and policy administrator in the policy repository 402. Policies or subsets of policies, or both, are transmitted to workstations 403 and document servers 405 to control local and remote document accesses and information usage.

Some examples of a workstation include a desktop computer, laptop computer, personal digital assistant (PDA), smart phone, thin client (e.g., HP Consolidated Client Infrastructure client or Wyse terminal), an instance of client operating environment running on a terminal server (e.g., Microsoft Windows 2003 Terminal Services and Citrix MetaFrame), a guest operating system running on a virtual machine (e.g., VMWare Workstation and Microsoft Virtual Server 2005), a server making document access or information usage request (i.e., acting as a client in the context of the request), Internet kiosk, and information kiosk. A workstation may be any computing device and computing environment from which document access or information usage request is originated.

Some examples of a document server include a file server, network attached storage (NAS), virtual NAS device (e.g., a NAS switch device such as Acopia Adaptive Resource Switch, NeoPath File Director, or Rainfinity RainStorage), edge file gateway (e.g., a wide area file service (WAFS) device such as Cisco File Engine series appliances or Tacit IShared products or Riverbed Steelhead appliances), Web server, e-mail server, document management system, content management server, portal server, or database server. A document server may be other document repository.

A policy enforcer can be installed on a workstation 403 to provide document access and information usage control at a point-of-use. The policies can be stored locally on the workstation. Objectives of implementing point-of-use control include preventing unauthorized access to documents anywhere on the network and preventing unauthorized information usage and operation on application data or usage of application functions. One may think of an aspect of point-of-use access control as building a firewall around a user.

Some details on policy enforcement are described in U.S. provisional application 60/755,019, filed Dec. 29, 2005. More details on policy enforcement are described in the U.S. patent application Ser. Nos. 11/383,159, 11/383,161, and 11/383,164, filed May 12, 2006. These applications are incorporated by reference along with all other references cited in this application.

Similarly, a policy enforcer can be installed on a document server 405 (e.g., file server and e-mail server) to provide protection to the documents on (accessible by or managed by) the document server. Information may reside on different places of the network. For example, documents or information may reside on disk arrays in a separate server enclosure that is physically separate from a document server. In particular, direct attached storage (DAS) has multiple disk arrays and storage area network (SAN) has file server volumes that are virtualized. An objective of implementing server-based protection is to prevent unauthorized access to documents in a particular repository (or on a server) from any computer on a network. In other words, one may think of this aspect of the invention as building a firewall around a server. Besides, an application server policy enforcer such as Microsoft Exchange policy enforcer can also control usage of application data and application functions (e.g., copying an e-mail message, deleting a contact and modifying a calendar entry).

The control and protection functions can be achieved either through one policy or multiple policies defined centrally. The policy server 401 is an intelligent system that has the ability to decide if a single or multiple policies or subset of policies are applicable to each policy enforcer. At least a subset of all policies defined is distributed to each policy enforcer.

Controlling document access can have different meanings when operating on different document types. For example, if a document type is a file, then document accesses are file accesses that includes: opening/reading a file, reading a file when connected using VPN, opening a file at a particular time of a day, writing/saving a file, deleting a file, reading a file's permission (or security setting), changing a file's permission, reading a file's attribute, or changing a file's attribute. Another example is when a document type is an e-mail message on a mail server then document access refers to application program internal operations that can include: opening an e-mail, deleting an e-mail, reading an e-mail's attribute, or changing an e-mail's attribute.

Controlling information usage can have different meanings when applied to different applications. For example, if an application is word processing software, then information usage includes creating a file, opening a file, saving a file, saving a document as a different file, exporting or converting a file to a different format, printing a file, sending a file to a recipient via e-mail, publishing a file in a shared folder, cutting data to clipboard, pasting data from clipboard, performing drag-and-drop operation, adding macro or script to a document, or modifying macro or script in a document. In another example where an application is mail client software, information usage includes creating an e-mail, opening an e-mail, copying an e-mail, moving an e-mail, archiving an e-mail, saving an e-mail into a file, deleting an e-mail, sending an e-mail, forward an e-mail, attaching a file to an e-mail, cutting data to clipboard, pasting data from clipboard, performing drag-and-drop operation, or changing e-mail attributes.

In yet another example, if an application is an enterprise resource planning (ERP) application, information usage includes: creating a quote, converting a quote to an order, viewing customer information, viewing an order, viewing product pricing and discounts, viewing sales data, viewing reports, or viewing employee information.

To control document access and information usage, a policy enforcer may control user interface elements such as visual and input elements of an application program, commands and functionalities of an application program, and information presented to a user. For example, a visual element of an application program includes any of: a menu, a menu item, a button, a list box, a list item, a check box, a tab, a scroll bar, a slider, an icon, an image or a hypertext link. An input element of an application program includes any of: a key event handler, a mouse event handler, or any event handler associated with a visual element.

An application program may support a large number of commands. A command can be invoked by selecting a menu item, pressing a button (shown on a screen), pressing one or more keys, or pressing one or more mouse buttons. A command can also be invoked by a macro or script, or invoked by a code module that calls a function (or method) in an application program interface (API) library. For example, a command can perform a task such as opening a file, sending an e-mail message, editing a cell in a spreadsheet, editing a macro, changing text format, or more.

A function of an application program generally maps to a function or method in a high level programming language. For example, a function in an application program may correspond to a command such as saving a file, sending an e-mail message, or editing a cell formula in a spreadsheet. A function may also represent an internal application program operation such as a call to operating system library function fopen( ).

If information to be displayed contains personal information such as a social security number, personal identification number (PIN) or account balance, then controlling information usage includes: filtering out or obscuring the personal information.

If information to be displayed contains actionable data or objects such as a button, a hypertext link, or a clickable image, then controlling information usage includes: disabling the button, removing the hypertext link, or removing the link associated with the image.

In addition to providing control or protection, a policy enforcer can also perform obligation and remediation operations (described further below) as a result of a document access or information usage attempt (whether successful or not) as dictated by an active policy or policies. Obligation refers to tasks related to an action that a policy engine is currently processing and that the policy engine is obliged to complete such tasks. Remediation refers to tasks not directly related to an action that a policy engine is currently processing and that the policy engine ought to carry out.

Different levels of control and protection are achieved by distributing policy enforcers to workstations or document servers, or both. For example, by using workstation policy enforcers only, such as on workstation 403, one can achieve document access and information usage control that covers access to documents on local disks 404 (i.e., local files), access to documents on a protected document server 405 (i.e., protected by document server policy enforcer), and access to documents on an unprotected document server 406.

In an implementation where only document server policy enforcers are used, such as document server 405, one can achieve document access protection and information usage control for documents on protected servers. The documents are accessed from workstations with a workstation policy enforcer installed 403 and workstations without a workstation policy enforcer installed 407.

When both workstation policy enforcers and document server policy enforcers are installed, the combined benefit of both installations as described above will be obtained.

The policy server 401 allows policies to be centrally managed and automatically distributed and updated to policy enforcers. In a specific embodiment, policies are not tied to (or stored with) documents. The policies are evaluated when an action is taken by a user (or an application) to access a document. The action is intercepted and relevant policies are applied before the action is allowed to be carried out.

There are reaction policies and maintenance policies. A reaction policy is a policy which is triggered by an action such as a user opening a file or sending an e-mail. A maintenance policy is a policy which is triggered by a scheduler, such as a program that causes the maintenance policy to execute at a certain time, such as daily, weekly, or monthly, upon another nonaction event, or triggered by (or invoked by) a reaction policy. Implementations of the invention may include reaction policies or maintenance policies, or both.

The policies that a policy enforcer can handle may be defined based on the type of action, user, user group, user attribute (e.g., department, role, project or status (e.g., full-time, part-time, or consultant), user's business function), e-mail address, mailing list, host, group of computers (e.g., finance department computers), type of computer (e.g., laptop and smart phone), application program (e.g., Word, Excel, PowerPoint, FrontPage, Access, Visio, Outlook, or Internet Explorer), type of application program (e.g., word processor, spreadsheet, database, or browser), application module (e.g., SAP CRM module or Oracle Finance accounting module), location (e.g., New York office versus London office), connectivity (including access mechanism and bandwidth; e.g., LAN, WLAN, VPN, Bluetooth, Internet, DSL, ISDN, dialup, remote desktop protocol (RDP), virtual network computing (VNC) protocol, latency, secure point-to-point, 56k, broadband, 100 megabit per second, and 1 gigabit per second), time of day, day of the week, file path, file name, document size, document timestamp, document owner, document properties, document type (e.g., file or e-mail), document format (e.g., XLS, PDF, or HTML format), document identifier, document classification (e.g., confidential document or financial report), document characteristics (e.g., contains a watermark), document content (e.g., contains social security number), database query, database query result set, database query result set properties, metadata, and more. Not all of these parameters are required. A policy enforcer can interpret any one or combination of these parameters.

Figure 5:
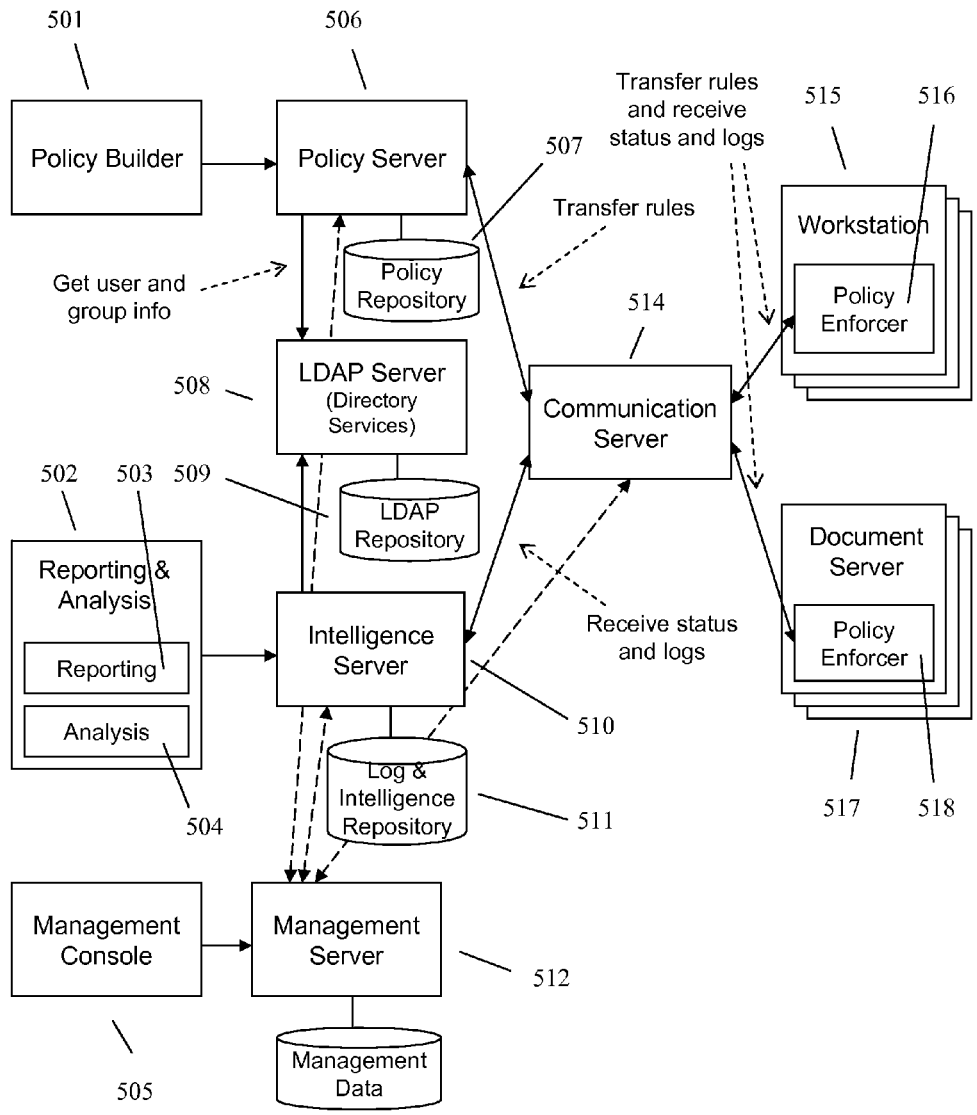
FIG. 5 shows a block diagram of a number of workstations and document servers with policy enforcers installed and coexist within a system according to a specific implementation of the invention.

Referring to FIG. 5, a more complex embodiment is shown where both a number of workstations 515 and document servers 517 have policy enforcers 516 and 518 installed and coexist within the system. The interaction between a policy builder 501, policy server 506, and policy repository 507 will be described further below.

A reporting and analysis module 502 acts as a user interface to an intelligence server 510 for displaying reports and results from data analysis functions. A reporting module 503 allows policy author and policy administrator to query and view document access activity, information usage activity and policy enforcement activity. An analysis tool 504 interacts with the intelligence server 510 to perform data analysis which includes trend analysis, resource utilization analysis, workforce productivity analysis, analyze effectiveness of policies, event correlation, anomaly detection, signature (or pattern) detection, threshold violation detection, detect information misuse, or fraud detection. Policy author and policy administrator can use the capabilities offered by the reporting and analysis module 502 to analyze effectiveness of a policy, analyze document access and information usage activity on a document or on a server, analyze policy enforcement activity, investigate cases of potential information misuse, detect information fraud, identify potential workforce productivity improvement, optimize resource utilization, or forecast resource requirement. Intelligence server 510 provides functions including (i) log services, (ii) integrate with external data sources, and (iii) data analysis.

A log and intelligence repository 511 is used by intelligence server 510 to store log data coming from policy enforcers 516 and 518, data from external sources that support event correlation and data analysis, and data generated by data analysis services. Log and intelligence repository 511 is normally implemented as one or more relational databases or sets of log files.

A lightweight directory access protocol (LDAP) server 508 and LDAP repository 509 provide user, user group, and host information to the policy server to assist in composing policy and assembling policy subsets and provide information to intelligence server to support report generation and data analysis. Note that LDAP servers are typically deployed in organizations to provide authentication service and are not critical for the operation of the embodiment.

A management server 512 is responsible for system configuration (not policy configuration), system health monitoring, and system control. It provides centralized management of all the components in the system. The management server provides a single location to view system status, modify system configurations, and manage policy author and policy administrator user accounts. A management console 505 is a user interface for system management via the management server.

The management server provides services such as monitoring other system components including policy servers, intelligence servers, communication servers and policy enforcers; displaying the status of each component; registering new policy enforcers and maintaining a registry of all policy enforcers; managing the configuration for all servers; and managing configuration profiles for policy enforcers.

A communication server 514 is responsible for directing traffic among the policy server, intelligence server, management server, and policy enforcers. The communication server brokers communications between policy enforcers and other servers, including distribution of configuration profiles, policy deployments, and the transfer of log data to the intelligence server. The communication server provides a scalable communication service such that the system can support a large number of workstations and document servers.

Figure 6:
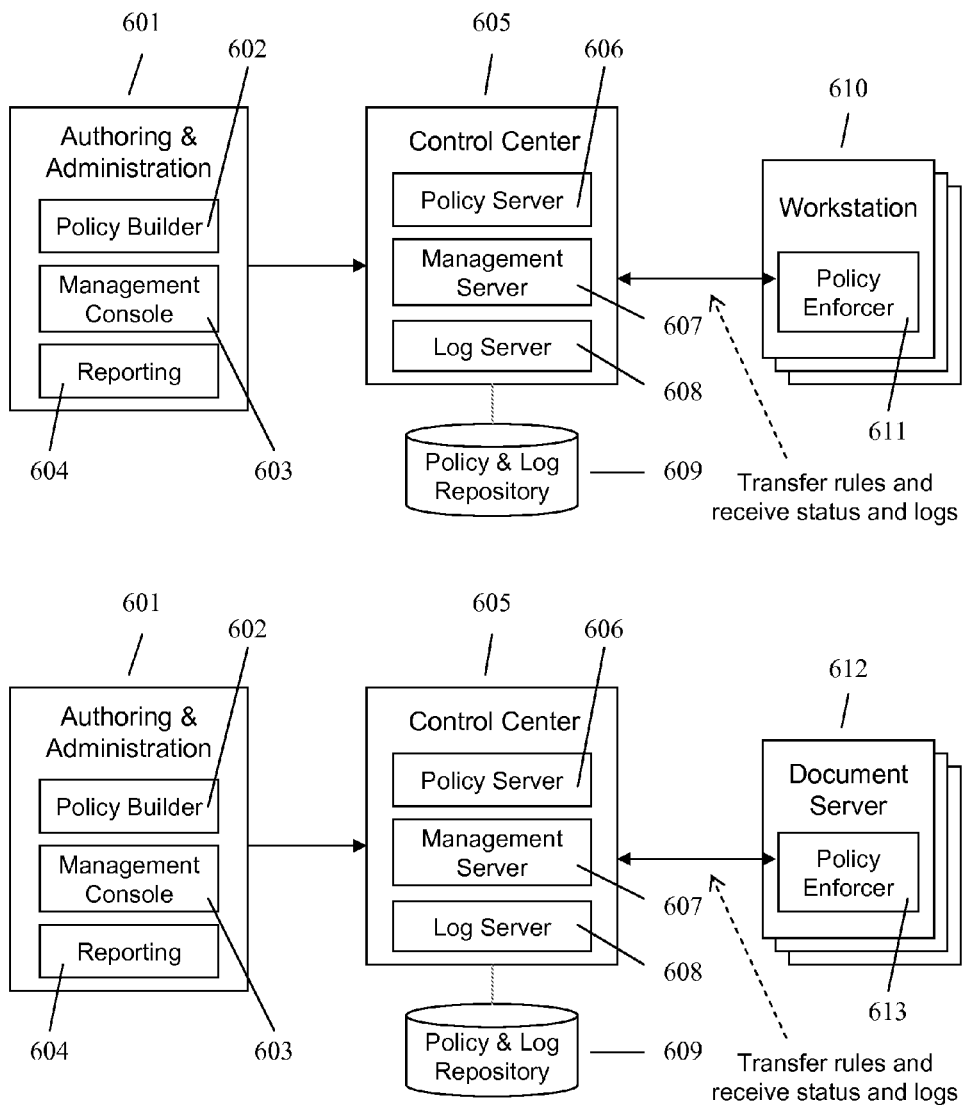
FIG. 6 shows a block diagram of minimal embodiments that utilize a number of workstations each with policy enforcers installed or a number of document servers each with policy enforcers installed according to a specific implementation of the invention.

Referring to FIG. 6, minimal embodiments are shown that utilize a number of workstations 610, each with policy enforcers 611 installed, or a number of document servers 612, each with policy enforcers 613 installed. An authoring and administration module 601 is a client application running on a workstation. It provides the user interface to create, test, publish, modify, delete, or deploy policies, or any combination of these, manage system configuration, monitor system health and view document access activity, information usage activity and policy enforcement activity. The authoring and administration module 601 is connected to a control center 605. The control center is responsible for policy life cycle management, system management, and log data management, and maintains a central policy and log repository 609.

A policy builder 602 acts as an interface to the policy server 606 and makes it simpler for policy author and policy administrator to create, test, publish, and deploy policy rule statements. The main tasks that can be performed with policy builder 602 are policy authoring and policy administration. Policy authoring functions include creating policy, modifying policy, testing policy, publishing policy (making new policy available for deployment and policy modifications available for redeployment) and retiring policy. Policy administration functions include maintaining policy related configurations and deploying policies to policy enforcers.

A management console 603 acts as an interface to management server 607 and is a user interface for managing system configuration and health of the system.

A policy server 606 transfers policies to the policy enforcers 611 and 613. The policy server 606 determines what policies are to be delivered to the policy enforcers and when policies are to be updated on the policy enforcers. The policy enforcers report status logs such as what documents were accessed or application program functions were used, and by whom (described below) and what enforcement actions have been taken to the log server 608.

In a specific implementation, a policy server deploys policies to devices that make policy decisions. These devices typically have one or more policy engines. A policy engine may be a component of a policy enforcer, policy decision server, or policy simulator.

A reporting module 604 is a user interface element that interacts with the log server to provide report generation and data analysis functions. Policy author and policy administrator can use the reporting module to view document access activity, information usage activity and policy enforcement activity and investigate cases of potential information misuse, understand the effectiveness of a policy, detect information fraud, identify potential workforce productivity improvement, optimize resource utilization, or forecast resource requirement.

Figure 7:
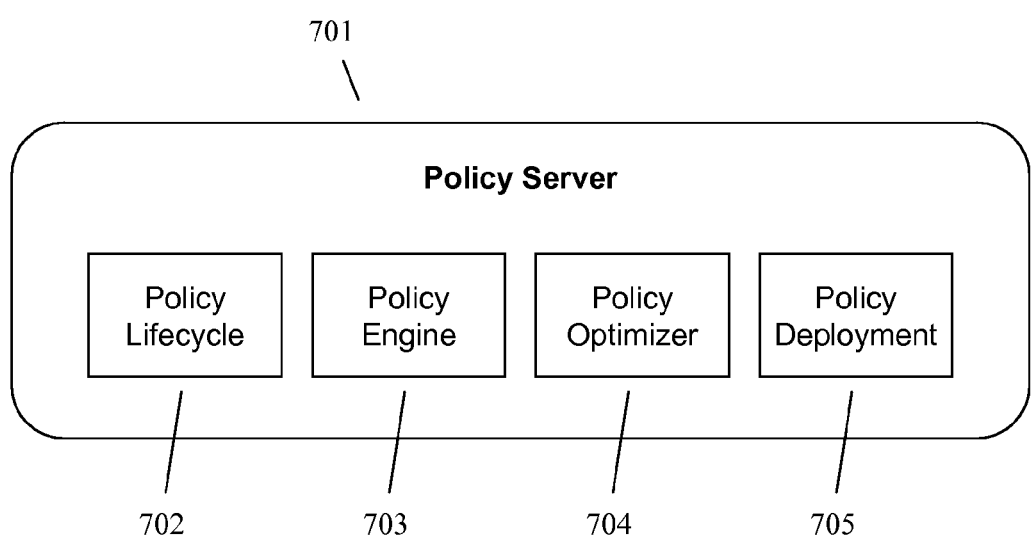
FIG. 7 shows a block diagram of internal components of a policy server according to a specific implementation of the invention.

Referring to FIG. 7, the internal components of the policy server 701 are shown. The policy server is responsible for policy management, including policy authoring, lifecycle, and deployment. The policy server maintains a policy repository, 402 and 507, for storing policies. A system typically has at least one policy server and can contain multiple policy servers in order to support a large number of policy builders 501 and policy enforcers 516 and 518. The policy server provides the following functions: policy authoring, policy access control, policy lifecycle management, policy management and policy deployment.

Policy authors and policy administrators access the policy server through the policy builder application 501 which provides in a specific implementation, a graphical user interface to author policies and manage the policy lifecycle from creation through retirement. Authored policies are stored in a central policy repository.

A policy lifecycle module 702 provides policy lifecycle support that covers policy development, deployment, and management. For example, policy development uses information about users, user groups, roles of users, user's business functions, recipients, actions, hosts, applications and document resources being supported to compose or update a policy. An environment is also provided to support editing (composition), staging (testing), and deployment of policies.

A policy engine 703 (or policy decision point) is responsible for policy evaluation (or execution). It helps validate a policy and it is part of the staging environment. Additionally, the policy engine can be setup to support proxy policy evaluation. A proxy policy evaluation request may be generated by a policy enforcer under two situations:

(1) A workstation policy enforcer 516 (or document server policy enforcer 518) does not have a policy engine. A policy engine proxy in the policy enforcer relays policy evaluation requests from policy enforcers to a remote policy engine 703 in a policy server 701 that offers policy evaluation services.

(2) A workstation policy enforcer 516 (or document server policy enforcer 518) does have a policy engine, but the local policy engine decides that the local policy subset is not sufficient to make a policy decision and should delegate policy evaluation to a policy engine that has access to wider policy scope, or access to relevant data. A proxy policy evaluation request is made by a local policy engine to a remote policy engine 703 in the policy server 701 to complete the policy evaluation.

A policy optimizer 704 will optimize the run-time performance of policies. The policy optimize can optimize policies prior to deploying to a policy enforcer. A policy optimizer is not necessary for operation of a minimal system, and some implementations of the invention will not include a policy optimizer. However, when a policy optimizer is included, the performance of the system will be enhanced. More specifically, the policies may be reduced in size, thus take less memory, and may also execute faster. More details on optimization are discussed below.

Typically a policy optimizer performs one or more of the following optimizations: (1) common subexpression elimination, (2) constant folding, (3) constant propagation, (4) comparison optimization, (5) dead code or subexpression removal, or (6) redundant policy elimination. These will be discussed in more detail below.

A policy deployment module 705 handles the deployment of policies to policy enforcers, policy decision servers (not shown), and a location where a policy engine resides. During policy deployment, the policy deployment module may invoke policy optimizer 704 to optimize a set of polices. The set of policies can be a full set or subset of policies on the policy server. The deployment function may be initiated by a policy server (which may be referred to as a push operation) or a policy enforcer or target (which may be referred to as a pull operation). In either operational mode, a full set or subset of policies or a set of differences may be transmitted to a target.

In a policy system architecture that distributes full sets of policies to all policy enforcers, the policy deployment module takes a complete set of policies and sends it to a policy enforcer. In a policy system architecture that organizes policies based on one or more specific policy enforcers or policies targets, the policy deployment module receives or locates a policy enforcer's information and delivers the set of policies or a set of differences relevant to that policy enforcer.

In a further implementation, the policy deployment module can deploy policies in different forms depending on the capability of policy engine at the target. For example, the set of polices that is transmitted from the policy server to a policy enforcer (or target) may take one of the following forms: (1) ASCII text, (2) binary (e.g., code or data), (3) XML (e.g., in Extensible Access Control Markup Language—XACML format), or (4) translated or compiled including policies represented in binary form, polices translated into tables (in binary or text form) or policies translated into programming language (such as XML, Java, C#, Perl, or Python in source code format or compiled binaries), or a combination of these. C# is an object-oriented programming language developed by Microsoft as part of their .NET initiative. C# is based on C++ and Java.

In a specific implementation, the deployment module can translate a set of policies and policy abstractions in one policy language to another policy language. For example, an information management policy can be transformed into one or more firewall policies for a target that is a firewall device.

Figure 8:
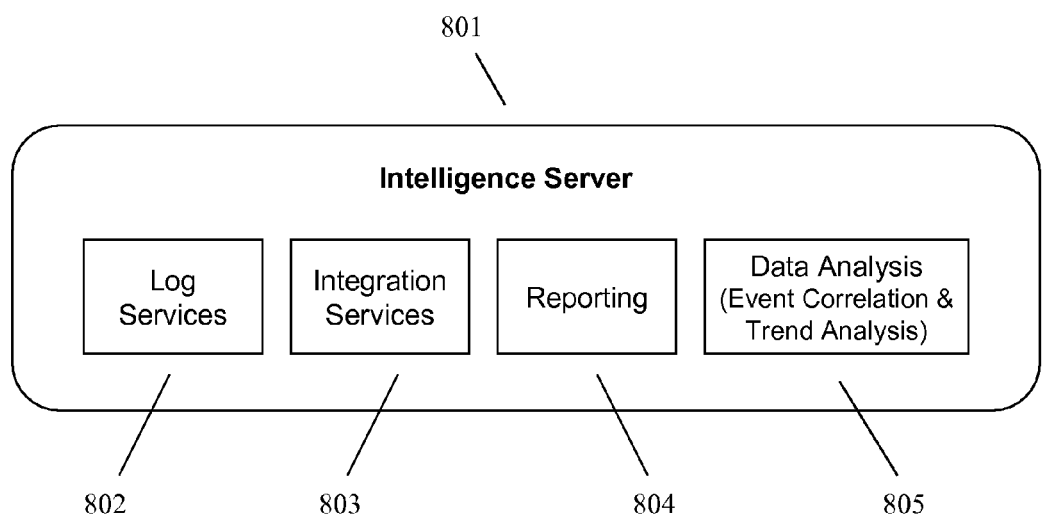
FIG. 8 shows a block diagram of the internal components of an intelligence server according to a specific implementation of the invention.

FIG. 8 shows the internal components of the intelligence server 801. The intelligence server provides summary and trend analysis, signature (or pattern), anomaly, and threshold detection on document access activity, information usage activity, and policy enforcement activity. The intelligence server is accessed using the reporting and analysis 502 software tool that allows business users to create graphical reports to demonstrate compliance, understand information usage, investigate cases of information misuse, understand the effectiveness of a policy, detect information fraud, identify potential workforce productivity improvement, optimize resource utilization, forecast resource requirement, or combinations of these. The intelligence server analyzes comprehensive log data captured in a centralized repository, which will provide insight and accountability for information handling. Policy authors can use data captured by the intelligence server to analyze the effectiveness of a policy. Policy enforcers can utilize the log data and information derived from the log data to support policy evaluation.

The log services module 802 is responsible for collecting and managing log data coming from the policy enforcers. Log data is normally generated or collected by a policy enforcer or a policy engine or explicitly by a policy via a log handler (an obligation handler) in a policy enforcer.

The integration services module 803 is responsible for capturing events occur outside the system and provide access to an external data sources when needed. It may collect data produced by other application programs outside of the system or import data stored outside the system into a log and intelligence repository 309. The integration services module can also export log and analysis data to application program or repository outside of the system. It allows the data analysis module 805 to correlate document access activities, information usage activities and policy enforcement activities with events occur external to the system.

The reporting module 804 is responsible for providing support to the reporting and analysis tool 502. Its main function is report generation.

The data analysis module 805 provides data analysis functions such as event (or log) correlation. For example, one of the functions of the event correlation engine in the data analysis module is to correlate separate events that occur within a policy enforcer or across multiple policy enforcers to identify trends, repetitions, fraud, hacking attempts and other attacks, bad policy designs, or bad practices by users. The data analysis module can provide several types of analyses including:

(1) Summary Analysis—document access activity, information usage activity or policy enforcement activity summarized by user, document, host, policy, location, time (e.g., day or week), organization, and more.

(2) Trend Analysis—document access activity, information usage activity, or policy enforcement activity for a given period of time.

(3) Detailed Event Forensics—detailed listing of activities for specific user actions or policy enforcement actions. Detailed reports showing event-level details for document access activity, information usage activity, or policy enforcement activity.

Compliance officers can use event forensics to investigate specific incidents of information misuse. Information security officers can use event forensics to detect information fraud, hacking attempts, unauthorized access to information, change in a user's information usage behavior, change in a group of users' information usage behavior, or anomaly using a reference activity profile. For an information technology (IT) manager, event forensics can be used to understand resource utilization, determine how many software licenses are being used, determine how to allocate training and support resources based on actual information usage, or identify areas of potential productivity improvement.

A policy enforcer provides three functions: interception (or detection), decision, and enforcement.

Interception refers to a function of detecting certain operations (e.g., carried out through altering normal code execution that implements the operation) in an existing application program or operating system to allow the operations to be examined by a policy enforcer before the operation is carried out. Alternatively, interception may refer to a function in an application program or operating system (e.g., the logic is implemented at development time) where the function affects examination of an operation by a policy enforcer before the operation is carried out. For example, the function in an application program is a procedure call to a policy enforcer application program interface (API) library.

Decision refers to a process of evaluating zero or more policies (or rules) relevant to an intercepted (or detected) operation and determine if the operation should be carried out, and if additional actions need to be performed.

The enforcement function is responsible for implementing the outcome (sometimes called a policy effect) produced by the decision function. For example, if a policy effect is DENY, an operation is blocked.

Interception and enforcement are normally functions of a policy enforcement point (PEP) and decision is a function of a policy engine (described further below). Both PEP and policy engine are components of a policy enforcer. In addition, a policy enforcer can carry out audit (or log) function, and obligation and remediation tasks (described below).

There can be at least two types of policy enforcers that can exist in a system in order to provide a multilayer approach to information control and compliance enforcement: document server policy enforcers and workstation policy enforcers. Document server policy enforcers are designed to control access to and usage of documents (or information) on document servers. While workstation policy enforcers are designed to control end-user access to and usage of documents (or information) on workstations and document servers and information usage by end-users at a workstation. Combining both types of policy enforcers in an embodiment provides control over document access from a workstation controlled by a policy enforcer, from a workstation not controlled by a policy enforcer, to a document server controlled by a policy enforcer, and to a document server not controlled by a policy enforcer, and control the usage of information by organization personnel.

Policy enforcers are responsible for both enforcing policy and collecting audit information (document access activities, information usage activities and policy enforcement activities) for their respective host systems. The policy enforcers intercept end-user or system events (or actions) or information usage (e.g., invoking a function in an application program and operating on data in an application) that may be subject to document access or information usage control policies. The context of each of these events is provided by a PEP to a policy engine which is responsible for evaluating policies relevant to the context. The consequence determined by policy evaluation is communicated back to the PEP, which contains application-specific or system-specific logic to carry out the enforcement function. If the policy evaluation results in the requested event being denied, the PEP typically terminates the request and returns an error status that indicates access is denied or the requested action cannot be performed.

Since policy enforcers have access to information regarding document access and information usage, such activity information (or audit information) can be logged by a policy enforcer to a local or central database. The activity data collected by one or more policy enforcers can be correlated, analyzed, and applied to many applications including: (1) auditing or compliance; (2) investigation; (3) detecting information fraud; (4) detecting information misuse; (5) detecting anomalies; (6) understanding and optimizing resource utilization; and (7) understanding and improving workforce productivity.

Document server policy enforcers are server (e.g., file server) or server application program (e.g., mail server) specific policy enforcers. For example, a file server policy enforcer (discussed below) is designed to protect file resources on (or accessible by or managed by) the file server. In a different example, an e-mail server policy enforcer such as Microsoft Exchange Server policy enforcer controls access to and usage of e-mail and other Microsoft Exchange Server application objects on the server. In another example, a document management system (DMS) policy enforcer controls access to and usage of documents stored in a DMS repository and other DMS specific application objects.

Document server policy enforcer is installed on a server computer (e.g., file server) or on the computer where a server application program (e.g., mail server) is installed. Alternatively, some policy enforcer functions including policy engine can be distributed to a separate computer. The interception function carried out by a PEP is server and server application program specific and can occur inside a server application program or at operating system level.

A file server policy enforcer is a type of document server policy enforcer. The file server policy enforcer controls access to and use of (e.g., copy or print) files on file servers. It is installed on a file server machine and enforces document access policies or information usage policies, or both, as organization personnel interact with the file server. Document access policies control whether users or application programs are allowed to access files and folders on (or accessible by or managed by) a file server including: create, read, write, delete, copy, move, and rename files; create, open, encrypt, delete, and rename folders; access and change file or folder attributes; and create, access, change, rename, and delete links or shortcuts associate with files or folders. The policy enforcers also log access to files and folders and information about each enforcement event.

The file server policy enforcer monitors network requests for files and also monitors file system requests. This architecture allows the policy enforcer to evaluate policies based on the greatest amount of context for each request, since it can use both network-level and file system-level information. Certain file access operations can also be intercepted inside a server application program (e.g., a NFS server) and at operating system level.

In a specific file system implementation, both a file server policy enforcer and a workstation policy enforcer (described below) are typically needed to provide thorough protection to the resources managed by the file system. For example, Andrew File System (AFS) uses a client application program to cache file system objects on a workstation. With only an AFS server policy enforcer, file system objects cached on a workstation are not protected. In that case, a workstation policy enforcer can be combined with an AFS server policy enforcer to provide complete file system resource protection.

The file server policy enforcer is self-monitoring and self-protecting. When it is running, a user or process is not permitted to modify, delete, or access the policy enforcer system files including the binaries, configuration files, log files, and policy files. If the policy enforcer is stopped unexpectedly, it is automatically restarted.

Policy enforcers can be installed on some or all file servers within an enterprise, depending on which file servers contain documents that the organization wants to enforce document access policies or information usage policies, or both, on. A file server policy enforcer affects only the file server where it is installed. Alternatively, the policy engine in a policy enforcer can run on a computer different from the server being managed.

The file server policy enforcer is responsible for controlling access to and use of files stored on (or accessible by or managed by) a file server. It can control access to and use of files on a file server by workstations that are controlled or not controlled by policy enforcers.

A workstation policy enforcer controls end-user usage of documents or information on workstations and application program functions. The policy enforcer is installed on a workstation and controls access to and usage of documents or information, whether those documents or information are stored on the workstation or remotely. The policy enforcer detects (or intercept) document access activity, information usage activity and application program operations for each application running on the workstation. Detection can occur inside an application program or at operating system level. For example, the enforcer may be embedded in the application program or in the operating system.

Usage policies control whether users of that workstation are allowed to perform various actions such as sending, printing, or copying documents. Usage policies can also apply to application data to, for example, control cut-and-paste, drag-and-drop, allow only a particular group of users to modify a particular spreadsheet formula, restrict editing of a macro or script by user, restrict editing to a specific region or portion in a document by user, restrict certain application functions based type of connectivity (such as VPN), restrict a particular type edit to a document based on time, and screen capture functions to control misappropriation of data in a document.

Policy enforcers also collect information about each enforcement event for an activity journal or report. The policy enforcer may be self-monitoring and self-protecting. In a specific implementation, when the policy enforcer is running, no user or process can modify, delete, or access the policy enforcer's system files, including the binaries, configuration files, log files, and policy files.

Policy enforcers can be installed on any number of workstations within an enterprise. Each policy enforcer affects only the workstation where it is installed. Policy enforcers may be embedded into a computing device like PDA (such as a Palm Zire™ or Tungsten™, Dell x50v or x51v, or HP IPAQ) or smart phone (such as a Windows Mobile-based smartphone device). A policy enforcer can also be installed on a terminal server (e.g., Microsoft Windows 2003 Terminal Services or Citrix MetaFrame Server) to control document access and information usage in each client session.

Workstation policy enforcer is responsible for document access and information usage at a point-of-use. It has the ability to control access to and usage of documents or information stored locally on the workstation and remotely on document servers, and the document servers may be controlled by policy enforcers or not controlled by policy enforcers. The workstation policy enforcer can also control usage of information and application program functions at a workstation.

Figure 9:
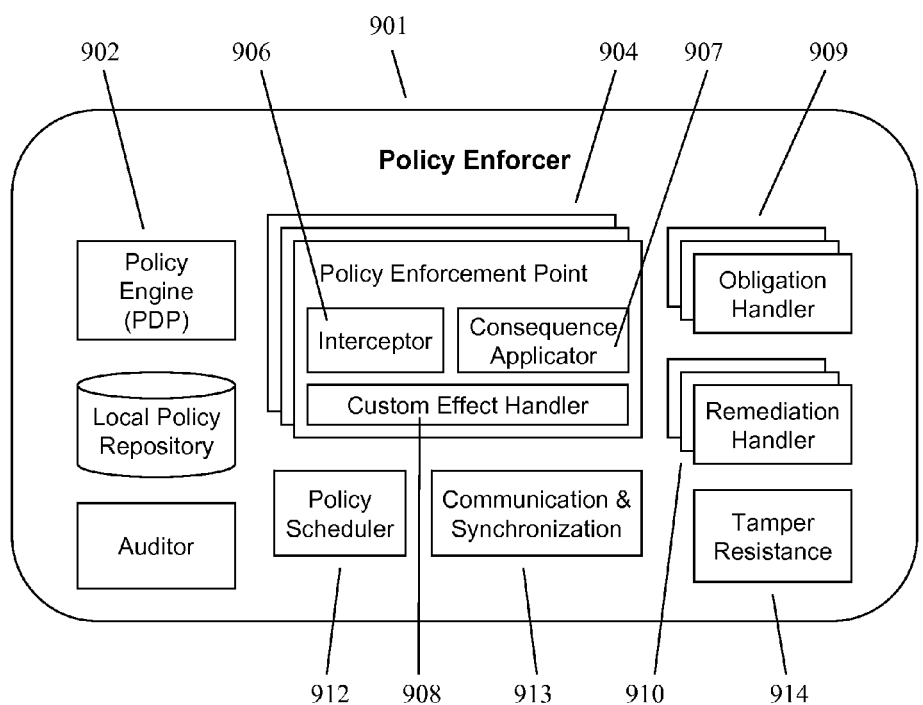
FIG. 9 shows a block diagram of an interceptor and a consequence applicator in a policy enforcement point (PEP) module according to a specific implementation of the invention.
Figure 10:
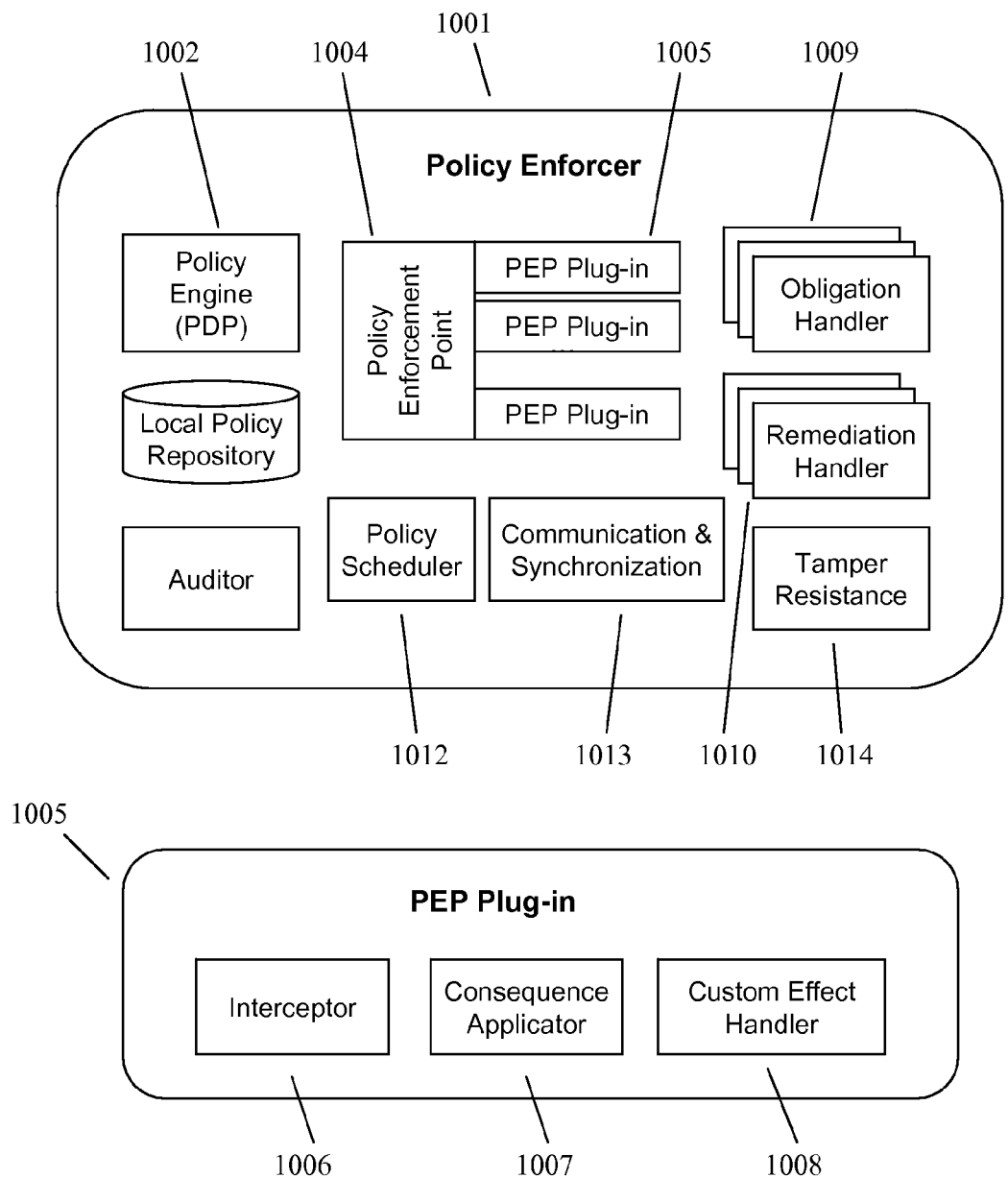
FIG. 10 shows a block diagram of a policy enforcer that implements interception and enforcement functions using a PEP plug-in architecture according to a specific implementation of the invention.

Referring to FIGS. 9 and 10, document server and workstation policy enforcers 901 and 1001 have a similar architecture. An interceptor 906 and 1006 is responsible for intercepting (or detecting) document access and application operations (or actions), collecting information about an intercepted operation (e.g., type of action, document or documents associated with the action, and information about the application or module where interception occurred), and forwarding the data collected to a policy engine 902 and 1002 to perform policy evaluation. The consequence of policy evaluation is returned by a policy engine to a consequence applicator 907 and 1007. A consequence applicator is responsible for applying consequence of policy evaluation which includes policy effect and additional tasks.

FIG. 9 illustrates a design where an interceptor and a consequence applicator are components of a policy enforcement point (PEP) module 904 and a policy enforcer includes of at least one PEP 904 and one policy engine 902.

FIG. 10 illustrates a policy enforcer 1001 that implements interception and enforcement functions using PEP plug-in architecture. The policy enforcer includes one PEP 1004 and at least one PEP plug-in module 1005. Both interceptor 1006 and consequence applicator 1007 are components of a PEP plug-in module 1005.

A policy engine may run in a process separate from a policy enforcer. The policy decision process and policy enforcer can run on the same computer or on separate computers.

The interceptor and consequence applicators are functional entities where implementation of the two functions varies from operating system to operating system and application to application. In some cases, the interceptor and consequence applicator functionalities are combined into one code module. In other cases, the interceptor and consequence applicator reside in separate code modules.

To carry out interception and consequence application functions, the interceptors and consequence applicators may function at application program level or operating system level. Application program level interceptors and consequence applicators are application program specific code modules which can be implemented as add-ins, plug-ins, scripts, macros, libraries, or extension programs. Operating system level interceptors and consequence applicators are operating system specific code modules that can be implemented as libraries, filters, or device drivers.

To control application usage, a policy enforcer effects control on application program operations (e.g., blocking an application program operation) or filters results generated by the application program operations (e.g., remove text or disable actionable object in the result), or a combination of these. Normally options such as printing, cut and paste, e-mailing, editing are permitted by a certain application on all documents. However, using the control application usage aspect of the invention, some options may be disabled. For example, controlling application usage may include disabling one or more of an application's operation such as print, cut and paste, e-mail, editing, save as, save to, send to, search and replace, executing a macro or program (e.g., Visual Basic for Applications or VBA program), track changes, show or reveal edits or comments, or other application operations for certain documents. In effect, the policy enforcer will control what operations are permitted or not permitted by applications on particular information for documents, users, or other factors as discussed in this patent application. The policy enforcer may disable usage of some applications altogether. For example, some users may not be allowed to use instant messenger, to play certain program (e.g., games) during certain hours, and so forth.

An application may be any application or program (including built-in functionality of an operating system or BIOS) such as a word processor or application suite (e.g., Microsoft Office, Microsoft Word, OpenOffice, Visio), e-mail program (e.g., Microsoft Outlook or Eurdora), personal information management program (e.g., Microsoft Outlook, Lotus Organizer) Web browser (e.g., Internet Explorer, Firefox, Opera, Safari), RSS reader. instant messenger (e.g., Yahoo! Messenger, AOL Instant Messenger, Windows Live Messenger, Gaim), voice chat (e.g., Skype, Google Talk), web conferencing, text messaging program, media or music player such as an MP3 or video player (e.g., Windows Media player, Winamp, Musicmatch Jukebox, iTunes, RealPlayer, Quick-Time, WinDVD, CyberDVD), print programs (Adobe Acrobat, CutePDF), operating system print screen or print to file, archiving program (e.g., Winzip, 7-zip, Winrar), picture viewer (e.g., ACDSee), utilities (e.g., Norton Systemworks, Norton Ghost, AVG Antivirus, Diskeeper defragmentation, OCR program, Adobe Photoshop, GIMP, FTP, PartitionMagic, Nero CD Burning software), financial program (e.g., Quicken, TurboTax, Peachtree), database (Microsoft Access, Oracle), and many more. The program or program may be a commercially available program, shareware, abandonware, or open source software. The application may run under any operating system.

Using interceptors and consequence applicators, an application program operation is intercepted (or detected) and information about the application program operation is provided to a policy engine to make a policy decision, and if the policy decision specifies an enforcement action, the enforcement action is carried out effecting control on the application program operation or filtering of results generated by the application program operation.

A policy enforcer may use one or more methods to implement application usage control. The methods include: (a) blocking or altering an application program operating after it is invoked directly or indirectly by a user but before the application program operation is carried out; (b) disabling or hiding a user interface element responsible for invoking an application program operation so that a user cannot invoke the application program operation through the user interface element; and (c) removing, altering or obscuring a part or all of the result generated by an application program operation making certain information not available to a user. Note that the user interface element described in (b) may be an element of an application program (e.g., a menu item or a button) or an element of the result generated by an application program operation (e.g., a hypertext link, a check box, or a list box).

In a graphical user interface environment, an application program operation may correspond to an operation associated with a user interface element. If a user interface element is a menu item, a corresponding application program operation is an operation that will be carried out when the menu item is selected (e.g., printing a document). If a user interface element is a hypertext link (such as a clickable word or phrase on a Web page), a corresponding application program operation is an operation that will be carried out when the hypertext link is clicked (e.g., loading a new Web page or jumping to another position on a Web page). Other common user interface elements include a: menu, button, list box, list item, check box, scroll bar, key (on the keyboard), and mouse button. An application program operation may also correspond to a command or function that is invoked by a user indirectly (e.g., through a macro or script) or by another application program.

To filter results generated by an application program operation, a consequence applicator may alter, substitute, remove, hide or obscure one or more portions (or all) of the result to be presented to a user. The consequence applicator may also alter, substitute, remove, hide, disable or obscure one or more actionable objects or fragments of text (e.g., menu, tab, buttons, check boxes, list boxes, or hypertext links).

To control document access, a policy enforcer effects control on document access operations. Common document access operations include: read (or open), write (or save), execute (for binary file or script), delete, read permission (or security setting), and change permission. Many document repositories (especially document management systems) support additional document access operations.

Typically, interceptors and consequence applicators intercept (or detect) a document access operation and information about the document access operation is provided to a policy engine to make a policy decision, and if the policy decision specifies an enforcement action, the enforcement action is carried out effecting control on the document access operation. Alternatively, the interceptors and consequence applicators may also integrate with an existing access control system provided by a document repository (e.g., document management system).

Interceptors and consequence applicators that control document access are document repository dependent. They may be installed in a document server application program (e.g., HTTP server, IBM Lotus Notes Server, Microsoft Exchange Server, or Microsoft Sharepoint Portal Server), at an application program interface (e.g., MAPI, JMS, ODBC, JDBC, and Oracle SQL*NET), at an application protocol interface, or act as a application protocol proxy between a client and a server (e.g., HTTP, FTP, or SOAP), at file system libraries, at network file share protocol driver (e.g., CIFS or NFS), or at file system device driver.

Some common document repositories include: file servers, mail servers, document management server, content management server, HTTP or Web servers, FTP servers, WebDAV servers, and database servers.

In one implementation of a policy enforcer, interceptors and consequence applications are installed in an existing application program or operating system to implement interception (or detection) and enforcement functions. The interceptors and consequence applicators are not native elements of the application program or operating system.

In another implementation of a policy enforcer, interceptors and consequence applicators are native elements of an application program or operating system. Interception and enforcement may be implemented through one or more calls to a policy enforcer application program interface (API). For example, a policy enforcer API is provided in the form of a software development kit (SDK).

A workstation policy enforcer installs a number of application program interceptors 906 and 1006 and consequence applicators 907 and 1007 to monitor document access and information usage operations (or action) inside individual application programs and apply enforcement actions. In addition, a workstation policy enforcer also installs operating system interceptors and consequence applicators to monitor file access from application programs and apply enforcement actions. The operating system interceptors can intercept operations from application programs that are monitored by application program interceptors or not monitored by application program interceptors on the workstation.

Interceptors and consequence applicators can be setup during program installation time or any time in a program's life cycle. One method that can be used to set up an interceptor is to perform code analysis on an application program or library module and then modify the stored program code. Another method that can be used to set up an interceptor is through code injection at program start-up time. Yet another method that can be used to set up an interceptor is to perform code injection after the program has been started. Code injection includes any method that modifies exiting program code or inserts new code to existing program code to implement an additional function, or a combination of these two. The existing program code can reside in volatile or nonvolatile memory.

The consequence applicator implements the consequence or outcome produced by the policy engine. The consequence typically includes an effect of policy evaluation and optionally obligation and remediation tasks (described below) to be carried out. Examples of an effect include whether an operation should be allowed or denied; query a user for input; evaluate another set (or sets) of policies; and call a custom effect handler (described below).

The local policy repository holds a copy of policies applicable to a policy enforcer. Depending on the policy system architecture selected, the set of policies in the local policy repository may be a full set of a set of policies on the policy server or a subset. The local policy may be stored locally in a relational database, in one or more files, or in any form that convenient to the policy enforcer. By storing policies for a policy enforcer locally, a workstation policy enforcer can continue to function while a workstation is off-line and the policy server cannot be reached.

The custom effect handler, 908 and 1008, is a code module that implements custom effects and is optional in the policy enforcer.

An obligation handler, 909 and 1009, is a code module that carries out obligations supported by the policy system architecture. An obligation is a task that is related to the intercepted action that a policy enforcer is obligated to take. The tasks may include logging an action being intercepted, sending a notification to an administrator regarding the intercepted action, and archiving or encrypting the document associated with the intercepted action.

For example, a policy says "any e-mail sent to a patient should be maintained in the patient record database; and the obligation action is to send (or "bcc") a copy of the e-mail to the record management system." In this case, a policy enforcer will automatically apply the obligation action (i.e., archive) and send a copy of an e-mail to a record management system.

In a second example, obligation can be used to implement regulatory compliance requirements such as "all e-mail communications from an executive should be archived." A policy can be written to capture all send and forward actions on e-mail and apply an archive obligation action automatically.

Some obligation handlers, 909 and 1009, are executed inside a policy enforcer process (e.g., the log handler) while others are implemented as policy enforcement point components executing inside an application program (e.g., an e-mail delete handler) or an operating system. The obligation handler is optional in the policy enforcer.

The remediation handler, 910 and 1010, is very similar in function to the obligation handler except it performs different functions. Remediation means additional actions taken that are different from what is being intercepted. Such actions are introduced solely by policies defined to "remediate."

The tamper resistance module, 914 and 1014, is responsible for preventing, blocking, monitoring, and recovering from attempts to disable or alter the function of a policy enforcer. Many techniques can be used to protect program files and configurations from modifications and corruption. Some examples are: (1) Multiple copies of files can be maintained and a missing or corrupted file can be restored from the backup copies. (2) Checksums or signatures can be generated on important files and stored in nonvolatile memory to enable detection of corrupted program and data files. (3) Access to policy enforcer program files and configurations can be restricted. (4) Changes to a policy enforcer's Windows registry entries can also be monitored, blocked, and automatically restored.

The communication and synchronization module, 913 and 1013, is responsible for maintaining one or more connection to the policy server and intelligence server, handling policy updates, and transferring log data to the log and intelligence repository.

The policy scheduler, 912 and 1012, invokes maintenance policies set by the administrator or user. A maintenance policy tells the policy scheduler when to perform an action and what the action is. For example, the policy scheduler can be given a maintenance policy that instructs it to perform a nightly scan of all e-mails and to delete any e-mails older than 90 days.

A maintenance policy uses the same format as a normal policy, but rather than being evaluated in response to an action by a user or application program, the maintenance policy is evaluated at a certain specified date, time, or both. The policy engine performs any specified obligation or remediation action specified in the maintenance policy.

A policy engine, 703, 902, and 1002, is an execution unit that processes and executes rules or policies. The policy engine takes the data collected by an interceptor, historical data from prior interceptions, configuration and environment data, and applies the policy rules supplied by the policy server to the data to produce a consequence. A consequence may include an effect (e.g., ALLOW, DENY, evaluate another policy, query user, or call a custom effect handler) and optionally one or more obligation and remediation tasks. The use of historical data in policy evaluation is optional. As part of policy evaluation process, a policy engine may decide that it needs to obtain input form a user before it can proceed with (or complete) policy evaluation. At that time, a policy engine can invoke user interface elements to query the user for input. For example, such input is related to classifying a document (which produces document attribute values) that is required to complete policy evaluation.

Also, as part of the policy evaluation process, a policy engine may decide that it needs to obtain document classification information in order to complete policy evaluation. The process of obtaining document classification information may involve retrieving stored document classification data or dynamically invoking a document classification engine to classify a document.

The policy engine optionally performs a list of obligation and remediation tasks or invokes a custom effect handler, or a combination of these, if one is defined in a policy. An implementation of the policy engine is policy system architecture specific. Depending on what policy system architecture is selected, the implementation of the policy engine can vary significantly. Some examples include distributing full sets of policies to policy enforcers, organizing policies based on the type of policy enforcer the policies target, using policies defined in XACML format, or using policies defined in Blue Jungle's Compliant Enterprise Active Control Policy Language (ACPL) format that uses a declarative approach to policy specification. More detailed information about the ACPL language may be found in U.S. provisional application 60/870,195, filed Dec. 15, 2006, which is incorporated by reference.

The ACPL language is merely one example of a policy language of the invention and is provided to help one more easily understand the invention. There are many variations to a policy language according to the invention and such a policy language is not limited to what is described for the ACPL language. The invention includes features that are not in the ACPL language implementation presented. A policy language of the invention may include one or more features of the ACPL language. A policy language of the invention features that are not in the ACPL language. A policy language of the invention may include one or more features of the ACPL language in combination with features that are not in the ACPL language.

The policy deployment module 705 in this invention can support different types of policy engine design, allowing the appropriate policy engine design to be selected for an individual device. For example, a smart phone policy enforcer may be limited by the device's computing power and memory available. A policy engine inside the smart phone policy enforcer may be designed to execute precompiled and preoptimized polices that exist in binary form. The policy optimization and compilation steps are performed on the policy server before transmitting (the subset of policies) to the smart phone policy enforcer. In this case, the smart phone policy enforcer receives and evaluates policies exists in binary form which is a semantic equivalent of the original policies resided on the policy server.

A number of design options are available to the design of policy engine 703, the options include: (1) Support distribution of full sets of policies to policy enforcers. (2) Support preoptimized policies at the policy enforcer. (3) Support policies transmitted to a policy enforcer in XACML format. (4) Support policies transmitted to a policy enforcer in Blue Jungle's ACPL format. (5) Support policies compiled into ASCII or binary format. (6) Support policies translated into programming language (e.g., XML, Java, C#, Perl, and Python in source code or binary format). (7) Support policies translated into lookup tables. (8) Support preinstalled, configurable policies and alter preinstalled polices' behavior through configuration changes. (9) Support built-in, configurable policies and alter built-in polices' behavior through configuration changes.

In an implementation of a policy engine, a policy evaluation process can be invoked by an interceptor 906 and 1006, a policy scheduler 912 and 1012, an internal event generated by a policy enforcer or policy server, or an external event generated by another application program.

An internal event is similar to an intercepted user or application program action except that it is generated by a policy engine or other components of a policy enforcement system. An internal event can provide additional information relevant to the event similar to that of intercepted action. In fact, an internal event often includes the information provided by an intercepted action which results in the generation of the internal event. An internal event may be generated as a result of a policy evaluation request or a result of an activity data analysis operation.

An external event is an event generated by another application program outside of a policy enforcement system. This type of application program is typically a third party application integrated with a policy enforcement system (e.g., through a software development kit). Third-party application integration can be extremely useful because in a specific implementation where policy enforcers are deployed company-wide, managing all types of information, the management system has access to information in a distributed environment without having to go through additional authentication and authorization processes. For example, a customer relationship management (CRM) application may instruct a policy enforcement system through an external event to archive all documents related to a customer on the closing of an account. The handling of such an external event may include rolling up: files on file servers and desktop and laptop computers, e-mail messages on mail servers and all mail clients, and documents in document management systems.

The Blue Jungle ACPL is one example of a specific implementation of the invention. However, the present invention has many aspects and an implementation of the invention may have any number of the features discussed in this patent, and not necessarily every feature described.

The policy engine can evaluate policies received from the policy server using the following steps:

(1) Receive data collected by an interceptor or provided by an integrated application program module. The data collected by an interceptor may include an action (or operation) being intercepted, information on the document or documents that are associated with the action, information on the thread, process and application within which the action was taken, and other information which may be useful in policy evaluation. Actions such as cut-and-paste that do not necessarily involve a document may also be intercepted.

(2) Inspect data provided by the interceptor or the integrated application program module and select policies that are applicable. The selection may be based on type of action, who is the user, what is the application, and so on. In some policy system architectures, this policy selection step may not be necessary. In that case, all policies will be evaluated.

(3) Based on the policies selected and data provided by an interceptor or the integrated application program module, obtain additional information that is used to complete policy evaluation. The additional information may include configuration setting and environment data.

(4) Pass the selected policies and data collected through policy evaluation logic to produce a consequence (or outcome). The consequence includes one of the valid policy effects (e.g., ALLOW, DENY, evaluate another set (or sets) of policies, query user and call a custom effect handler), and perform any obligation and remediation tasks.

(5) If the policy evaluation consequence includes any obligation or remediation tasks, call the corresponding obligation or remediation handlers to carry out the obligation tasks, remediation tasks, or both.

(6) If the policy evaluation consequence includes a custom effect, call the corresponding custom effect handler to generate or apply an effect.

The policy engine can reside in a policy enforcer, a policy server, a dedicated policy decision server, or any process or server that is assigned the policy decision function. Note that the policy engine may be an optional module in the policy enforcer.

In an embodiment of the invention, the policy engine can evaluate policies received from the policy server, data provided by a scheduler associated with a scheduled event, data associated with an internal event generated by a policy enforcer or a policy server, or data accompanying an external event generated by a different application program.

In another embodiment of the invention, the policy engine detects the current location of a device (e.g., a laptop computer) and evaluates a selected subset of policies received from the policy server according to the current location. To determine the current location of a device, a policy engine may examine an active connection to the device, wherein examining an active connection includes examining an IP address allocated to the device, or IP address or host name of an access point where the device connects to. In an example where a company has two offices, one in New York and another in Boston. If an access point in New York office has a host name "AP-NY" and an access point in the Boston office has a host name "AP-B." When a user connects a laptop computer to the network in the Boston office, the policy engine on the laptop computer determines the host name of an access point as "AP-B" whereby evaluating only policies applicable to location "AP-B."

The policy language syntax used in the following examples is based at least partially on the ACPL language syntax. The ACPL language syntax is described in U.S. provisional application 60/870,195, filed Dec. 15, 2006.

In one implementation, a policy directive is used to label the locations where a policy is applicable. In such implementation, policies that are not labeled are applicable to all locations. A location label may refer to one or more locations. A location label may comprise of one or more constants or an expression.

```
# Policy 1
[location.access-point ="AP-NY"]
FOR document.name="\\server1\legal\highly-confidential\*"
ON OPEN
BY user=Legal
DO (ALLOW AND LOG) OTHERS DENY
# Policy 2
[location.access-point="AP-B"]
FOR document.name="\\server1\legal\highly-confidential\*"
ON OPEN
```

-continued

```
BY user=Legal
DO DENY
```

The policies in the above example are prefixed with location labels. In this case, a location label comprises an expression (e.g., location.access-point="AP-B"). During policy evaluation, a policy engine evaluates the location labels of "policy 1" and "policy 2" to determine if "policy 1" or "policy 2" is relevant. Further, there may be a catch all policy that is applied when the value of "location.access-point" does not match any other policy having a location label specifying "location.access-point" as a matching criterion. For example, a catch all label may be "[location.access-point=DEFAULT]."

In another implementation, policies are grouped into policy sets and a policy set directive is used to label the locations where a policy set is applicable. A policy set may be named or unnamed. A policy set comprises at least one policy. A policy set may also include another policy set.

```
[location.access-point = "AP-NY"] PolicySet "NY-Office-Policies"
{
# Policy 3
FOR document.name="\\server1\legal\highly-confidential\*"
ON OPEN
BY user=Legal
DO (ALLOW AND LOG) OTHERS DENY
# Policy 4
FOR document.name="*.xls" OR document.name="*.pdf"
ON PRINT
BY user=Finance
DO DENY
}
```

The two policies "policy 3" and "policy 4" in the above example are grouped into a named policy set "NY-Office-Policies." The policy set is tagged (or prefixed) with a location label [location.access-point="AP-NY"] making the policies in the policy set applicable only when the label is evaluated to Boolean true.

In yet another implementation, a policy may comprise multiple expressions (or subexpressions) each assigned a different location label. Evaluating such policy includes selecting an expression (or subexpression) associates with the location detected by a policy engine.

```
FOR document.name="\\server1\legal\highly-confidential\*"
ON OPEN
BY user=legal
WHERE {
SWITCH (location.access-point)
  CASE "AP-NY"
  connection.type = "LAN" OR (connection.type = "WLAN"
  AND connection.security = "VPN")
  DEFAULT
  connection.security = "VPN"
}
DO ALLOW OTHERS DENY
```

In the above example, two expressions (i.e., 'connection.type="LAN" OR (connection.type="WLAN" AND connection.security="VPN")' and 'connection.security="VPN"') are specified in the context component (i.e., the WHERE clause) of a policy. Each of the expressions is assigned a location label where the specific expression associates with a specific label will be evaluated when the value of "location.access-point" matches the specific label.

In another embodiment of the invention, the policy engine evaluates policies received from the policy server, detects the current location of a device and applies policy consequence based on the current location detected. In such implementation, a policy may comprise multiple consequence expressions (or subexpressions) each assigned a different location label.

```
FOR document.name="\\server1\legal\highly-confidential\*"
ON OPEN
BY user=Legal
DO {
  SWITCH (location.access-point)
  CASE "AP-NY"
  DO (ALLOW AND LOG)
  CASE "AP-B"
  DO DENY
  DEFAULT
  DO DENY
} OTHERS DENY
```

In the above example, multiple consequence subexpressions are specified in a policy where each consequence subexpression is identified by a location label (e.g., "AP-NY" or "AP-B"). The location labels are compared with the value of "location.access-point" during policy evaluation to determine which consequence subexpression (e.g., "DO ALLOW AND LOG" or "DO DENY") will be applied.

For the purpose of illustration, the following examples show the evaluation of only one policy in the policy evaluation step (by a policy engine). In practice, a policy engine can select one or more policies relevant to an intercepted action or the integrated application program module and the policy evaluation may involve more than one policy. When more than one policy is evaluated by a policy engine in response to an intercepted action or the integrated application program module, policy consequences in the evaluated policies should be combined to form one final policy consequence using one or more combining algorithms (e.g., deny override or permit override). The final policy consequence is then returned to an interceptor and consequence applicator (or an authorization process that invokes policy evaluation). This final policy consequence typically contains a policy effect and optionally one or more obligation tasks or remediation tasks.

Figure 11:
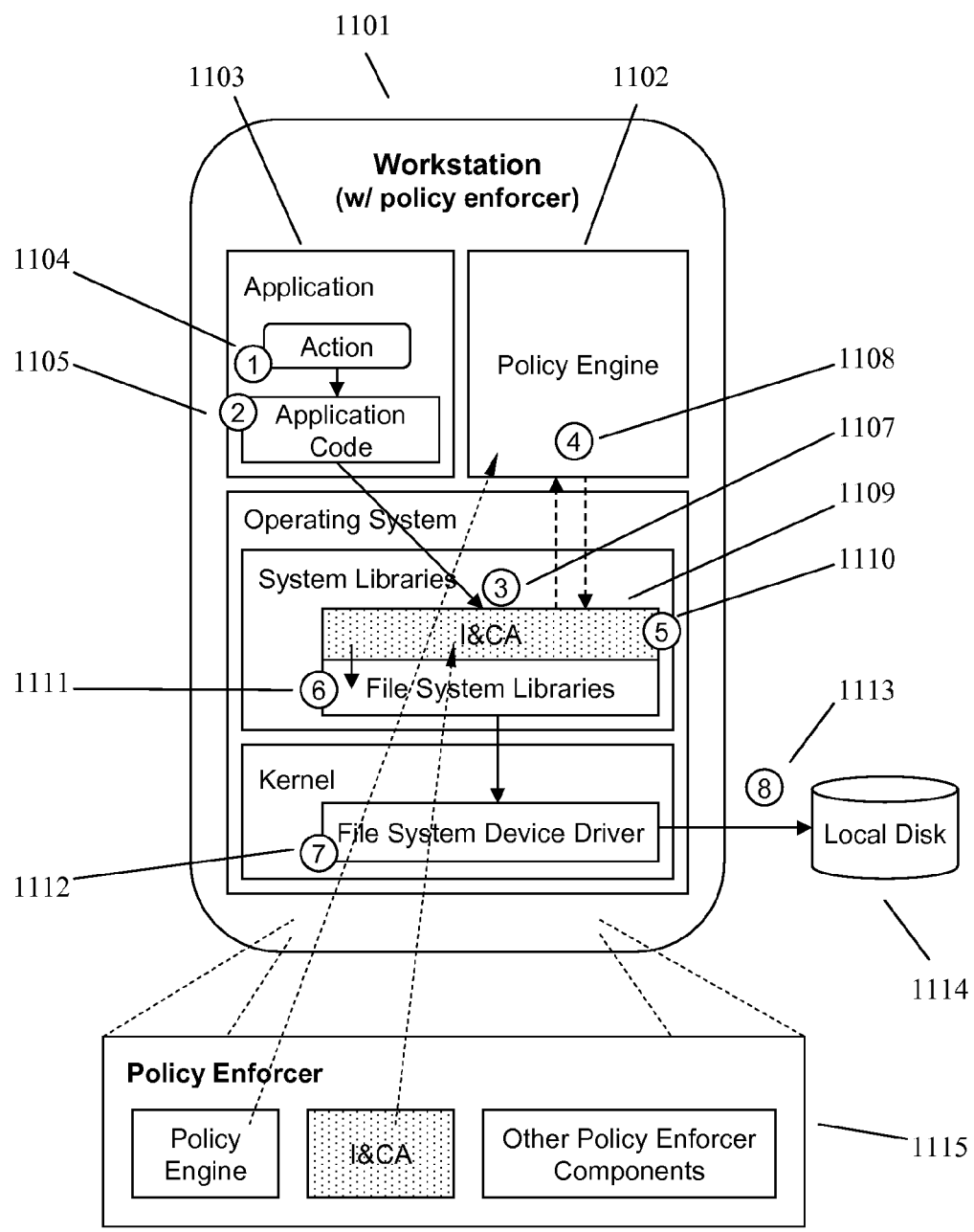
FIG. 11 shows a block diagram of a policy enforcer installed on a workstation that controls access to files on the workstation according to the invention.

FIG. 11 shows an example embodiment of a policy enforcer 1115 is installed on a workstation 1101 where a user's (or application's) OPEN action triggers a file operation (e.g., open( )) on a local disk file. Note that file system objects are handled differently from other documents that are nonfile system objects. The policy definition is:

```
FOR document.name = "*.doc"
ON OPEN
BY user = NOT Employees
DO DENY
```

The following describes a normal (i.e., ALLOW) execution path when a user accesses a file and the policy engine 1102 interprets, and the interceptor and consequence applicator 1109 implements the above rule. Note that, as shown in FIGS. 9 and 10, the policy enforcer 1115 includes several components. For the ease of explanation, the policy enforcer is not shown in full in the following examples. In this example, the policy engine 1102 and the interceptor and consequence applicator 1109 components of the policy enforcer 1115 are described.

Step 1 (1104): A user or application program 1103 performs an action. An action can include opening a file, saving a file, moving a file, deleting a file, renaming a file and so forth. In this case, the action is OPEN.

Step 2 (1105): The user or application action causes some application code to be executed which results in calls to operating system libraries to manipulate a file. For action OPEN, the system call that application code makes includes open( ), fopen( ), FileOpen( ), OpenFile( ), and CreateFile( ).

Step 3 (1107): The workstation policy enforcer is capable of intercepting calls to operating system libraries. The file operation calls (e.g., open( ), fopen( ), etc.) are intercepted. The interceptor and consequence applicator 1109 that intercepts a system call collects information about the file operation, calling application, and user, and forwards that information to the policy engine 1102 for further processing. The information collection may include the file name, directory, file path, application's process id, and program name.

Step 4 (1108): The policy engine 1102 takes the information received from the interceptor and consequence applicator 1109 and other configuration and environment data, and applies relevant rules distributed to it by a policy server. Note that depending on what policy language is used, one or more rules can be relevant to a current action. The policy evaluation can result in an ALLOW, DENY, or DELEGATE policy effect and it may also introduce obligation actions, remediation actions, or both. Delegation is when the policy engine 1102 evaluates another policy or another set of policies locally or remotely.

(a) An obligation action refers to additional action or actions that are related to the intercepted action that a workstation policy enforcer is obliged to perform when a certain condition or conditions are met. For example, an obligation action includes logging an action or sending a notification message to an administrator. An obligation can depend (or not depend) on the ALLOW and DENY state.

(b) A remediation action refers to an additional action or actions that are unrelated to the intercepted action that a workstation policy enforcer should take when a certain condition or conditions are met. Remediation actions may include deleting a copy of a backup file because only one copy of a particular file is allowed or cleaning up a user's home directory because the user's assigned privilege has changed due to a recent job change.

(c) Step 5 (1110): The policy evaluation decision (i.e., effect) is returned to the interceptor and consequence applicator 1109 (in this case, the interceptor is also acting as a consequence applicator). The interceptor and consequence applicator 1109 takes appropriate enforcement action. In some cases, the interceptor and the consequence applicator can be separate code modules (e.g., when communication between the Policy Engine and PEP is asynchronous). FIG. 11 shows the execution path of an ALLOW effect. In the case where the policy evaluation effect is DENY, then steps 6 to 8 should be eliminated. For the action OPEN, if the effect is DENY, then the interceptor and consequence applicator 1109 terminates the open( ) call immediately with an error status.

Step 6 (1111): The interceptor and consequence applicator 1109 forwards the system call made by the application code to an appropriate operating system library and the normal operation is carried out.

Steps 7 to 8 (1112 and 1113): Depending on what system called is made it may involve a file system device driver and access to physical disk 1114.

Figure 12:
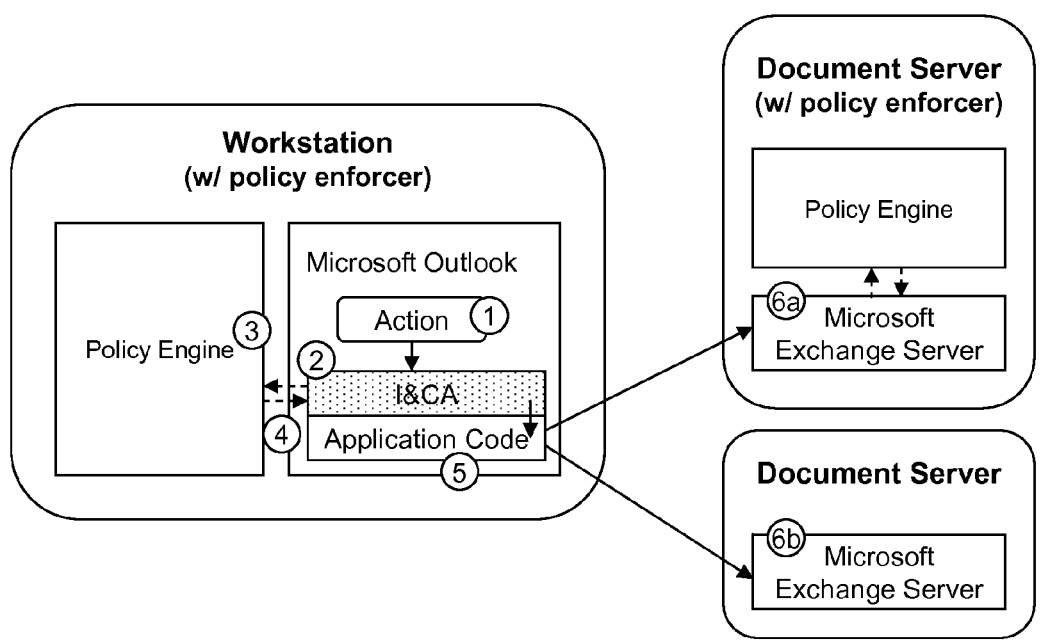
FIG. 12 shows a block diagram of a policy enforcer on a workstation enforcing access control to a nonfile system object according to the invention.

FIG. 12 shows an embodiment where access control to a nonfile system object (e.g., e-mail) is being enforced on a workstation. The policy definition is:

```
FOR message.from = Legal AND message.createDate < (TODAY-90)
ON OPEN
DO DENY
```

Since a nonfile system object (or document) access is application specific, interception is typically performed inside an application, at an application program interface (API), or at a communication protocol interface, instead of being performed in operating system libraries or device drivers. In addition, interception of communication protocol can also be performed using a proxy (or gateway) application that is placed between a client application and a server. An example of an application program interface includes Microsoft Messaging API, Oracle SQL*NET or Java Message Service (JMS). An example of a communication protocol includes HTTP, FTP, WebDAV, SMTP, POP3, or IMAP4.

The processing steps are basically the same as illustrated in FIG. 11, except that interception and enforcement are performed differently. There are at least two methods for handling the interceptor and consequence applicator on nonfile system objects. In the first method, a policy enforcement point (PEP) containing the interceptor and consequence applicator functions is built into an application program. With this approach, interceptor and consequence applicator functions are provided as an integral part of an application program and the application program provides means to communicate with an external policy engine.

The second method uses a PEP installed by instructing or instrumenting an existing application program to provide interceptor and consequence applicator functions. This second method allows application programs that are not released with document access and information usage control capabilities to be retrofitted to provide such capabilities. Besides interceptor and consequence applicator functions, a PEP may also implement obligation and remediation task handling capabilities.

Adapting an application program to provide interceptor and consequence applicator functionalities may include one or more instrumentation techniques. The following are instrumentation techniques available for retrofitting application programs to provide document access and information usage control capabilities:

(1) Using application program interfaces (APIs) available to implement interceptor and consequence applicator functionalities. (2) Implementing interceptors and consequence applicators in an in-process add-on (or plug-in) module or extension library. (3) Implementing interceptors and consequence applicators in a callback module. (4) Implementing interceptors and consequence applicators in a device driver. (5) Performing function (or method), class (or object), library, program, and device driver wrapping either statically or dynamically so that an interceptor has a chance to examine an application program operation before the actual operation is carried out. (6) Installing (or registering) a message filter, message hook, message handler, event filter, event hook, event handler, preprocessing callback, post-processing callback, device driver, and device driver filter at the application program installation time, application startup time, or after an application program has started up, so that an application program operation can be intercepted and examined by an interceptor. (7) Performing program code analysis and modifying application program code statically or dynamically to install interceptors and consequence applicators.

Again, a workstation policy enforcer provides access control. It controls what user can view, edit, send, and so forth. The workstation policy enforcer also addresses problems created by caching and offline operations. For example, Microsoft Outlook can cache e-mail messages on a client computer and a Microsoft Exchange Server policy enforcer cannot control accesses to those cached e-mail messages.

The workstation policy enforcer and document server policy enforcer can individually provide different "use" control and access protection.

In an embodiment of the invention, enforcement of document access control and information usage policies at a point-of-use can be implemented dynamically on a workstation. This policy enforcement technique is sometimes referred to as dynamic point-of-use policy enforcement (DPPE) or on-demand policy enforcement.

When a user access a document on (or managed by or accessible by) a server that is controlled by a policy enforcer from a workstation that is not controlled by a workstation policy enforcer, the document server policy enforcer can perform one of the following tasks to ensure the document access requested will continue to be protected.

(1) Instruct a user to access the document via a terminal server that is protected by a policy enforcer or redirect the document access request to a terminal server.

(2) Instruct the user to access the document through a proxy or gateway that is protected by a policy enforcer or redirect the document access request to the proxy or gateway.

(3) Instruct the user to install a policy enforcer on the workstation or automatically install a policy enforcer on the workstation.

(4) Instruct the user to install an application policy executive (also referred to as application program policy enforcer) in an application program on the workstation that accesses the document or automatically install the application program executive in the application program.

(5) Install executable code (e.g., a script or macro) into the document being requested to enable functions in an application program on the workstation that accesses the document to control access or install one or more code module to add access control functions to the application program. Executable code installation can be performed when the user request a document or executable code can be pre-installed and store on the server.

Dynamic point-of-use policy enforcement may be implemented using point-of-use policy enforcement agent (PPEA). There are three types of point-of-use policy enforcement agents: policy enforcer (discussed elsewhere in this application), application policy executive, and application program scripting host.

An application policy executive is a program module including one or more policy enforcement points and a policy engine, embedded inside an application program. An application policy executive is typically implemented using ActiveX (a Microsoft Windows library), Java library, JavaScript or ECMAScript, Microsoft Windows Visual Basic for Application (VBA), or Microsoft Office macro. Some examples of application policy executive implementations include an ActiveX library installed in a Web browser (e.g., Internet Explorer or Mozilla Firefox), a Java applet installed in a Web browser, or a Microsoft Office add-on installed in a Microsoft Office application (e.g., Microsoft Word, Microsoft Excel, or Microsoft PowerPoint).

An application program scripting host is an environment for executing application scripts. Typically, an application program scripting host is a functionality implemented in an application program (e.g., Microsoft Office macro, or JavaScript support in Web browsers) or operating system (e.g., Microsoft Windows Visual Basic for Application (VBA)). In either implementation, a scripting capability is available to an application program.

When dynamic point-of-use policy enforcement is implemented using policy enforcers, three implementation options are available. In option 1, a policy enforcer can be downloaded to a workstation dynamically and installed on the workstation that does not have a policy enforcer installed when a document or information on a server having a policy enforcer that supports dynamic point-of-use policy enforcement is accessed form the workstation. In addition, policies associate with the workstation or the user, or both, will be deploy to the workstation. The policy enforcer will be able to enforce policies on all application programs and operating system.

In option 2, a document or information access request is reroute to a proxy server or gateway where policy enforcement occurs (i.e., a policy enforcer is installed on the proxy server or gateway).

In option 3, a document or information access request is rerouted to a terminal server (e.g., a Microsoft Windows Server 2005 running Terminal Services or Citrix MetaFrame) where policy enforcement occurs (i.e., a policy enforcer is installed on the terminal server).

When dynamic point-of-use policy enforcement is implemented using application policy executives, an application policy executive will be downloaded to and installed on a point-of-use workstation when a document or information on a server having a policy enforcer that supports dynamic point-of-use policy enforcement is accessed from the workstation. In addition, policies associated with the application or the user, or both, will be deployed to the application policy executive to enforce document access, information usage and application operation control policies associated with the application program. The application policy executive will be able to enforce policies for the application program. In a specific implementation, the downloading and installing of application policy executive for an application program may include installing application policy executives in other application program on the workstation.

When dynamic point-of-use policy enforcement is implemented using application program scripting host, one or more scripts or macros that implement policies associated with a document is injected or embedded into the document. The one or more scripts that implement a set of policies can be translated from an original policy format (such as Blue Jungle ACPL). The step of injecting or embedding one or more scripts or macros can be performed statically or dynamically. Static injection or embedding scripts or macros into a document refers to the altering of an original document and storing the altered document on nonvolatile memory such as a hard disk. Dynamic injection or embedding scripts or macros into a document refers to the altering of document when a document is accessed and the altered document is transferred to the point-of-use workstation. The application program scripting host technique relies on a script execution environment provided by an application to execute the injected or embedded scripts or macros to implement the policy enforcement functions.

In an embodiment of the invention, dynamic point-of-use policy enforcement, a system includes a document server, a workstation, and a terminal server. The document server (e.g., a file server or an e-mail server) is protected by a policy enforcer that supports dynamic point-of-use policy enforcement. The workstation (e.g., a laptop or desktop) does not have a policy enforcer and it denotes a point of use. The terminal server has a policy enforcer and application programs installed.

In a step 1, a user logs on to the workstation and attempts to open a document on the document server.

In a step 2, the policy enforcer on the document server intercepts the document access request (i.e., open) and evaluates policies relevant to the request. One of the relevant policies specifies that the document must be protected at a point-of-use. The policy enforcer queries the workstation for a policy enforcer and cannot find one on the workstation. The document server policy enforcer returns a document different from the requested document to the workstation where the returned document contains a message telling the user to log on to the terminal server to open the requested document.

In a step 3, the user logs onto the terminal server using a terminal server client application and attempts to open the document from the terminal server.

In a step 4, the policy enforcer on the document server intercepts the document access request from the terminal server. Processing of the request is similar to step 2 but the policy enforcer on the document server detects a policy enforcer on the terminal service satisfying the requirement specified in a policy. Opening of the requested document is successful.

In a step 5, the requested document is opened on the terminal server and the policy enforcer on the terminal server controls information usage on the opened document. Since the user uses a terminal server client to access the terminal server, the document is displayed on the workstation but controlled by the terminal server policy enforcer.

In a specific implementation of step 2, the document server policy enforcer returns a document containing a macro or script that automatically setup a terminal server client session for the user. In addition, the macro or script may also cause the document to be opened on the terminal server.

In an embodiment of the invention dynamic point-of-use policy enforcement, a system includes of a document server, a workstation, a policy server and a distribution server. The document server (e.g., a file server or a document management server) is protected by a policy enforcer that supports dynamic point-of-use policy enforcement. The workstation (e.g., a laptop or personal digital assistant) does not have a policy enforcer and it denotes a point of use. The policy server has access to a number of rules or policy abstractions, or both. Policy enforcer software is available for download from the distribution server.

In a step 1, a user logs on to the workstation and attempts to open a file on the document server.

In a step 2, the policy enforcer on the document server intercepts the document access request (i.e., open) and evaluates policies relevant to the request. One of the relevant policies specifies that the document must be protected at a point-of-use. The document server policy enforcer queries the workstation for a policy enforcer and cannot find one on the workstation. The document server policy enforcer returns a document different from the requested document to the workstation where the returned document contains a message telling the user to download and install a policy enforcer before reattempt to open the requested document. The message may also include a hypertext link pointing to a download Web page.

In a step 3, the user accesses the distribution server to download a policy enforcer and installs the policy enforcer onto the workstation. In a specific implementation, a set of policies or policy abstractions, or both, is installed with the policy enforcer. In another implementation, the newly installed policy enforcer contacts the policy server (directly or via other servers) to download a set of policies for the workstation or the user, or both.

In a step 4, with a policy enforcer running on the workstation, the user attempts to open the requested document again and the request is completed successfully.

In a specific implementation of step 2, the document server policy enforcer returns a document containing a macro or script that provides an interactive process to assist the user to download and install a policy enforcer on the workstation.

In an embodiment of the invention dynamic point-of-use policy enforcement, a system includes a document server, a proxy server or gateway, and a workstation. The document server (e.g., a file server) stores documents that can be accessed from a proxy server. The proxy server is protected by a policy enforcer that supports dynamic point-of-use policy enforcement. The workstation (e.g., a laptop or desktop) denotes a point of use. In this example, the proxy server is a Web server.

In a step 1, a user logs on to the workstation. At the workstation, the user logs onto the proxy server using a Web browser to establish a session on the proxy server. Using the Web browser, the user opens a file on the document server.

In a step 2, the policy enforcer on the proxy server intercepts the document access request (i.e., open) and evaluates policies relevant to the request. Using information associated with the document access request (e.g., file path) and the session (e.g., user id), the policy enforcer determines if the document access should be allowed.

In a step 3, if the document access request is allowed, the document is displayed in the Web browser. If the document access request is denied, an error message is displayed on the Web browser.

In a specific implementation of step 2 where the document access request is allowed, the document server policy enforcer embeds JavaScript in the return document to disable functions in the Web browser to implement additional access control functions at the workstation.

In a specific implementation of step 2 where the document access request is allowed, the document server policy enforcer triggers the uploading of an application policy executive and a set of policies in the Web browser on the workstation before returning the document to the Web browser.

In a specific implementation, the proxy server includes an Apache HTTP Server.

In a specific implementation, the proxy server includes a Microsoft Exchange Server with Outlook Web Access support.

In an embodiment of the invention dynamic point-of-use policy enforcement, a system includes document server, a proxy server or gateway, and a workstation. The document server (e.g., a file server) stores documents that can be accessed from a proxy server. The proxy server is protected by a policy enforcer. The workstation (e.g., a laptop or desktop) denotes a point of use. In this example, the proxy server is a terminal server (e.g., Microsoft Windows 2003 with Terminal Services installed) and an application program on the workstation used to access the proxy server is a terminal server access client (e.g., Microsoft Windows XP Remote Desktop).

In a step 1, a user logs on to the workstation. At the workstation, the user logs onto the proxy server using a terminal server access client to establish a connection with the proxy server. Using the terminal server access client, the user opens a file on the document server.

In a step 2, the policy enforcer on the proxy server intercepts the document access request (i.e., open) and evaluates policies relevant to the request. Using information associated with the document access request (e.g., file path) and the connection (e.g., user id), the policy enforcer determines if the document access should be allowed.

In a step 3, if the document access request is allowed, the document is displayed in the terminal server access client on the workstation. If the document access request is denied, an error message is displayed on the terminal server access client on the workstation.

In an embodiment of the invention dynamic point-of-use policy enforcement, a system includes a document server, a workstation, a policy server, and a distribution server. The document server (e.g., a file server or Web server) is protected by a policy enforcer that supports dynamic point-of-use policy enforcement. The workstation (e.g., a laptop or desktop) does not have a policy enforcer and it denotes a point of use. The policy server has access to a number of rules or policy abstractions, or both. Application policy executive software is available for download from the distribution server.

In a step 1, a user logs on to the workstation and attempts to open a file on the document server using an application program (e.g., Internet Explorer, Mozilla Firefox, Microsoft Word, Microsoft Excel, or Microsoft Outlook).

In a step 2, the policy enforcer on the document server intercepts the document access request (i.e., open) and evaluates policies relevant to the request. One of the relevant policies specifies that the document must be protected at a point-of-use. The document server policy enforcer queries the workstation for a policy enforcer or an application policy executive for the application program and cannot find one on the workstation. The document server policy enforcer returns a document different from the requested document to the workstation where the returned document contains executable code (e.g., a script or macro) or instruction to redirect to a different location, or both. In a specific implementation, the document server policy enforcer may return a message telling the user to download and install an application policy executive before reattempt to open the requested document. The message may also include a hypertext link pointing to a download Web page.

In a step 3, the user accesses the distribution server to download an application policy executive and install the application policy executive into the application program on the workstation. In a specific implementation, a set of policies or policy abstractions, or both, is installed with the application policy executive. In another implementation, the newly installed application policy executive contacts the policy server (directly or via other servers) to download a set of policies for the application program or the user, or both.

In a step 4, with an application policy executive running in the application program, the user reattempts to open the requested document and the request is completed successfully.

In a specific implementation of step 2, the document server policy enforcer returns a document containing a macro or script, or a Web page that provides an interactive process to assist the user to download and install an application policy executive in the application program.

In a specific implementation, the policy server and distribution server may be one server.

In an example, the application program is Internet Explorer, the document requested includes a Web page and the application policy executive is implemented as an Internet Explorer add-in module.

In an example, the application program is Mozilla Firefox, the document requested includes a Web page and the application policy executive is implemented as JavaScript.

In another example, the application program is Microsoft Word, the document requested includes a word processing document (e.g., myreport.doc) and the application policy executive is implemented as a Microsoft Office add-on module.

In an embodiment of the invention dynamic point-of-use policy enforcement, a system includes a document server and a workstation. The document server (e.g., a file server, Web server or document management server) is protected by a policy enforcer that supports dynamic point-of-use policy enforcement. The workstation (e.g., a laptop or desktop) does not have a policy enforcer and it denotes a point of use.

In a step 1, a user logs on to the workstation and attempts to open a file on the document server using an application program (e.g., Internet Explorer, Mozilla Firefox, Microsoft Word, Microsoft Excel, Microsoft Outlook).

In a step 2, the policy enforcer on the document server intercepts the document access request (i.e., open) and evaluates policies relevant to the request. One of the relevant policies specifies that the document must be protected at a point-of-use. The document server policy enforcer queries the workstation for a policy enforcer or an application policy executive for the application program and cannot find one on the workstation.

In a step 3, the document server policy enforcer selects a set of polices applicable to the document, the application program and the workstation. For the selected set of policies, the document server policy enforcer identifies an application program scripting host supported by the application program on the workstation, and translates the selected policies into a scripting language supported by the application program scripting host. The requested document is altered to include the translated script or scripts representing the selected policies.

In a step 4, the document server policy enforcer returns the altered document to the workstation where the translated script or scripts is executed inside an application program scripting host to implement the selected policies.

In a specific implementation of step 3, the document server policy enforcer selects a set of policies applicable to the document form its local policy repository. In another implementation, the document server policy enforcer requests a set of policies applicable to the document from a policy server. In yet another implementation, the document server policy enforcer request a script or scripts representing a set of policies applicable to the document from the policy server.

In a specific implementation of step 3, the document server policy enforcer identifies an application program scripting host based on a document type. For example, if a document is a Microsoft Word or Microsoft Excel file, the application program scripting host is Microsoft Windows Visual Basic for Applications (VBA). In another example, if the document type is HTML, the application program scripting host includes a JavaScript or ECMAScript engine.

In a specific implementation of step 3 where the document server stores the altered version of the document, the operation described in step 3 is replaced by locating the altered version of the document.

In an example, the application program is Internet Explorer, the document requested includes a Web page or HTML document and the script or scripts embedded into the document to implement information usage control policies is JavaScript.

In another example, the application program is Microsoft Excel, the document requested includes a spreadsheet (e.g., balancesheet.xls) and the script or scripts embedded into the document to implement information usage control policies is Microsoft Windows Visual Basic for Applications (VBA) script.

In an example where the set of policies applicable to the document denies the user from printing the document, the script or macro (or scripts or macros) embedded in the document is executed when the document is opened in the application program on the workstation where the script or macro (or scripts or macros) disables all print menu items, toolbar buttons and equivalent functions in the application program which effectively denies the user from printing the document.

In another example where the set of policies applicable to the document denies the user from copying the document, the script or macro (or scripts or macros) embedded in the document is executed when the document is opened in the application program on the workstation where the script or macro (or scripts or macros) disable all "Save," "Save As," "Print," "Export," "Send in e-mail," "Send To," "Copy," "Cut," and "Drag-and-drop" menu items, toolbar buttons, and equivalent functions in the application program which effectively denies the user from copy the document or portion of document.

In yet an example where the set of policies applicable to the document denies the user from changing specific cell formulas in the document which includes a spreadsheet, the script or macro (or scripts or macros) embedded in the document intercepts cell edit operations in the application program and blocks the cell edit operation when the operation attempts to change at least one of the specific cell formulas.

A policy language for information system of the invention includes policies and policy abstractions. Policies may also sometimes be referred to as rules, and policy abstractions may also sometimes be referred to as abstractions or variables. There may be any number of policies or abstractions, or both. Typically, an information system will have hundreds, thousands, millions, or greater number of rules. Because many rules are typically used to manage information in a company effectively, there should be a system to effectively managing the policies and policy abstractions.

In an embodiment of the invention, the policies or rules are decoupled from the physical resources using policy abstractions. For example, the following is a policy that says legal documents can only be viewed by legal team. "Legal-Docs" is an abstraction object which is specified separately from the policy. One abstraction may apply to more than one policy.

```
FOR Legal-Docs
ON OPEN
BY Legal-Team
DO ALLOW OTHERS DENY
```

For the above example, both Legal-Docs and Legal-Team are abstractions in the policy. The exact definition of these abstractions is decoupled from the policy. The definition of these abstractions may be:

```
Legal-Docs = document.category = "contract"
  OR document.name = "//legal-server/cases/**"
  OR document.name = "//server1/departments/sales/contracts/**"
  OR message.from = Legal-Team
  OR message.to = Legal-Team;
```

```
Legal-Team = <all users in LDAP group "legal">
    OR <all users in LDAP group "outside-counsel">
    OR user.email = "*@outside-law-firm-1.com"
    OR user.email = "*@outside-law-firm-2.com";
```

A further aspect of the invention is that decoupling of the rules from policy enforcers (or agents) where the rules or policy abstractions, or both, are evaluated. For example, some rules are relevant to server agents while some rules are relevant to client agents. However, user or policy author does not need to know where a rule is applied, the selection (or target binding) process is done automatically. This makes rules management much easier. This also makes supporting different clients and new type of clients easier.

In an implementation, one or more policy deployment directives can be specified in a policy to designate at least one target, target type or target group that the policy should be deployed or transferred to. Some example of a target includes a "Microsoft Exchange Server," or "Apache HTTP Server." A target type may include a laptop computer, personal digital assistant, e-mail server, or instant messenger. A target group includes "marketing computers." If both policy deployment directives and automatic target binding are implemented, the combined benefit of user guided deployment and automatic deployment can be achieved.

Another aspect is that a single policy may be applied to multiple dissimilar policy enforcers. This is another benefit of the decoupling technique of the invention.

In an embodiment of the policy language, policies are specified in a top-down manner. Top-down policy specification is a natural outcome of policy abstraction. Since an abstraction decouples policy specification from policy implementation (e.g., what types of files and files in what directories are considered sensitive), policies can be specified top-down using abstract terms. Such abstract terms can be predefined or captured in a policy abstraction at a later time.

In an embodiment, the policy language is declarative. This means policies can be used to make declarative statement of policy without burdened by implementation details. The declarative aspect of the policy language is another benefit provided by providing abstraction.

Another aspect is the policy language may allow policies to be nested. One policy may call or delegate control to another policy. There may be multiple levels of nesting. Further, a policy may optionally contain a scope that it belongs to. Normally scoping is determined automatically.

Figure 13:
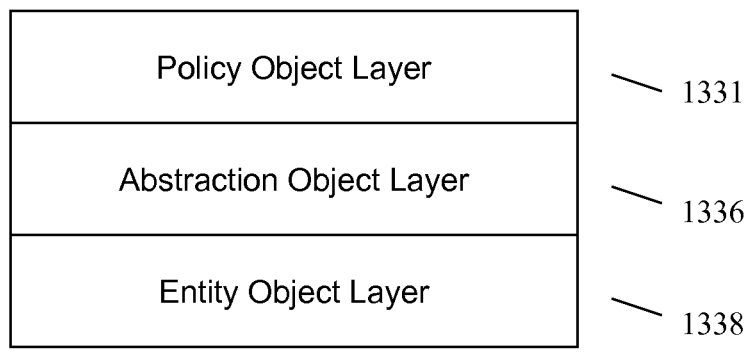
FIG. 13 shows a layer description of an implementation of a policy language system of the invention.

FIG. 13 shows a layer description of an implementation of a policy language system of the invention. A policy language system of the invention may have any number of layers and the structure may be hierarchical, where there are higher and lower level layers compared to other layers. In the FIG. 13 implementation, there are three layers in the structure. There is a policy object layer 1331, abstraction object layer 1336, and entity object layer 1338. In this embodiment, the layers are hierarchical. The policy object layer is higher than the abstraction object layer, which is higher than the entity object layer. Lower layers generally contain more specific and more physically-related information compared to a higher layer.

In brief, the policy object layer is a layer where policies are defined. Policies (or rules) and a specific example of a policy language are discussed in this application. In a policy language system implementation, at least some of the policy objects may have a reference to one or more abstraction objects, which is where variables in the policies are specified, as discussed in this application.

Some of the abstraction objects may reference one or more entity objects. Entity objects include an entity name and a value, the value including at least a reference to a physical entity. An example of a reference to a physical entity, which may be a user, device, file, e-mail message, Web page, result set of a database query, application data object, application program, group of users, group of devices, group of files, or group of application programs.

A specific implementation of the layer description of a policy language system of the invention is the Blue Jungle Compliant Enterprise Active Control System. Active Control System is built on ACPL, a flexible and extensible policy language that allows active control to be defined in business terms for consistent enforcement across enterprise-wide, heterogeneous systems.

ACPL policies can refer to business entities such as "Customer Private Information" or "Financial Systems," to allow a single policy to govern virtually unlimited underlying network resources. In this implementation, policy objects are called ACPL policies and abstraction objects are called policy components. Policy components are used to model business entities and policy functions. Business entities may represent users, location, actions, document resources, application operations, servers, and application programs. Policy functions may include business context, policy actions, and policy obligations. Collectively, these policy components, component services, abstraction engine, component interface, and component packaging service make up a policy component model which corresponds to the abstraction object layer of the layer description of a policy language system.

When applied to information control, a policy object (or policy) may represent a statement that describes a document access or usage situation and define what action a policy enforcer should take when that situation arises. In effect, a policy object represents a rule (or a set of rules) controlling how different categories of users in an organization are allowed to use different categories of documents. For example, one may construct policy objects as combination of abstraction objects that are linked together with operators and other logical constraints, and then further refined the policy objects by applying contextual conditions, such as time of the day. Typically, an organization will construct enough policy objects to cover all potential business situations where some kind of information control is required.

In an implementation of the invention, a policy object may comprise of a set of predefined building blocks (or abstraction objects) strung together according to a precise syntax. Because the abstraction objects are logical representation of specific physical entities, policy objects constructed based on the abstraction objects also possess great flexibility in covering activities (or actions) and entities in the physical network with little regard to how the activities and entities change and evolve over time.

In an embodiment where policy objects are applied to information control, two types of policies (or policy objects) may be defined: access policies and usage policies. The differences between the types of policies are where the policies are deployed and what type of user activity they control.

Access policies are typically deployed to servers (e.g., file servers), client computers (e.g., laptops or desktops), or both. For example, an access policy on a file server controls whether users are allowed to create, read, update, or delete documents that are stored on that file server. An access policy on a client computer can control whether users on that client computer are allowed to create, read, update, or delete documents in specified storage locations (e.g., local disks or remote file shares). An access policy on a client computer can additionally control which applications that a user can use on that client computer. Access policies are useful for controlling access to resources such as documents and particular file servers. To enforce what tasks users can do with documents once they access the documents, usage policies must be deployed.

Usage policies are typically deployed to client computers. In some implementations, usage policies may be deployed to server computers. Usage policies control whether users of that client computer are allowed to perform various application operations such as sending, printing, or copying particular types of files.

Abstraction objects are abstract building blocks that are defined to support the construction of policy objects. For example, information control policies in an organization may be implemented using a set of policy objects. The set of policy objects may reference one or more abstraction objects and the abstraction objects may represent categories or classes of physical entities in an organization that play some roles in information control, or the abstraction objects may represent categories or classes of actions the physical entities may perform. For example, abstraction objects may represent users, computers, applications, resources such as documents, or actions. Typically, abstraction objects do not represent individual real world entities but rather the logical organizations of the real world entities. Abstraction objects provide a layer of abstraction that insulates an organization's information control policies (or policy objects) from changes to the organization's environment such as changes in physical entities.

Common changes that may occur in an organization include employees join and leave the organization, documents being created and deleted, and servers and client computers being purchased and retired. In spite of these changes, by using abstraction objects in a policy, a policy author can write information control policies without needing to know the specifics about the underlying physical entities (such as users, documents, or servers). In a policy enforcement system according to the invention, relationships among information control policies and their underlying physical entities are resolved automatically, whereby allowing information control polices to adapt to changes in a physical environment. When changes in physical entities occur in an organization, information control policies that build on abstraction objects will remain in effect, covering all appropriate physical entities represented by the relevant abstraction objects.

In an example, a policy author may create an abstraction object that represents a category "all users with the job title of Manager" to represent all managers in an organization, rather than listing every manager in the organization by name in a policy object. Once such abstraction object is created, the policy author or another policy author may use the abstraction object as a building block to construct policies (or policy objects) that prevent (or allow) all managers from using specific information in specific ways. By allowing policy author to construct policy objects based on abstraction objects, it means whoever designs policies using abstraction objects does not need any direct knowledge of who the managers are, or who will gain or lose his/her manager title in the future. The policy author needs to know only the managers as a category should be denied (or allowed) access to and use the specific information.

In one aspect of the invention, a policy author may use abstraction objects in any combination to construct policies (or policy objects) to control information access, usage, or both. For example, a policy author may define an abstraction object "Independent Contractors" to represent a class of users, and an abstraction object "Copy, Move, Print, or Send via E-mail or IM" to represent a class of actions. Then, a policy author may combine the abstraction objects in a policy object to define an "eye-only" rule that specifies "all independent contractors may read company documents but may not transmit them in any way." Once the policy object is distributed to policy enforcers in an organization, the policy object (or rule) will be enforced on the operations described regardless of which contractor and which document are involved.

A policy author may define abstraction objects based on his/her knowledge of the physical entities and other entities in an organization regardless of how the abstraction objects may be used in policies (or policy objects). Alternatively, a policy author may define abstraction objects based on the requirements of a set of policies.

While abstraction objects are the building blocks of policy objects, entity objects are the building blocks of abstraction objects. An entity object may represent a physical entity, a logical entity, an event (or action) entity, a contextual entity, and more.

Typically, the physical entities that may be found in an organization include users, recipients, applications (e.g., Microsoft Word), devices (e.g., printer, PDA or smartphone), computers, file servers, directories, files, database records, mailboxes on a mail server, or a Microsoft SharePoint Server object. Some examples of a physical entity specification include 'a user name equals "john.doe",' 'a computer name equals "desktop 005",' or 'a file share starts with "\\serverX\".'

A logical entity is a group of one or more entities. Entities may be organized into a group based on their characteristics (e.g., all spreadsheet files), or manually assigned (e.g., an Active Directory user group "finance staff"). Logical entities are often objects found in a repository (such as user group in a LDAP directory) that are logical representations of physical entities (such as users) found in the same repository. Logical entities may also represent a logic name of a class of entities (e.g., removable media or optical disks). Logical entities may include user groups, mailing list, types of applications (e.g., spreadsheet or instant messenger), types of devices (e.g., PDA), groups of computers (e.g., legal department computers), types of computers (e.g., laptop, desktop or server), file shares, groups of documents (e.g., any files that contain personal private information, documents that are classified confidential, or documents containing customer information), printers, storage devices, removable media, or USB devices.

Event entities represent events that are generated either by hardware or software. An event may be directly or indirectly attribute to a user action such as opening a file using a desktop application or submitting an on-line form using a web browser. An event may also be an attribute of an application program operation such as maturation of a scheduled task. Common event entities include open, save, delete, copy, move, send, and connect.

Contextual entities are often used in constructing policy contexts (described further below). Contextual entities may include time, time ranges, types of connectivity (e.g., VPN or WLAN), bandwidth, point-of-use locations (e.g., New York office), or points of access to a network (e.g., LAN, Internet or dialup).

In addition, there are also entity objects that do not fall into one of the physical, logical, event and context classifications. The entity objects includes universal resource locators, connection strings, commands such as SAP command strings, or query strings such as SQL statements.

There are many sources of entity objects (these sources of entity objects are referred to as "entity object data source" in the following). Typically, an entity object data source provides some of the entity objects require to evaluate a policy object. A policy enforcer may access one or more entity object data sources to complete evaluation of a policy object. Alternatively, a policy enforcer may access a meta entity object data source that provides transparent access to multiple entity object data sources through federation or aggregation of entity object data sources.

In a typically enterprise environment, entity objects may be found on a directory server (e.g., a LDAP server or Microsoft Active Directory), a system or network management server (e.g., HP OpenView), an application server (e.g., Oracle Finance, Microsoft .NET server, or Java 2 Enterprise Edition server), or a database server. Entity objects may also be found in a computer registry (e.g., Windows registry), a performance, system or network management data repository, a database, a configuration file, or a data file. Some entity objects may not be stored in a repository, but collected at a policy enforcement point or accessible to a policy enforcer through an API to an operating system or a program library. In an example, entity objects may be properties of an Active Directory object such as employee's job title, employee's branch location, or name of an Active Directory group.

In a specific implementation of the invention, the Blue Jungle Compliant Enterprise policy enforcement system stores policy objects in a Policy Master (a policy objects database), apportions storage of abstraction objects between the Policy Master and an Information Network Directory (a meta directory of resource abstraction objects and entity objects), and stores entity objects in the Information Network Directory.

The following example illustrates a policy constructed according to the three layer structure. A policy object named "Executives Only" that prevents any user other than executives from accessing documents stored in a restricted folder. The policy object refers to executives defined by an abstraction object named "Executives." The abstraction object comprises of a list of user names where each user name refers to an entity object. The example also shows the three entity objects referenced by the abstraction object.

```
# Policy Object 1 - Executives Only
FOR document.name = "\\server123\restricted\*.doc"
ON OPEN
BY user = Executives
DO ALLOW OTHERS DENY
# Abstraction Object 1 - Executives
Executives = jcarter, gbush, pjones
# Entity Object 1 - JThomas
User.name = jthomas
# Entity Object 2 - WMannings
User.name = wmannings
# Entity Object 3 - PJones
User.name = pjones
```

In an implementation, an example of an operation of the structure is that when there is a change in an abstraction object in the second layer, there will be a corresponding change in any policy object in the first layer including a reference to the abstraction object.

The following example illustrates the effect of changing an abstraction object of the abstraction object layer has on policy objects of policy object layer. The example shows two policies that are design to control reading and copying of documents in a restricted folder. The policies specify a user who is an executive can read and copy documents stored in a restricted folder, but copy operations are recorded in a log. The policies are constructed according to the three layer structure with policy objects "Executives Read" and "Executives Copy," abstraction object "Executives" and entity objects "JThomas," "PJones," and "JConwell." Both policy objects "Executives Read" and "Executive Copy" reference abstraction object "Executives." Abstraction object "Executives" references entity objects "JThomas", "PJones" and "JConwell."

The example shows the two policy objects and their equivalent forms at time t0 and t1 to illustrate the propagation of a change from an abstraction object to multiple policy objects, where t0 precedes t1. At time t0, the two policy objects were enforced at a policy enforcer in an organization. Assuming at a time between t0 and t1, a new executive "John Conwell" joined the organization. Abstraction object "Executives" was updated to include the new executive "JConwell." At time t1, the change in the abstraction object was propagated to the policy enforcer and the policy enforcer began to enforce the policy objects based the changed abstraction object.

To help illustrate the effect of the change, equivalent forms of the two policy objects at time t0 and t1 are provided. The equivalent form of a particular policy object is a functional equivalent of the particular policy object. A comparison of the policy object "Executives Read" in its equivalent forms at time t0 and t1 shows that the change occurred in abstraction object "Executives" is propagate to policy object "Executives Read" at time t1. Similar, further examination of the equivalent form of policy object "Executives Copy" also shows that the change in abstraction object "Executives" is propagated to policy object "Executives Copy" at time t1.

```
# Policy definition at time t0 - before change to abstraction object
# Policy Object 1 - Executives Read
FOR document.name = "\\server123\restricted\*.doc"
ON OPEN
BY user = Executives
DO ALLOW OTHERS DENY
# Policy Object 2 - Executives Copy
FOR document.name = "\\server123\restricted\*.doc"
ON COPY
BY user = Executives
DO (ALLOW AND LOG) OTHERS DENY
# Abstraction Object 1 - Executives
Executives = jthomas, pjones
# Entity Object 1 - JThomas
User.name = jthomas
# Entity Object 2 - PJones
User.name = pjones
```

```
# Policy definition at time t1 - after change to abstraction object
(adding one executive)
# Policy Object 1 - Executives Read
FOR document.name = "\\server123\restricted\*.doc"
ON OPEN
BY user = Executives
DO ALLOW OTHERS DENY
# Policy Object 2 - Executives Copy
FOR document.name = "\\server123\restricted\*.doc"
ON COPY
BY user = Executives
DO (ALLOW AND LOG) OTHERS DENY
# Abstraction Object 1 - Executives
Executives = jthomas, pjones, jconwell
# Entity Object 1 - JThomas
User.name = jthomas
# Entity Object 2 - PJones
User.name = pjones
# Entity Object 3 - JConwell
User.name = jconwell
```

```
# Policy definition (in equivalent form at time t0 - before change to
abstraction object
# Policy Object 1 - Executives Read
FOR document.name = "\\server123\restricted\*.doc"
ON OPEN
BY user = jthomas, pjones
DO ALLOW OTHERS DENY
# Policy Object 2 - Executives Copy
FOR document.name = "\\server123\restricted\*.doc"
ON COPY
BY user = jthomas, pjones
DO (ALLOW AND LOG) OTHERS DENY
# Entity Object 1 - JThomas
User.name = jthomas
# Entity Object 2 - PJones
User.name = pjones
```

```
# Policy definition in equivalent form at time t1 -
after change to abstraction object
# (adding one executive)
# Policy Object 1 - Executives Read
FOR document.name = "#server123#restricted#*.doc"
ON OPEN
BY user = jthomas, pjones, jconwell
DO ALLOW OTHERS DENY
# Policy Object 2 - Executives Copy
FOR document.name = "#server123#restricted#*.doc"
ON COPY
BY user = jthomas, pjones, jconwell
DO (ALLOW AND LOG) OTHERS DENY
# Entity Object 1 - JThomas
User.name = jthomas
# Entity Object 2 - PJones
User.name = pjones
# Entity Object 3 - JConwell
User.name = jconwell
```

In an implementation, an example of an operation of the structure is that when there is a change in a value of an entity object in the third layer, there will be a corresponding change in any policy object in the first layer including a reference to the entity object or an abstraction object in the second layer including a reference to the entity object.

In other implementations of the invention, there may be a different number of layers. Information in two or more layers of one system may be presented in a single layer in another system. For example, an implementation of the invention may have two layers only, a policy object layer and an abstraction object layer, where the entity object layer is provided in the abstraction object layer. In further implementations of the invention, there may be two, three, four, five, six, seven, eight, or more layers.

As has been discussed, the policy language system of the invention may be applied to multiple types of information. The policy language system of the invention may also be applied to many different types of applications not only information or document management. Other applications may include policy management for network traffic, firewall, e-mail, spam, digital media rights, and many others. For example, when managed using a policy language of the invention, network traffic or digital media rights will be managed using policies that reference abstractions, which may in turn reference entity information.

This application describes the structure of a policy language. Although a particular structure and syntax are described, it is not intended that the invention be limited to the structure of syntax described. There are many possible structures and syntaxes for a policy language, and any of these may be used to implement a system of the invention.

In an implementation of the invention, a plurality of policy objects in the policy object layer implements information usage control on a computer system, where a policy enforcer (discussed elsewhere in this application) detects usage of information, evaluates policies (or rules) specified by the policy objects, and enforces policies according to outcomes of policy evaluation.

In the implementation of information usage control, an entity object layer comprises of a plurality of entity objects representing any of: resource (e.g., file, e-mail, Web page, on-line report, or result set of a database query), user, action, time, location, connectivity (e.g., VPN, WLAN, dialup, RDP, VNC, or latency), application (e.g., Microsoft Word, SAP Frontend client application, spreadsheet, or instant messenger), and more. An entity object may comprise of a name (or identity) and a value. A value may be an integer, a floating point number, a Boolean value, a string or a reference. Further, an entity object may also comprise of a name and multiple values, or a name and a data object. In one embodiment, entity objects may be stored in a LDAP server, a database, a system registry, a configuration file or any combination thereof. An entity object may be reference by its name (or identity). In an embodiment, an entity object is called one of event, resource, subject or context in a policy language described further below. For example, a reference to an entity object may take the form of: user="John Doe," action=OPEN, application="Microsoft Word," computer="Jane's desktop," or location="Boston Office."

In the implementation of information usage control, an abstraction object layer comprises of a plurality of abstraction objects. An abstraction object is typically a logical representation of a collection of entity objects. An abstraction object may comprise of a name (or identity) and an expression that refers to one or more entity objects. An abstraction object may also refer to another abstraction object. One or more abstraction object may refer to a particular entity object in the entity object layer. In an embodiment, an abstraction object is called a policy abstraction in a policy language described further below. For example, a reference to a policy abstraction may take the form of: user=Finance, document=Legal-Documents, computer=Guest-Workstations, application=Instant-Messenger, location=Branch-Office, or connectivity=Remote.

In the implementation of information usage control, a policy object layer comprises of a plurality of policy objects that refer to one or more abstraction objects in the abstraction object layer and one or more entity objects in the entity object layer. One or more policy objects may refer to a particular abstraction object in the abstraction object layer. One or more policy object may refer to a particular entity object in the entity object layer. In an embodiment, a policy object is called a policy in a policy language described further below.

In an implementation of the invention, a plurality of policy objects in the policy object layer implements document access control on a computer system, where a policy enforcer (discussed elsewhere in this application) detects accesses to documents, evaluates policies (or rules) specified by the policy objects, and enforces policies according to outcomes of policy evaluation.

In the implementation of document access control, an entity object layer comprises of a plurality of entity objects representing any of: resource, subject, event, and context. An entity object may comprise of a name (or identity) and a value. An entity object may also comprise of a name and multiple values, or a name and a data object. Above the entity object layer is an abstraction object layer which comprises of a plurality of abstraction objects. An abstraction object is typically a logical representation of a collection of entity objects. An abstraction object may comprise of a name (or identity) and an expression that refers to one or more entity objects. An abstraction object may also refer to another abstraction object. One or more abstraction object may refer to a particular entity object in the entity object layer. The layer above the abstraction layer is a policy object layer which comprises of a plurality of policy objects. A policy object may refer to one or more abstraction objects in the abstraction object layer, one or more entity objects in the entity object layer, or combination of both. One or more policy objects may refer to a particular abstraction object in the abstraction object layer. Similarly, one or more policy object may refer to a particular entity object in the entity object layer. In an embodiment, the objects in the three layers described here represent elements in a policy language describe below, where a policy object is referred to as a policy, an abstraction object is referred to as a policy abstraction, and an entity object is referred to as one of event, resource, subject or context.

A policy language of the invention may include a number of terms where many of them are optional under certain circumstances and a policy can be built from zero or more of each term, in any combination, including a logical expression, mathematical expression, or statement of any sort (including Blue Jungle ACPL or other variations). These can be nested as needed or desired. When a term can be optional under certain circumstances, this means a reaction rule generally has at least one event to react to and one effect to describe the control action. Others terms are optional. However, for a maintenance rule, the event may be optional (normally, an internal event is included) and the effect is not required. In a maintenance rule, an obligation task or a remediation task is likely used for the rule to be useful. However, one can alter the policy language syntax and move the task into the premise making the task a side effect of a condition. So tasks are not necessary because deployment can occur even when tasks are not specified.

Below is an outline of some terms in an implementation of a policy language. Although they are referred to as terms, they may also be called term elements.

A rule or policy includes an expression. A premise can be an expression or statement. More specifically, a premise can contain an expression, and an expression can be a statement. An expression may be "a=true and b=c." An expression may also include a comma delimited list. For example, one may check whether an action is one of the actions listed in a comma delimited list. A statement may be "FOR expression ON expression BY expression DO statement," or any non-logical or mathematical expression. As in the above example, a statement includes expressions, potentially multiple expressions, each of which may be nested. The statement may also include nested statements.

policy := premise + consequence + directives

A premise generally refers to terms such as events, resources, subjects, context, policy abstractions, and directives. Not all of the terms in a premise are required. A premise is sometimes called a condition. A premise can be a simple Boolean expression that evaluates to true or false at run time, a simple statement with at least one expression, or a complex statement composes of multiple parts, each part consists of nested statements or subexpressions, and more. Any one of the above terms can appear one or more time in an expression, a subexpression or a statement. Each term can also appear in more than one expression, subexpression or statement within the premise. A consequence generally refers to an effect, obligation tasks, or remediation tasks. For a policy that implements control function, an effect is required but obligation tasks and remediation tasks are optional. In a policy that does not implement control function, an effect is optional. A policy can contain any number of directives to assist in policy deployment, affect policy evaluation or carry instruction that influence any one of the stages in a policy lifecycle.

Below are more details on a structure of a policy component or parameter in a pseudo language format. A policy component is typically defined using an expression or a statement and this expression or statement may include a policy abstraction. An expression or statement may include any number of policy abstractions, such as no policy abstractions, or one or more policy abstractions. A policy can contain an expression or a statement. A policy abstraction can be nested.

The ":=" symbol specifies the term on the left-hand side (LHS) can be expressed with what is specified on the right-hand side (RHS). The "{ }" symbols denote a set of terms where any combination of one or more of such terms can form a specification where the specification includes a list, an expression, or a statement. The " . . . " symbol denotes additional terms not completely enumerated.

premise := {events, resources, subjects, recipients, context, historical events, policy abstractions, directives}
consequence := {effect, delegate, obligation tasks, remediation tasks, directives}
policy abstraction := {events, resources, subjects, context, policy abstractions, directives}
event := {actions, exceptions, scheduled events, internal events, external events, directives, ...}
resource := {documents, containers, application programs, devices, networks, subnets, resource sets, directives, ...}
subject := {users, user groups, application programs, devices, directives, ...}
recipient := {users, user groups, e-mail addresses, mailing lists, application programs, directives, ...}
context := {time, locations, organizational units, connectivity, events, resources, subjects, policy abstractions, directives, historical data, activity statistics, external data, ...}
document := {file system objects, e-mail messages, data objects managed by a messaging server, data objects managed by a collaboration server, data objects managed by or served by a Web server, data objects managed by a portal server, data objects managed by a document management system, data objects managed by a content management system, data objects managed by an application server, ...}
container := {containers in an application server, virtual machines hosting application programs, virtual machines hosting operating systems, workflows, discussion groups, ...}
application program := {word processors, spreadsheets, e-mail clients, instant messengers, command shells, financial applications, office productivity applications,

```
Microsoft Excel, Yahoo Messenger, ...}
device := {desktop computers, laptop computers, servers, personal digital assistants,
smart phones, thin clients, information kiosks, legal department computers, database
servers, cash registers, engineering-server-128, 31.112.100.1, storage devices,
networking devices, ...}
resource set := {groups of documents, groups of application programs, groups of devices,
groups of network addresses, categories in a document management system, ...}
connectivity := {VPN, LAN, WLAN, WAN, Bluetooth, Internet, DSL, ISDN, dialup,
bandwidth, subnet address, ...}
effect := {ALLOW, DENY, INDETERMINATE, query user, delegate, custom effect,
...}
delegate := {evaluate another policy or set of policies locally, invoke evaluation of a
policy or a set of policies in a another policy engine on the same device or different
device}
obligation task := {LOG, NOTIFY, ARCHIVE, ENCRYPT, MODIFY, custom tasks,
...}
remediation task := {ERASE, CLEANUP, custom tasks, ...}
```

There may be a premise policy component, which identifies what the policy is for. For example a premise policy component may be for certain documents or information, or classifications of documents or information, or devices or portion of a network.

A premise may be described using a statement or an expression containing events, resource, subjects, contexts, policy abstractions or directives, or combinations of these, or other statements or expressions. The statement can be a simple statement, or a complex statement containing multiple nested statements and expressions, or any other manner of making a statement. When evaluated with a collection of input data (including data of an intercepted operation), the statement determines whether a policy is relevant to the policy evaluation request (the consequence defined in the policy does not apply if the policy is not relevant), and if the policy is determined to be relevant, what part of the policy consequence will apply to the determination of a final consequence.

For example, in a policy that performs control function, there may be a positive consequence and a negative consequence defined in a policy. In this case, a statement of a relevant policy determines whether the positive consequence or negative consequence will apply. In another example, for a policy that does not implement control function, there may be only one consequence, and the statement only need to determine if a policy is relevant before the consequence will be used in determining the final consequence. The expression may be given in Boolean, string, keyword, or integer format, or any other manner of making an expression. There may be subexpressions for event, resource, subject, context, or directive, or combination of these.

In a specific implementation, a policy language definition may specify that only one policy may be relevant to a policy evaluation request. In this case, policy evaluation involves selecting the relevant policy based on a set of input data associated with a policy evaluation request. The relevant policy selection process includes evaluating the statement or expression in a policy to determine if the policy is relevant. The evaluation step can be carried out on a policy in its native format, or in any other forms including result of optimization, transformation (like from text to binary), or translation (from one policy language to another policy language). Once a policy is determined to be relevant, the outcome of policy evaluation will include the applicable portion of the consequence.

The following covers policy language and policy engine that support more than one relevant policy associated with an operation. In this case, there will be more than one policy consequence (one from each policy) and the result will be combined with an combining algorithm. There are many possible different algorithms, including taking the first policy consequence, one deny will deny all, one permit will permit all, and so forth.

In a further implementation, a special policy may override a combining algorithm or alter the function of a combining algorithm, therefore changing the outcome of policy evaluation. For example, an organization has a set of policies that dictate sending confidential information via e-mail messages by an organization personnel. When a consultant is hired to work on a set of confidential documents, a policy author writes an ad hoc policy to temporarily override the normal access control policies on the set of confidential documents by the consultant for a specific period of time on a specific computer that is protected by a policy enforcer.

In a specific implementation, a policy language definition may specify that one or more policies may be relevant to a policy evaluation request. In his case, policy evaluation involves selecting all relevant policies based on a set of input data associate with a policy evaluation request. The relevant policy selection process includes evaluating the statement or expression in a policy to determine if the policy is relevant. The evaluation step can be carried out on a policy in its native format, or in any other forms including results of optimization, transformation (like from text to binary), or translation (from one policy language to another policy language). Once a policy is determined to be relevant, the applicable portion of the consequence will be considered together with applicable portion of consequences of other relevant policies to determine a final outcome of policy evaluation.

For the premise, an event that a policy associates with can be an action, exception, scheduled event, internal event, or external event. The most common event for policies that implement control function is the "action" event. A system that implements control function normally implements an authorization process which can include one or more interceptors intercepting user actions, application program operations or operating system operations, or application program logic that performs authorization before user actions or application program operations are carried out. The authorization process can be applied to user actions, application or operating system events or operations. Interception can occur at an application program, at operating system library, and at device driver.

For example, in a financial application (e.g., Bloomberg or Fidelity trading application), an action may correspond to a trading order submission operation. In this case, the trading order submission operation is intercepted (or detected), information related the intercepted action is forwarded to a policy decision point, and consequence is applied according to the policy decision produced by the policy decision point.

Another type of event is "scheduled event." The scheduled event involves a scheduler which may be running locally or remotely. Policy evaluation is triggered when a scheduled event matures. A common use of a schedule trigger includes carrying out document retention policy by deleting documents older than, for example, 90 days or 7 years, transferring document to archive storage, encrypting confidential documents that have not be properly protected, and performing an auditing or investigative task that requires collecting all documents meeting a certain criteria.

An "internal event" is one generated by a policy engine or other components of a system of the invention. Such event may be generated as a result of a policy evaluation request or a result of an activity data analysis operation.

An "external event" is one that is invoked by another application outside of a system of the invention. Such an application is normally a third party application integrated with the system of the invention through a software development kit (SDK). Third-party application integration can be extremely useful because in a specific implementation where policy enforcers are deployed company-wide managing all types of information, the management system has access to information in a distributed environment without going through additional authentication and authorization processes. For example, a customer relationship management (CRM) application may instruct the management system to archive all documents related to a customer on closing of an account. This may include rolling up files on file servers, and desktop and laptop computers, e-mail messages on mail servers and all mail clients, documents in document management systems, and databases.

There may be a consequence policy component. The consequence may include effect, obligation, or remediation tasks, or combinations of these, or others. Once the policy is identified as relevant to a particular policy evaluation request, there will be a corresponding consequence.

There may be an effect policy component. An effect is normally associated with a policy that implements control function. The effect of such policy may include allow, deny, indeterminate, query user, delegate, custom effect, or others. Allow may refer to allowing access to some information. Deny may refer to disallowing access to some information.

There may be an obligation policy component. The obligation parameter may include log, notify, archive, encrypt, or modify, or any combination of these, or others. Log instructs the system to log an event or activity. Notify instructs the system to notify an individual or user (such as sending an e-mail) when a certain event occurs. Archive instructs the system to archive information. For example, for particular e-mails, they may need to be archived for compliance with securities or other laws. Encrypt instructs the system to encrypt information. For example, for some e-mails, which may include a specific type of e-mail or an e-mail to a particular addressee, or just someone outside the company, the system will automatically encrypt the e-mail before it is sent. Modify instructs the system to modify the information associated with policy evaluation request. An example of a modify obligation may change the subject line of an e-mail message to include a tag element to identify the message is under export control or should consider confidential.

There may be a remediation policy component. Remediation refers to tasks not directly related to current policy evaluation request that ought to be carried out. Remediation tasks can be any specified task.

There may be a delegate policy component. The delegate parameter may be used to pass operation to (or call) another policy. Using the delegate parameter, the result of executing a first policy may be to include executing a second policy, different from the first policy.

In some policies, the policy consequence may include a positive consequence, a negative consequence, and optionally an indeterminate consequence. A positive consequence is adopted when evaluation of a premise produces a positive result. A negative consequence is adopted when evaluation of a premise produces a negative result. An indeterminate consequence is adopted when evaluation of a premise cannot be completed. As an example, evaluation of premise can fail to complete if a premise specifies an input value that is not available or contains an invalid value.

Other policies may include just one policy consequence which is adopted whenever a policy is determined to be relevant. Policies may elect to support any combination of positive consequence, negative consequence and indeterminate consequence.

Depending on how a policy engine is implemented and whether it supports one or more policy combining algorithms, the meaning of adopting a policy consequence or a portion of a policy consequence also varies. In a policy engine supporting only one relevant policy per policy evaluation request, or a policy engine that selects the first relevant policy, or a policy language syntax that supports specifying policy evaluation should based on first relevant policy in a policy set, the relevant policy's consequence or portion of the relevant policy's consequence will become the outcome of policy evaluation.

On the other hand, if policy evaluation can result in more than one relevant policy, the combined results of all relevant policies should be used to determine the outcome of policy evaluation. In such situation, a combining algorithm should be used. Some common combining algorithms include deny-override and permit-override. A deny-override combining algorithm specifies that if evaluation of the premise of any relevant policy result is a deny effect, the outcome of the policy evaluation is deny. A permit-override combining algorithm specifies that if evaluation of the premise of any relevant policy result is a permit or allow effect, the outcome of the policy evaluation is permit or allow.

A policy effect is not required in all policies. Typically, a policy that implements control function should include at least a positive policy effect. If a negative policy effect is not specified in the same policy, the negation of the positive policy effect is assumed. The policy effect of a policy that implements control function may include ALLOW, DENY and INDETERMINATE. For policy associated with a policy evaluation request caused by user interaction with a system, a policy engine may support querying user for a policy effect. In this case, the policy effect provided by a user will be adopted.

Furthermore, a policy can delegate the determination of a policy effect to another policy to be evaluated using the same input data in the same policy engine or in another policy engine. In this case, the outcome produced by the delegated evaluating a policy or a set of policies is adopted. Such delegation of policy evaluation can apply to a positive policy effect, a negative policy effect, or an indeterminate policy effect, or any combination of these.

The policy language structure described can also support an extension mechanism that allows a policy effect to be produced by a custom effect handling function. For example, custom policy effect handler may be implemented in a method (or function or procedure) in an in-house application program. One or more methods in the in-house application program can call a policy engine in a policy enforcer to invoke policy evaluation. The result of policy evaluation can be a custom policy effect that can be handled by the one or more methods (e.g., execute different code based on the value of a custom policy effect). In this case, execution of some functionalities in the in-house application program can be controlled by a set of policies defined by a policy author.

Obligation refers to tasks related to a policy evaluation request that is being processed that a policy engine is obliged to complete. An obligation may include logging, notifying a user or a management system, archiving certain data associated with the policy evaluation request, encrypting data associated with the policy evaluation request, or modifying the data associated with the policy evaluation request, or any combination of these, and more. Remediation refers to tasks not directly related to current policy evaluation request ought to be carried out. Remediation tasks can be any specified task. For example, when a user changes jobs within an organization, the user may not be given access to information the user previously had access to, a policy may specify a remediation task that deletes the files the user copied onto a hard drive of his system.

There may be an action policy component. Some examples of actions applied to document access control include open, save, print, copy, delete, and move. There may be other actions a system watches for or handles. Open may be opening a document or other information such as an e-mail. Save may be saving a document or other information such as e-mail. Print may be printing a document or portion of a document. Copy may be copying a document or other information such as an e-mail. Delete may be deleting a document or other information such as an e-mail.

Move may be moving a document or other information such as an e-mail. Moving may include actions such as moving information from one folder or directory to another, from one server to another server, or from one machine to another machine, or generally from location to a different location.

The semantics of policy actions is specific to what type of application a policy is intended for. For example, policy actions for application usage control may include print, send, forward, cut, paste, drag, drop, edit formula, edit macro, edit script, change document property, editing portion of a document, connect to the network and so forth.

There may be a subject policy component. A subject may include users, user groups, applications, devices, policy abstractions, or combinations of these, or others. An example of users may be specifically identified users of the system. They may be specified using a user name, a user identifier, or other similar identifier. An example of user groups may be users who are in a particular department, such as the legal or accounting department. User groups may also include those defined in a directory server (such as a LDAP server).

There may be a recipient policy component. A recipient may include users, user groups, e-mail addresses, mailing lists, application programs, or combination of these, or others. An example of users may be specifically identified users of the system. They may be specified using a user name, a user identifier, or other similar identifier. An example of user groups may be users who are in a particular department, such as the legal or accounting department. User groups may also include those defined in a directory server (such as a LDAP server). An example of a mailing list may be a mailing list managed by a mail server or a mail client application.

There may be a device policy component. A device may be specific workstations. For example, some workstations may be designated as public workstations and more security is used when a user or person accesses information of the system using a public workstation. Devices may also include types of devices such as laptops, desktops, personal digital assistants, smart phones, information kiosks, terminal servers, database servers, network attached storages, storage devices, file gateways, network devices, firewalls, routers, load balancers, switches, and so forth. Devices may also include groups of computers which may specify devices in the finance department, engineering workstations, branch office computers, and so forth.

There may be an application policy component. An application may be software such as Microsoft Word, Yahoo Instant Messenger, Microsoft Messenger, Skype, Microsoft Outlook, Qualcomm Eudora, Oracle database application, a Microsoft Office application, a word processing program, e-mail program, photo manager, file manager, database server, web server, messaging server, or Apache server.

There may be a context policy component, which is a context under which the policy is applied or not applied (or relevant or not relevant), or a policy expression should evaluate to true or false. A context may include a time, location, organizational unit, connectivity, or other. A time is a time period, such as when a policy goes into effect or becomes no longer effective. A policy may be apply or be restricted based on a location, such as a group of users, but only at a specific location. For example, by using an appropriate combination or subject and context, a policy may apply to members of the accounting department in California, but not in Texas.

There may be a "historical event" policy component. The historical event policy component is part of a premise of policy which specifies one or more events that need to happen before the current event. The historical event component may also specify a time window in which the historical events should be inspected. The historical event component may also specify whether historical events should occur in a specific order. Other parameters that a historical event component may specify include whether historical events should occurs in a specific order, number of times each historical event has occurred, or number of times a specific list of historical events have occurred.

The context policy component may contain a simple expression that specifies a time or location. It can also specify a complex expression including any combination of events, resources, subjects, policy abstractions, historical data, activity statistics, external data, and more.

There may be a resource policy component. A resource may include documents, containers, application programs, devices, networks, subnets, resource sets, policy abstractions, or directives. Documents may include: file system objects such as files and directories; data objects managed by a messaging server such as e-mail and contacts; data objects managed by a collaboration server such as discussion threads, whiteboards, shared folders, calendars and contacts; data objects managed by a document management systems such as files, messages, document groups, categories, workflows and indexes; data objects managed by a portal server such as HTML pages, JSP pages, ASP pages, portlets (i.e., Java Community Process JSR 168 Portlet Specification), widgets, files and discussion threads, and more. Containers may include containers in an application server such as J2EE application servers, containers hosting application programs such as those supported by Solaris 10 or Microsoft Windows Vista, virtual machines such as Java virtual machines or Python virtual machines, containers hosting operating systems such as VMWare Virtual Server and Microsoft Virtual Server 2005. A resource policy component may also specify an application program, a group of application program such as "Microsoft Office Applications," "operating system utilities," or a type or class of application program such as spreadsheet and instant messenger.

There may be a connectivity policy component. The connectivity parameter may include VPN, LAN, WLAN, WAN, Bluetooth, Infrared, Internet, DSL, ISDN, dial-up, or bandwidth, or a combination of these. These parameters denote a type of connection that is being used to connect to the system. VPN is a virtual private network connection. LAN is a local area network connection, such as Ethernet. WLAN is a wireless local area network such as a Wi-Fi, 802.11a, 802.11b, 802.1g, 802.11n, Wi-Max, or other wireless network. Bluetooth is a wireless connection. Dial-up refers to connecting through a phone line, typically using a modem. Bandwidth refers to connecting to the system with a particular bandwidth, such as 56K bits per second, 10 megabits per second, 100 megabits per second, or 1 gigabits per second.

There may be a "policy abstraction" component. The policy abstraction component contains a statement or expression. The statement or expression may evaluate to a string, integer, floating point, or Boolean value. The statement or expression may also evaluate to a compound object. Typically, a policy abstraction contains a Boolean expression.

In some implementation, a policy abstraction may include two or more variable definitions. Each variable in the policy abstraction includes a name and a definition. A variable definition may comprise an expression or a statement where the expression or statement may refer to another variable in the policy abstraction or another policy abstraction.

There may be a directive component. The policy directive component may be used to provide instruction to a policy engine, or instruct a policy engine that a policy should meet certain requirement. For example, a policy may contain a directive that instruct the policy engine to ensure that the destination of a copy operation be protected by a policy enforcer. The policy directive component may also be used to instruct policy deployment logic what type of target a policy is designed for so that the policy can be deployed to an appropriate target. For example, a policy is design for Microsoft Exchange Server, a policy author can add a directive to the policy to assist policy deployment. In another example, a policy may be appropriate to a specific version of Linux operating system, a policy directive can be added to ensure correct policy deployment.

There may be a historical data component, which may also be referred to as activity data. A historical data component may specify recent event data, aggregated event data, or statistical data stored in volatile memory or nonvolatile memory. Historical data may be stored in a historical database. In system, as shown in FIG. 5, there may be an intelligence server designated to handle this historical or activity data. The historical database may also be referred to as a log and intelligence repository. In other implementations, the historical data and historical data gathering may be incorporated in the policy server. In other words, the policy server and intelligence server functions may be provided by a single server.

Unlike existing entitlement or access control system (including ACL-based solution) where control access to resources is based on policies specifying who can access a resource (e.g., owner or users who are given read or write access) and what action can be applied to a resource (e.g., create, read, write or edit, delete, or visible to other users), the policy language in the invention allows who, what, when, where, how, to whom, or any combination of these to be expressed in a policy.

For a policy of the policy language, the "who" element of the policy may be specified using a subject policy component. For example, a subject policy component may specify who can read a document, or who can send confidential document to a particular recipient.

The "what" element in a policy of the policy language may be specified using a resource policy component, an event policy component, or any combination of these. For example, a policy may specify what resources may be accessed by a user, or what action a user may carry out on a resource.

The "when" element in a policy of the policy language expresses event and time aspects of a policy. The "when" element may be specified using an event policy component, a context policy component, or any combination of these. For example, a policy may specify when a particular action is invoked by a user, and what obligations (or tasks) should be implemented. In this case, the "when" element is the action invoked by the user. In another example, a policy may specify when an event is detected at a particular time, what consequence should be implemented. In this case, the "when" element refers to the particular time which may be a time of a day, a time range, a day in a week, or others.

The "where" element in a policy of the policy language expresses the location aspect of a policy, and it may be specified using a context policy component. In one example, a policy may specify a user can only access a resource within a company's main office. In this case, the "where" element is the main office. In another example, a policy may specify if a user access a resource from a computer that is not secure, the access should not be allowed. In this case, the "where" element refers to the computer.

The "how" element of a policy of the policy language expresses the mechanism through which a resource is accessed. The "how" element may be specified using at least one subject policy component, context policy component, or combination of these. For example, a policy may specify if a user access a document through a type of connectivity such as VPN or LAN, the access should be allowed. However, if a user access a document through connectivity such as WLAN, the access should not be allow. In this case, the "how" element refers to connectivity types such as VPN, LAN or WLAN. In another example, a policy may specify if a user accesses a document through a specific application program such as a FTP client application, the access should not be allowed. In this case, the "how" element refers to a specific application program.

The "to whom" element of a policy of the policy language expresses the recipient aspect of a policy, and it may be specified using recipient policy component. For example, a policy may specify a confidential document may be sent only to personnel within a company. In this case, the "to whom" element refers to personnel within a company which may be specified based on a user group, a domain name in an e-mail address, or others.

In a specific implement of the policy language that does not include a recipient policy component, the "to whom" element may be implemented using a resource policy component. In this case, the recipients who are allowed to (or not allowed to) receive a resource may be specified in a resource policy component.

The Blue Jungle ACPL is a specific implementation of a policy language described in this invention. In particular, ACPL comprises of ACPL Policies and Policy Components where an ACPL Policy corresponds to a policy of the policy language and a Policy Component corresponds to a policy abstraction of the policy language.

Below is a specific implementation of a policy language including key words or tokens. The tokens in this example are FOR, ON, BY, WHERE, DO, OTHERS, ALLOW, DENY, AND, OR, and NOT. In an implementation, the tokens may be case sensitive and they may be typed in all capitals to indicate to the system they are tokens. However, in other implementations, the tokens of the language may be case insensitive and the lower case words will be recognized by the system as being tokens.

```
policy :=
    FOR <resource expression>
    ON <event expression>
    BY <subject expression>
    WHERE <context expression>
    DO <positive consequence> OTHERS <negative consequence>
    positive consequence := effect AND <obligation tasks> AND
    <remediation tasks>
    negative consequence := effect AND <obligation tasks> AND
    <remediation tasks>
```

The policy language includes a number of elements. The premise is comprised of a resource element (or FOR element), an event element (or ON element), a subject element (or BY element), and a context element (or WHERE element). The consequence is comprised of a positive consequence element (or DO element) and a negative consequence element (or OTHERS element). Following the FOR token, there is a resource expression. Following the ON token, there is an event expression. Following the BY token, there is a subject expression. Following the WHERE token, there is a context expression. Following the DO token, there is a positive policy effect and optionally a list of obligation tasks each separated by an AND token and a list of remediation tasks each separated by an AND token. Following the OTHERS token, there is a negative policy effect and optionally a list of obligation tasks each separated by an AND token and a list of remediation tasks each separated by an AND token. Not all elements in a premise are required. Negative consequence element is also optional.

The resource element (or FOR element) in the policy language specifies a logical expression (i.e., resource expression) that describes one or more policy abstractions (e.g., document=Confidential OR message=Sensitive), or one or more document attributes and corresponding matching patterns (e.g., 'document.category="Confidential" AND document.name="//server1/user/**"', or 'message.from=NOT Employee OR message.to < >"*@partner-company.com"'), or both.

A resource may have a name and a number of attributes. The resource expression may cover any type of information including files, e-mail or data object. Information may also be referred to as a resource. A file is a common resource object. File resource expression may contain: (1) Directory, file path, file name, uniform resource identifier (URI), or uniform resource locator (URL). An expression may contain wildcard characters or other patterns defined by a regular expression. This may be referred to as a resource name pattern. An example is "//server1/user/**" which potentially has more than one file or resource. (2) File system attributes. Common attributes include size, timestamps, owner, and type.

(3) Embedded file attributes. These are attributes shown in file property dialog in Windows. They are embedded in Microsoft Office documents. Some common attributes are author, title, and description. Other embedded file attributes include Windows COM structured storage properties, Adobe PDF file properties, HTML header and meta data tags, XML meta tags and custom tags designed to carry document properties and MIME header elements. (4) Extended file system attributes. These are file system specific attributes. (5) Derived attributes. These are extended attributes in a specific embodiment of an information system of the invention.

(6) User input data. These are our extended attributes that store user classification data.

(7) Content filtering attributes. These are our extended attributes generated through content analysis. (8) Content classification attributes. These are our extended attributes generated through content analysis.

E-mail has its own attributes including to, from, cc, bcc, and subject. E-mail is among the types of information covered by the system. Data object attributes are application specific.

The event element (or ON element) in the policy language specifies a list of actions, exceptions, scheduled events, internal events, and external events.

An event expression may include any of the following:

(1) Action, which is produced by an interceptor which may intercept inside an application, at operating system, at network protocol driver, and at system device driver. Action can also be provided by application program logic in an authorization process. Common actions for document control and application usage include OPEN/READ, WRITE, DELETE, MOVE, COPY, PASTE, SEND, and ATTACH. Actions for network access control includes ENABLE, DISABLE, LOAD, UNLOAD, SEND, BLOCK, HTTP-GET, HTTP-PUT, and HHTP-POST.

(2) Scheduled event, which is generated by a scheduler when a time based event matures. Scheduled event can be used in handling tasks such as document retention. For example, a document retention policy may run periodically to delete all documents that are older than three months.

(3) Internal event, which includes event generated by the management system as a result of policy evaluation or activity data analysis process. For example, that activity data analysis process may have detected some abnormal behavior and issues an internal event to a central decision process to take further action.

(4) External event, such as an event sent by an external application that integrates with the system of the invention The subject element (or BY element) specifies a logical expression that describes one or more subjects. Examples of some subjects include users, user groups, the role of a user, a user's business function, devices (or hosts), groups of devices (e.g., "file servers" or "finance department computers"), types of devices (e.g., laptop or PDA), application programs (e.g., "Microsoft Word"), groups of application programs (e.g., "Microsoft Office" or "Operating System Utilities"), types of application programs (e.g., spreadsheet, instant messenger, or Web browser), or others.

A subject expression may include one or more of the following: (1) User and user group. This information is typically obtained from an LDAP server. (2) Host, which includes information about client computers, servers, personal digital assistants, smart phones, storage devices, and networking devices. (3) Application, which includes server applications, desktop applications and embedded application modules. Applications are the software packages that can be managed.

The context element (or WHERE element) is a logical expression (or context expression) that describes the context this policy applies to. The context expression can include any logical combination of: resource elements, action elements, subject elements, time (e.g., point in time, time of day, or day in the week), locations (e.g., "Main Office," "London Office," "Building H," or "Home"), connectivity (including access mechanism and bandwidth; e.g., WLAN, LAN, VPN, ISDN, Internet, DSL, Bluetooth, dialup, remote desktop protocol (RDP), virtual network computing (VNC) protocol, latency, 56 kbps, broadband, 100 Mbps, and 1 Gbps), policy directives (e.g., POLICY-ENFORCER-AT-POU or MSEXCHANGE-5.5), historical data, statistical data, data produced by analyzing events, data provided by an external data source, and more.

Context expression may include one or more what can be referred to as policy context term or circumstance under which the policy is intended for. Some examples of policy contexts include: (1) Time, including point-in-time, range, and periodic, such as time of day, day in week, day in month, day in year, week in month, and month in year. (2) Location. (3) Organization unit. (4) Access, such as LAN, WLAN, VPN, Internet, DSL, Bluetooth, bandwidth, and Internet Protocol (IP) address. (5) Directive, including an agent running at destination or destination agent capabilities, or both.

A context element describes a circumstance that a policy is intended for (or a positive policy consequence (described below) should apply). It works in conjunction with resource element, action element and subject element to define a policy premise (or condition). For example, a context element may describe a time period in which a policy should be applied (i.e., adopting a positive policy consequence when other logical policy elements are evaluated to true). In another example, a context element describes a policy that should be applied only if a workstation accesses a server through virtual private network (VPN).

In a more complex example, a context element describes the logical combination of: (1) a user who is an employee; (2) a workstation connected to a network at a branch office; (3) the user is using a browser to access a secure server via secure sockets layer (SSL) VPN; (4) the access occurs during office hour; (5) the access occurs within a silent period before his (or her) company's quarterly financial result is published; and (6) there is at most three users connected to the secure server. This example illustrates that a context element can be used to describe a complicated circumstance. In some cases, a context element may specify one or more policy engine directives including POLICY-ENFORCER-AT-DESTINATION.

The positive consequence element (or DO element) includes a positive consequence statement. A positive consequence statement contains a policy effect (e.g., ALLOW, DENY, query user, custom effect handler, and DELEGATE), optionally one or more obligation tasks, and optionally one or more remediation tasks. A positive consequence is adopted during policy evaluation when a policy's premise is evaluated to true.

The negative consequence element (or OTHERS element) includes a negative consequence statement. A negative consequence element has the same structure as the positive consequence statement. A negative consequence is adopted during policy evaluation when a policy's premise is evaluated to false. Negative consequence is optional in a policy. When a negative consequence is not specified, a default negative consequence is used which contains a policy effect which is the negation of the positive policy effect found in the policy.

In addition, a policy rule can also contain directives that provide instructions to a policy engine (e.g., a policy engine in a policy enforcer or a policy engine in a policy decision server) to assist in policy evaluation and provide instructions to policy deployment module (typically a part of a policy server) to assist in policy deployment. Policy directives can appear anywhere in the policy, including within the policy elements described above. For example, a policy can contain one or more collaborative directives (e.g., POU:<action> which describes action information available at a point-of-use agent associate with a policy evaluation request, or POLICY-ENFORCER-AT-DESTINATION).

In a specific implementation, the policy language allows policies to be specified without hard coding physical resources (such as "C:\mysensitivedata\legaldocs\**").

Referring to the table below, there are three different types of systems concerning how rules, decision making, and enforcement are managed. The policy language of the invention may be applicable to any of the system types I, II, or III, or in other system types. In the three systems, policies are designed to be centrally managed. For example, referring to FIG. 5, the rules may be managed using the policy server and held in the policy repository. In the three types of systems, there will be distributed enforcement. For example, referring to FIG. 5, there are distributed policy enforcers at the workstations and servers.

| System Type | Rules | Decision | Enforcement |
| --- | --- | --- | --- |
| I | Centralized | Centralized | Distributed |
| II | Centralized | Distributed | Distributed |
| III | Centralized | Hybrid | Distributed |

Decision making in the type I system is centralized. Then when a decision is needed as to whether a policy is satisfied, the decision or policy evaluation will be made by the policy server, policy decision making server, or using another centralized technique. In a centralized policy decision scheme, only one or a cluster of policy decision making servers need to access a policy repository or having policies delivered to the one or cluster of policy decision making servers. The servers responsible for making policy decision are typically dedicated servers and the number of servers involved is typically relatively small.

In a type II system, the decision making is distributed, so a program running on the device (e.g., workstation or server) will make a decision. This is a system as shown and described in connection to FIG. 5. Distributed policy decision scheme typically supports a large number of policy decision points and requires policies distributed to each policy decision point. In some implementation, either a centralized policy repository or a collection of distributed policy repositories can be used instead of having policies distributed to each policy decision point. If distributed policy repositories scheme is used, any standard object-based, file-based and database replication technique can be used to synchronize the repositories. In additional, a distributed policy repositories scheme may also maintain no master repository, one master repository or multiple master repositories. In a system that implements distributed policy decision, a policy decision point and one or more policy enforcement points are typically components of an application program resided on the device being managed.

On the other hand, a policy decision point may reside in a process separated from a policy enforcement point on the same device or on separate devices. In a type III system, the decision making is a hybrid, which means at times decision making is neither centralized nor distributed. In a hybrid decision making scheme, one policy decision point can collaborate with at least one other policy decision point to complete a policy decision request.

For example, a hybrid decision making system may include one of the following collaborative processes: (1) A distributed policy decision point (i.e. on a device) communicates with another distributed policy decision point to complete a policy decision request. (2) A distributed policy decision point communicates with more than one distributed policy decision points to complete a policy decision request. (3) A distributed policy decision point communicates with a centralized policy decision point to complete a policy decision request. (4) A centralized policy decision point communicates with a distributed policy decision point to complete a policy decision request. (5) Any combination of one or more centralized policy decision points and distributed policy decision points may be used. Not all decision making under the hybrid policy decision scheme need to involve more than one policy decision point, only some of the decisions require collaborative efforts.

The above table of system types gives some examples of information management systems. Some systems include policy enforcers or agents. Some systems may not have a policy engine in a policy enforcer (or agent); these systems would have centralized decision. A system may have a server system with many thin clients or Windows terminals. The policy language is applicable to systems with centralized decision.

Although not listed in the above table on system types, other systems may have centralized enforcement. The policy language of the invention may be applied to systems with centralized enforcement. Other systems may have hybrid enforcement, where part of enforcement mechanism is performed using, for example, a desktop computer, and another part of the enforcement mechanism is performed using a centralized device, such as a server.

Obligation refers to tasks related to a trigger (i.e., the task at hand) that a policy engine is obliged to complete. For example, common obligations include: (1) Archiving an e-mail message. An application of such is regulatory compliance where all executive e-mail communication should be archived. (2) Sending notification, such as when a critical document is being accessed, then sending an e-mail to a document administrator. (3) Encrypting message before transmission. The application can be security or regulatory compliance. HIPPA requires certain communications to certain people be encrypted. (4) Altering a message. Some export control rules requires e-mail messages be tagged at subject line. Legal communication often includes message trailer.

Remediation refers to tasks not directly related to current trigger ought to be carried out. Remediation tasks can be just about anything. For example, common remediation tasks include: A user has change job within a company recently. The documents that a user was authorized to access may not be appropriate in the new job anymore. If some of those documents have been copied to a user's laptop computer, it is most desirable to have those documents deleted. A remediation task can be specified in a policy to take care of such action. The policy that specifies the remediation action can be triggered either through a job change event, a scheduled event that runs periodically, or when user first access a document the user is no long authorized access.

Below is an example of a policy. This policy or rule is for documents in a category with a "sensitive" attribute.

```
FOR document.category = "Sensitive"
ON OPEN
BY user = Executives, Legal
DO ALLOW OTHERS DENY
```

For the above policy, when a document or information is denoted as sensitive and that document or information is opened, and the user is an executive or legal (which are abstractions defined elsewhere), they will be allowed to open. The system will deny others who are not members of the executive or legal group. These people will not be allowed to open the sensitive document. In a specific implementation, for example, a policy enforcer traps the open operation and prevents the open from occurring. The user may receive an error message that they are not permitted to access or open the information because they are not in the appropriate group.

The above policy also includes some abstractions: executives, and legal. An abstraction (which may also sometimes be referred to as a variable) may be an expression including a string, integer, floating point, character, or Boolean, or combination of these. An abstraction may also use a further abstraction. For example, a policy may use a first abstraction or variable, and an expression of the first abstraction or variable has a further second abstraction of variable. In such a fashion, one abstraction may chain or link to any number of further abstractions. A definition of the above abstractions is provided below.

```
Executive := <all users under LDAP group "
vice-presidents">, jthomas, tmichelle;
Legal := <all users under LDAP group "legal">;
```

The above policy is not fully represented using abstraction. It can be rewritten as follow to take full advantage of abstraction. For illustration purpose, the rewritten policy is also expanded to include additional groups of documents that are classified as sensitive.

```
FOR document = Sensitive
ON OPEN
BY user = Executives, Legal
DO ALLOW OTHERS DENY
```

```
Sensitive := Legal-Docs
    OR Financial-Reports
    OR document.name = "//server345/merger-and-acquistion/**"
    OR document.category = "Sensitive";
Legal-Docs := "//server-legal/**"
Financial-Reports := "//server-finance/reports/**"
    OR "//server169/finance/shared/reports/*.pdf"
```

An abstraction is typically not defined within the policy itself. In an embodiment of the invention, policies and abstractions maintained separately. Policies and abstractions may be stored in a database structure. They may be in the same database or different databases. The policies and abstractions may be stored in database tables. For example, policies may be in one table of a database and abstractions may be in a second table of the database. On the other hand, policies and abstractions can be stored in one or more files.

There are benefits to providing a policy language which provides for policy abstractions. Policies and abstractions may be built separately from each. Policies and abstractions may be built by the same person or group of people. However, by separating policies and abstractions, this makes it easier for different groups or people in an organization to be responsible for one or the other. One group or person, who may be referred to as a policy author or policy analyst, may modify a policy without being concerned about the details of an abstraction, which is maintained by another person, who may be referred to as a information analyst.

One may refer to the group responsible for policies as the policy information systems (IS) group and the group responsible for abstractions as the abstractions information systems group. One responsible for policy abstraction may be referred to as an information analyst. Both policy analyst and information analyst use a user interface module to compose policy and define abstraction. The user interface may have two or more modules or configured to work differently for the two classes of users. The policy information systems group can focus on policies while the abstractions information systems group can focus on abstraction.

Furthermore, an abstraction may be used in one or more policies. And when a particular abstraction is changed, then the policies that refer to or use that abstraction will also be changed. For the above example, if there are some new vice presidents in a company, a change is made to the executives abstraction to include the new users. No policies need to be changed. Once the executives abstraction is redeployed, all the policies (e.g., two, three, four, five, twenty, thirty, or more) that reference the executives abstraction will be updated to include the new vice presidents. In such a way, this allows more effective and efficient management of the information management system.

An example of a benefit of the policy language of the invention is having one policy written that can be applied by different types of policy enforcers to perform different task. The policy language is a high-level policy definition language where the policy writer need not worry about lower level details. This is another benefit of abstraction and how rules are deployed (i.e., late binding).

For example, a policy may say that only an owner of sensitive documents can copy such documents. This policy can be translated into:

(1) For a Windows Explorer interceptor (i.e., policy enforcer), the copy operation is intercepted, evaluated, and enforced.

(2) For DOS command prompt, the shell command "copy" is intercepted, evaluated, and enforced.

(3) For Microsoft Outlook, the operation of copying an e-mail and forwarding an e-mail are intercepted, evaluated, and enforced.

(4) For a FTP Client, the operation of uploading a file is intercepted, evaluated, and enforced.

(5) For a Web browser, the operating of uploading a file is intercepted, evaluated, and enforced.

(6) For a file server, the operation of copying a file is intercepted, evaluated, and enforced.

(7) For Microsoft Exchange Server, the operation of copying an e-mail and forwarding an e-mail are intercepted, evaluated and enforced. Therefore, the policy writer can draft a relatively simple policy without worrying about how each different policy enforcer will do its work. The different policy enforcers will enforce the policy correctly.

For example, a policy may not be applied to all policy enforcers. A policy writer does not need to know this because the deployment step takes care of deploying to the appropriate policy enforcers. For example, an e-mail message policy may only need to deliver to policy enforcers that handle e-mail. That means a file server that does not handle e-mail will not need to receive such policies.

As a further example, a policy may be written for a specific e-mail server or a particular application program version. A user should know the specific application of the policy, but does not need to know how the policy will be deployed. The deployment step takes care of this.

Figure 14:
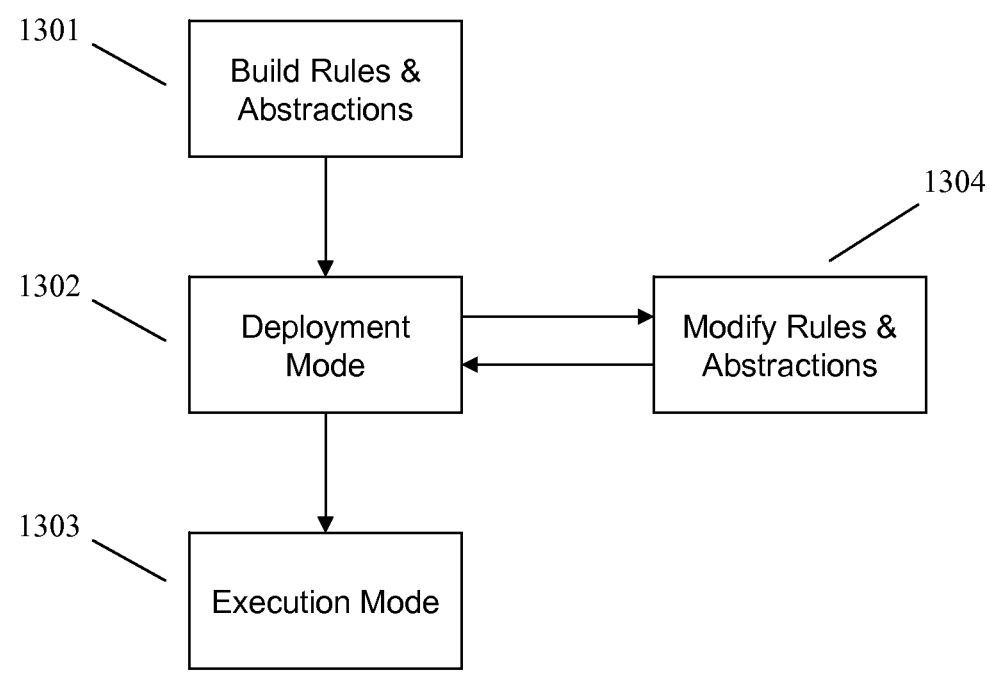
FIG. 14 shows the functional modes of an information system of the invention.

FIG. 14 shows a functionality diagram of some modes of operation of an information management system of the invention. The modes are merely exemplary and there may be many more modes in a system than what is shown. Some of the modes shown may be incorporated within one functional or operation mode.

In a step 1301, policies or rules and abstractions are built. These may be built by users coding the rules and abstractions or may be automatically generated using policy or abstraction tools. For example, rules and abstractions may be created using an editor or graphical tool.

A step 1302 is a deployment mode of operation. In this mode of operation, the policy server will send the policies or rules to the devices, workstations, servers, and others. In an embodiment, the entire set of policies may be transferred to each device. However, in a other embodiments, a subset of the policies may be transferred to each device. A process called binding may be used so the policies or rules are bound or associated with a device or user (via a user name or user ID).

Deployment may include creating a delta, optimization, transformation, or translation, or combinations of these. These are discussed in more detail below. In brief, creating a delta is a technique where differences are sent to a target instead of a entire new set of policies. Optimization is improving the efficiency in terms of space and execution speed of a set of policies. Transformation is changing from one format to another format, such as ASCII to binary, or rules to look-up tables, or other. Translation is changing from one language to another, such as from the policy language of the invention to a firewall policy language.

During binding, the policy server determines a set of rule and abstraction components relevant to a target device or target user (e.g., a workstation component), and transfers this set of rule and abstraction components to the target. Typically, a target has more limited storage capacity (e.g., less memory, less hard disk space, and so forth) than a server of the information system. For example, the target may be a desktop computer, notebook computer, PDA, smart phone, or other device or means by which a user connects to the system. Binding generally reduces the amount of storage needed to store the policies on a particular device.

A specific embodiment of deployment uses late binding. Late binding associates a subset of the policies or rules to a particular device or user when that device or user is connected to the system. A custom set of rules is sent to the device (or user) when it logs in or connects to the system. The set of rules is customized to the device (or user). This device may be a server, desktop computer, notebook computer, smart phone, or other. In an embodiment, when a device connects to the information system of the invention, the device requests rules to be sent. The system creates a subset of rules for the device and then transfers this subset to the device.

The late binding technique allows policies to be deployed to a policy enforcer automatically without user intervention. In a specific implementation, for example, a subset of policies is delivered to a desktop computer or other device every time a user logins. A policy enforcer delivers a user ID or username to the policy server. The policy server performs partial binding resolution and optimization before delivering a policy bundle to a client computer. Note that it is not necessary to perform complete binding resolution because resource components can bind to too many resources (e.g., files). Some binding resolution tasks may be deferred to the policy enforcer.

In an embodiment, the system of the invention transfers or sends the rules which are pertinent to the target. This reduces the amount of policy data that needs to be transferred, and also reduces the size of storage space needed. Therefore, a subset of the policies at the centralized policy server is transferred to the target. For example, if user A is logged in, then only rules related to user A will be transferred. Rules which do not affect or cannot be applied to user A would not be relevant. And if user A is logged through a smart phone rather than a desktop computer, then rules concerning to user A and a smart phone would be relevant and transferred. For example, assuming the smart phone does not have a word processing application, then rules concerning word processing (such as cut and paste) would not be relevant and would not be transferred.

In addition to late binding, there are other binding techniques, such as early binding. Early binding refers to a technique where a subset of rules are not necessarily customized for each device or user. In early binding, there may be a set of predefined target profiles. Any number of predefined target profiles may form a set. For example, there may be three predefined target profiles with a three subsets of rules associated with these three target profiles. A first target profile may be a desktop personal computer, a second target profile may be a server, and a third target profile may be a personal digital assistant or smart phone. When one of these devices connects to the system, the subset of rules associate with this device will be transferred to the device. Compared to the above late binding technique, the subset of rules is not necessarily as customized for each device since it has been predefined.

In early binding, a policy bundle associated with a policy profile can be preassembled and stored on a policy server. The preassembled policy subset can be delivered to a device via a network or a removable storage medium.

In further embodiments of the invention, other types of binding may be used, such as a combination of early binding and late binding. There may be binding where rules are dynamically pushed to the device whenever a change in the rules occurs, at scheduled times, or when a certain event occurs. Any of these binding techniques may be used in an information management system of the invention.

An advantage of binding (early or late) is that a subset or smaller set of policies is deployed. Deploying a smaller set of policies—instead of the complete set of policies, many of which may be irrelevant to a particular device—reduces the storage space required to store the policies on the device. Also, with fewer policies, the device making the decision during an execution mode 1303 can resolve the set of policies more quickly because there are fewer policies to evaluate.

Policy subsets created in the deployment mode are typically organized into policy bundles. A policy bundle may comprise of a subset of policies, a subset of policy abstractions that the set of policies depends on, and configuration and supporting data that is required to evaluate the subset of policies and policy abstractions.

In an embodiment, during deployment, a system may deliver a delta of the subset of policies and policy abstractions. A delta is formed by first creating a policy subset (including policy abstractions) on the policy server based on information in a target profile. Obtain information on what policies and policy abstractions are available at the target (discussed later). Using the subset and information on policies and policy abstractions on the target, generate a difference list and ship the different list to the target. At the target, use the different list and the set of policies and policy abstractions available locally to recompose the policy subset that is meant for the target.

There are many different ways to create a delta, and any of these may be used. One way is the target ships the policy server about what policies and policy abstractions it has on the target. The other is a policy server maintain a list of policies shipped successfully to the target. Yet another way is the policy server asks the target for a list. Any one of these method can be further simplified by labeling (or numbering) the policies and policy abstractions and versions of policies and policy abstractions so that a policy or an abstraction can be identified easily. Say, using a labeling solution, the policy server can get a list of policy labels form the target upon successful connection and maintain such list at the policy server. Subsequent transmission of policy will be done by comparing a policy labels with the list of labels. A list of differences can be shipped to the target for reconstruction.

In another embodiment, a system may deliver a subset of policies based on a partial target profile and then merge the result with existing policies on the target. A typical example for this case is when a user logs in. We get policies associated with a user and not policies for a workstation. Once user-related policies arrive at a workstation, the policies are merged with existing policies relevant to the workstation.

In another embodiment, the system can perform push or pull delivery. Push delivery is initiated by the policy server to where policy engine is located. Normally, push is a result of implementing a user request of immediate policy delivery, an activity data analysis process generates an internal event to implement some urgent policies, or a policy on a policy server is invoked through delegation by a policy enforcer that triggers immediate policy delivery.

Pull delivery is initiated by a policy enforcer to a policy server to ask for new policies. Typical examples are when at system boot up or connection to the network, a device will ask the policy server if there are any new policies for the device. The policy server may respond with a set of new policies to add to or replace one or more existing policies at the device. Another example is when a user logs on. A user may not use that particular workstation before, so the workstation contains no policy specific to that user. Therefore, the policy enforcer on the workstation should acquire policies relevant to the user so that it can apply the correct set of policies to the current user.

Policies may be delivered in a different format based on capability of a policy enforcer or policy engine in a policy enforcer. For example, we can deliver policies in binary format to a cell phone and deliver policies as a partially optimized look-up table for desktop and laptop in text format.

Policy deployment may be applied to system that supports policies alone, policy abstractions alone, and policies plus policy abstractions. An embodiment of the invention may deploy policies only with policy abstractions fixed. An embodiment of the invention may deploy policy abstractions only with policies fixed. An embodiment of the invention may deploy configurations only.

Policy selection may be done with policy abstractions and policies or rules at the same time. In a specific implementation, selection of relevant policy is done in the following steps:

(1) In a first step, inspect all policies and place all relevant polices in a first list.

(2) In a second step, inspect all policy abstractions and place all relevant policy abstractions in the second list.

(3) In a third step, find all policy abstractions not in the second list that reference at least one policy abstraction in the second list and add them to the second list. Repeat this step until no more policy abstraction having a reference to a policy abstraction in the updated second list can be found.

(4) In a forth step, find all policies having a reference to a policy abstraction in the second list and place them in the first list (5) In a fifth step, find all policies having reference to a policy in the first list and add them to the first list. Repeat this step until no more policy having a reference to a policy in the updated first list can be found.

Below is a list of some of the factors which may be used in the deployment mode to determine whether a rule is relevant or not. When a rule is considered relevant, the rule and all policy abstractions referenced by the rule and all supporting configuration and data will be transferred to the target.

(1) Who is the user? Then, rules relevant to the user may be transferred.

(2) Who are the users active on this machine? For example, a Microsoft Windows 2003 Terminal Services can have many users on it. This may be an additional consideration in determining whether a rule is relevant. Rules relevant to the users may be transferred.

(3) What group does this user belong to? For example, the user may be a member of a group such as accounting, legal, engineering, executive, vice president, board of directors, quality assurance, assembly, production control, fabrication, patent, information services, human resource, or another group. This may be an additional consideration in determining whether a rule is relevant. Rules relevant to the group or groups the user belongs may be transferred.

(4) What type of machine is this? The machine or device may be, for example, a laptop, desktop, PDA, smart phone, terminal server, information kiosk, or other device. This may be an additional consideration in determining whether a rule is relevant. Rules relevant to the machine or device may be transferred. For example, there may be a policy just for laptop or PDA.

(5) What group does this computer belongs to? For example, the computer or device may belong to the finance department, engineering, guest, human resources, and so forth. This may be an additional consideration in determining whether a rule is relevant. Rules relevant to the group the computer belongs to may be transferred.

(6) Is the target a server machine or a client machine? There may be policy specific for all server machines and some for all client machines. These may be additional considerations in determining whether a rule is relevant. Rules relevant to servers or clients, or both, may be transferred.

(7) What type server application is running on this machine? For example, the server may be running an application such as a mail server, Microsoft Exchange Server, Microsoft SharePoint Portal Server, Documentum server, CRM server, database server, and so forth. Furthermore, there may be a specific policy for all mail servers whether it is a simple SMTP server or a Microsoft Exchange Server. There may also be a policy just for Microsoft Exchange Server because Exchange is does so much more than other mail servers. This may be an additional consideration in determining whether a rule is relevant. Rules relevant to the type of server application running on the machine may be transferred.

(8) What type of application is running on the client machine? For example, the application may be instant messenger (IM), mail client, Web browser, Yahoo Messenger, Microsoft Outlook, Microsoft Internet Explorer, Mozilla Firefox, Microsoft Word, Microsoft Excel, Microsoft Windows Explorer, DOS prompt, ksh, csh, FTP client, and so forth. Some policies may be written for a class of application such as instant messenger. Other policies may be specific to a particular application like Microsoft Outlook. This may be an additional consideration in determining whether a rule is relevant. Rules relevant to the application running on the client machine may be transferred.

(9) What version of software or operating system (OS) is running at the target? For example, for Microsoft Office, there many versions including Microsoft Office 97, Microsoft Office 2000, Microsoft Office XP, and Microsoft Office 2003. The operating system may be Windows 95, Windows 2000, Windows XP, Windows Mobile, Microsoft Vista, Linux, Ubuntu, Macintosh OS X, or another. There may be policies based on software versions. One release of some software may be significantly different from another release, and a policy can be tailored for a specific version. These may be additional considerations in determining whether a rule is relevant. Rules relevant to a version of a particular software may be transferred. Rules relevant to an operating system may be transferred.

(10) What scope does the policy need to execute? Multi-event policy and correlation policy may be applied at point of use (POU) (i.e., a client computer), server, policy server, or any server dedicated to perform policy evaluation. Therefore, there may be a directive in a policy to tell where the policy belongs. Policy can also be inspected to identify where it should be deployed based on resources and other specifications (such as directive) in the policy. This may be an additional consideration in determining whether a rule is relevant. Rules relevant to a scope of the policy may be transferred.

(11) Where is the user logging in from and what type of connectivity is used to make the connection? For example, the user may be logging in while in the office, branch office, home, using virtual private network (VPN), via wireless LAN, using secure or nonsecure site connection, or using a connection with a particular bandwidth. These may be additional considerations in determining whether a rule is relevant. Rules relevant to where the user is logging in from may be transferred. Rules relevant to what type of connectivity or bandwidth the user is connecting with may be transferred.

(12) What is the capability of a device? For example, can the device send e-mail? Can any document be saved on the device? Can the device connect to a printer? These may be additional considerations in determining whether a rule is relevant. Rules relevant to the capability of the device may be transferred.

For deployment, when determining relevancy, in specific embodiments of the invention, a device's capability may be used to (i) determine relevancy, (ii) determine if certain type of resource is on a device, (iii) determine if certain event can happen on a device, and others.

Further during the deployment step, there may be further optimizations before the policies are deployed or transferred to the devices. This may be during the deployment step or in a separate optimizations step. For example, as an optimization step, part of a policy can be preevaluated during policy binding. For example, for policies deployed to client agent where a user is known, LDAP groups can be resolved during policy binding therefore eliminating some subexpressions in a policy. The optimized policies may be considered modified policies since they have been altered compared to the original policies. The modified policies will be logically equivalent to the original policies which they are based on.

One optimization technique may be used is constant subexpression folding. For example, in the expression for a policy, there may be portions of subexpressions of the expression where the result is known, and hence are constants since they are not variable. Therefore, subexpressions can be replaced with a constant or removed from the expression. Since the decision-making device need not evaluate these constant subexpressions, execution time is reduced and memory space is saved. In an implementation of the invention, during the deployment mode or in an optimization mode, the constant subexpressions are replaced with a constant or removed before transferring the policies to the target.

Furthermore, in a specific technique of invention, a subset of rules and abstractions may be modified by removing a subexpression of a rule when the subexpression evaluates to a Boolean true. In particular, when the subexpression is an AND term of a larger expression, when the subexpression evaluates or is otherwise determined to be a Boolean true, this AND term does not affect an outcome of the larger expression. So the subexpression may be removed.

Similarly, a subset of rules and abstractions may be modified by removing a subexpression of a rule when the subexpression evaluates to a Boolean false. In particular, when the subexpression is an OR term of a larger expression, when the subexpression evaluates or is otherwise determined to be a Boolean false, this OR term does not affect an outcome of the larger expression. So the subexpression may be removed.

In the alternative to the above, the subexpression may be replaced instead of being removed. For example, the Boolean true subexpression may be replaced with a representation of a Boolean true, such as a 1. The Boolean false subexpression may be replaced with a representation of a Boolean false, such as a 0. Or the subexpression may be replaced with whatever constant value it is evaluated to be, such as a mathematical or other subexpression, that evaluates to a constant such as 32.

Some specific optimization techniques include (1) common subexpression elimination, (2) constant folding, (3) constant propagation, (4) dead code removal, (5) comparison optimization, and (6) redundant policy elimination. These are discussed in more detail below. Any of these optimization techniques may be used in the information management system of the invention, and in any combination.

A step 1303 is an execution mode of operation. In this mode of operation, the code component of the workstation manages access to information or devices of the information management system based on the set of rule and abstraction components. These devices may include computers, fixed disk drives, servers, personal digital assistant devices, or telephony devices.

In a step 1304, the rules and abstractions may be modified. The rules and abstractions may be modified independently of each other. For example, one or more abstractions may be modified while the rules remain unchanged. Or one or more rules may be modified while the abstractions remain unchanged.

The rules or abstractions, or both, may be modified at any time. When the rules or abstractions, or both, are modified after they are deployed, the system will redeploy the changed rules or abstractions. In a specific implementation, the changed rules or abstraction, or both, are redeployed in real time. In particular, after changes are made to the rules or abstractions, the deployment mode is entered into. After redeployment, in the execution mode of operation, the new rules or abstractions, or both, will be in effect. This feature of the information system allows a user to customize and redeploy rules while the system is in operation.

There may be a heartbeat connection between the policy enforcers and the policy server (or other server such as a communication server). The heartbeat connection may not be direct to the policy server but may be through another server such as the communication server. Via the heartbeat connection, the policy server can tell which policy enforcers are connected to the system. So, when one or more policies are updated or altered in some way, the policy server will know which devices to redeploy the new policies to. For example, when the heartbeat connection is broken between a laptop computer and the policy server, the policy server will know that redeployment of policies does not need to be done to the laptop computer. The heartbeat connection may be updated a periodic time intervals, such as every few seconds, five seconds, ten seconds, and other intervals.

In further embodiments of the invention, the heartbeat connection may also be used for other functions including sending log data from a policy enforcer on a device to an intelligence server. The heartbeat connection may not be direct to the intelligence server, but through another server, such as the communication server.

Figure 15:
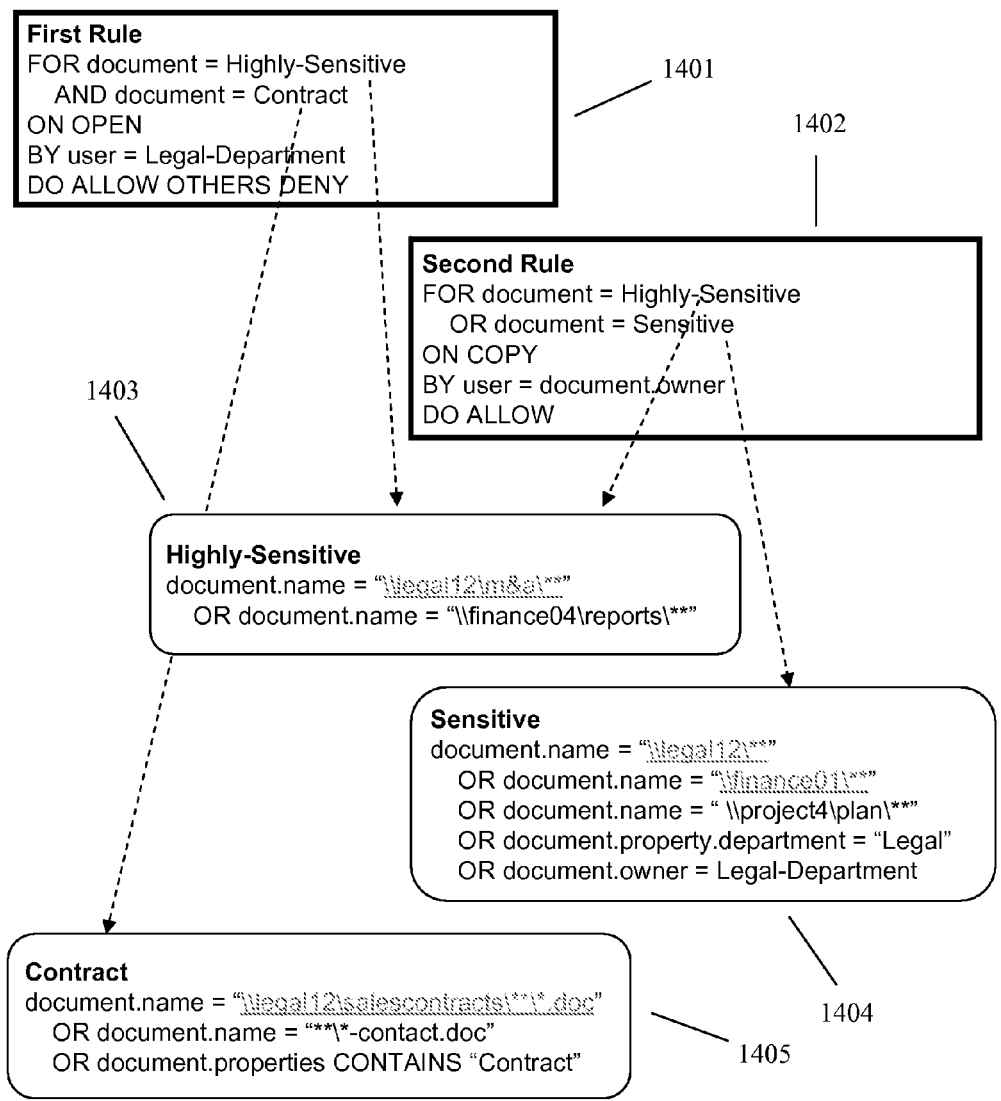
FIG. 15 shows an example of interactions between multiple policies and multiples policy abstractions and their interaction.
Figure 16:
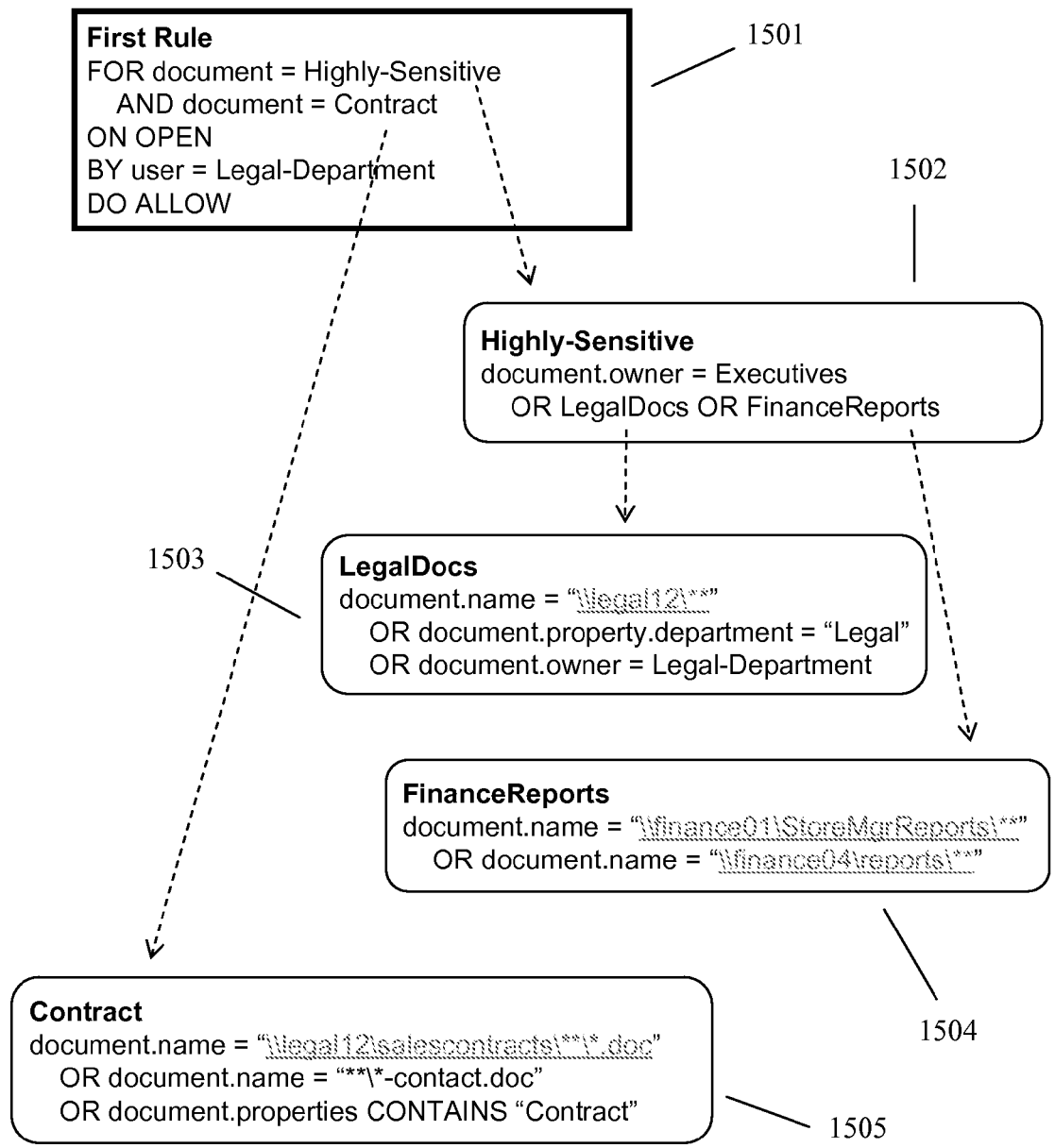
FIG. 16 shows an example of one policy and multiple policy abstractions, where one policy abstractions references other policy abstractions.

FIG. 15 shows an example of interactions between multiple policies and multiples policy abstractions and their interaction. There are two policies or rules 1401 and 1402. Rule 1401 has an abstraction "Highly-Sensitive" that references a policy abstraction "Highly-Sensitive" 1403. Rule 1401 further has an abstraction "Contract" that references a policy abstraction "Contract" 1405. Rule 1402 has the "Highly-Sensitive" abstraction that also reference policy abstraction "Highly-Sensitive" 1403. Rules 1402 has an abstraction "Sensitive" that reference a policy abstraction "Sensitive" 1404.

This figure shows the decoupling of policies and abstractions of the policy language of the invention. A rule may include any number of abstractions. In fact a rule need not include any abstractions, but by using abstractions, this provides advantages. The first rule has two abstractions and the second rule has two abstractions.

The first rule and second rules each share one abstraction, "Highly-Sensitive." The "Highly-Sensitive" may be modified, for example, to include additional documents or information. When the first and second rules are redeployed at one or more targets (such as when a user logs in at a machine), the updated rules with the new "Highly-Sensitive" definition will be transferred to the target. This is an important feature because two or more policies (and perhaps tens, hundreds, or even thousands of policies) may be modified without making changes to each policy itself. For any policy administration staff, this is a substantial time saver.

The "Contract" abstraction may be modified and will affect the first rule without affecting the second rule. The "Sensitive" abstraction may be modified and will affect the second rule without affecting the first rule.

FIG. 15 shows an example of one policy and multiple policy abstractions, where one policy abstraction references other policy abstractions. There is a first rule 1501 that references a policy abstraction "Highly-Sensitive" 1502. The "Highly-Sensitive" abstraction references a "LegalDocs" abstraction 1503 and a "FinanceReports" abstraction 1504. The first rule further references a "Contract" abstraction 1505.

This example shows how a policy abstraction may refer to another policy abstraction. This may be referred to as a nested abstraction. Two levels of abstractions are shown. The first level is from the first rule to "Highly-Sensitive," and the second level is from "Highly-Sensitive" to "LegalDocs." For example one of the second level abstractions may refer to a third level, and so forth. Each abstraction may be built on any number of levels of abstraction, two, three, four, five, six, seven, and eight or more.

An abstraction may reference any number of abstractions itself. Here, "Highly-Sensitive" has two abstractions, but there may be one, or more than two, such as three, four, five, six, seven, or eight or more. Also a policy may have any number of abstractions, one, two, three, four, five, six, seven, or eight or more.

In a policy, an abstraction may be used in any of the resource expression, event expression, subject expression and context expression. In the above examples, abstractions are used in resource expressions and subject expressions in the policies.

Figure 17:
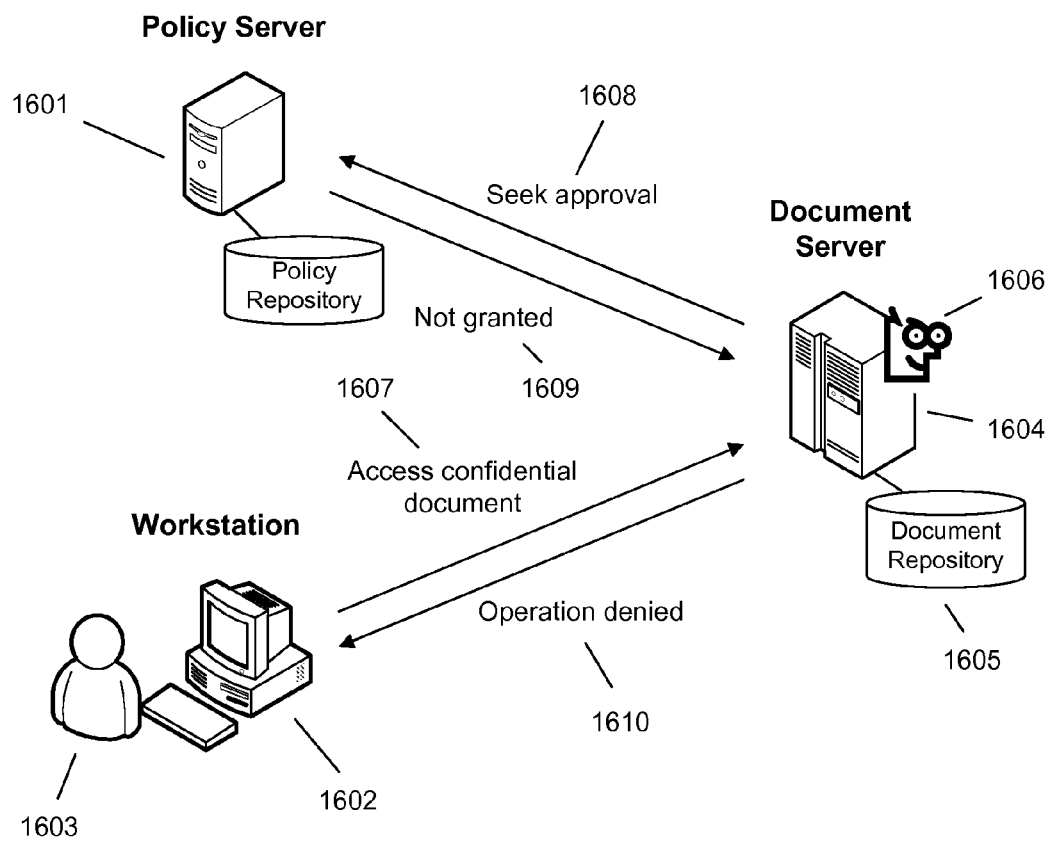
FIG. 17 shows accessing confidential document, seeking approval, with centralized decision.

FIG. 17 shows accessing confidential document, seeking approval, with centralized decision. An information system is show in the figure. There is a policy server 1601 in an organization which accesses a policy repository of policies or rules. The policy repository may be part of the server or separate from server, such as part of another server or spread across multiple servers. There is a user 1603 in an organization logged into a workstation 1602. The user attempts to access 1607 a confidential document on a document server 1604. The confidential document is stored in a document repository 1605. A policy enforcer 1606 installed on the document server seeks approval 1608 for the requested operation from the policy server. The policy server returns "not granted" 1609 to the document server. The policy enforcer in the document server denies 1610 user access to the document.

In FIG. 17 and elsewhere in this application, we refer to a document as a confidential document. This means that the document has one or more attributes to identify the document is classified as confidential, meaning it is not accessible by every user. In this patent, a confidential document is document with at least some access controls, so it is not accessible by every user of an organization. In other words, for a confidential document, at least one user of an organization will be denied access when this attempts to access the confidential document. In contrast, an open or nonconfidential document may be one where there are no access controls and every user in an organization is allowed access. Furthermore, one or more attributes of a nonconfidential document may be altered or set to turn it into a confidential document.

A document may be classified as confidential or other classification based on the document's attributes. These attributes may depend on or based on factors such as a location of a server where the document is stored, directory in a file server where the document is stored, name of the file, type of the file, content classification type, attributes defined in a document management system and associated with the document, or a property embedded in the document or e-mail (e.g., e-mail from a CEO).

Furthermore, the information management system not only handles traditional documents which may include files, but also handle e-mail, file store in document management system, and other as discussed in this application.

Figure 18:
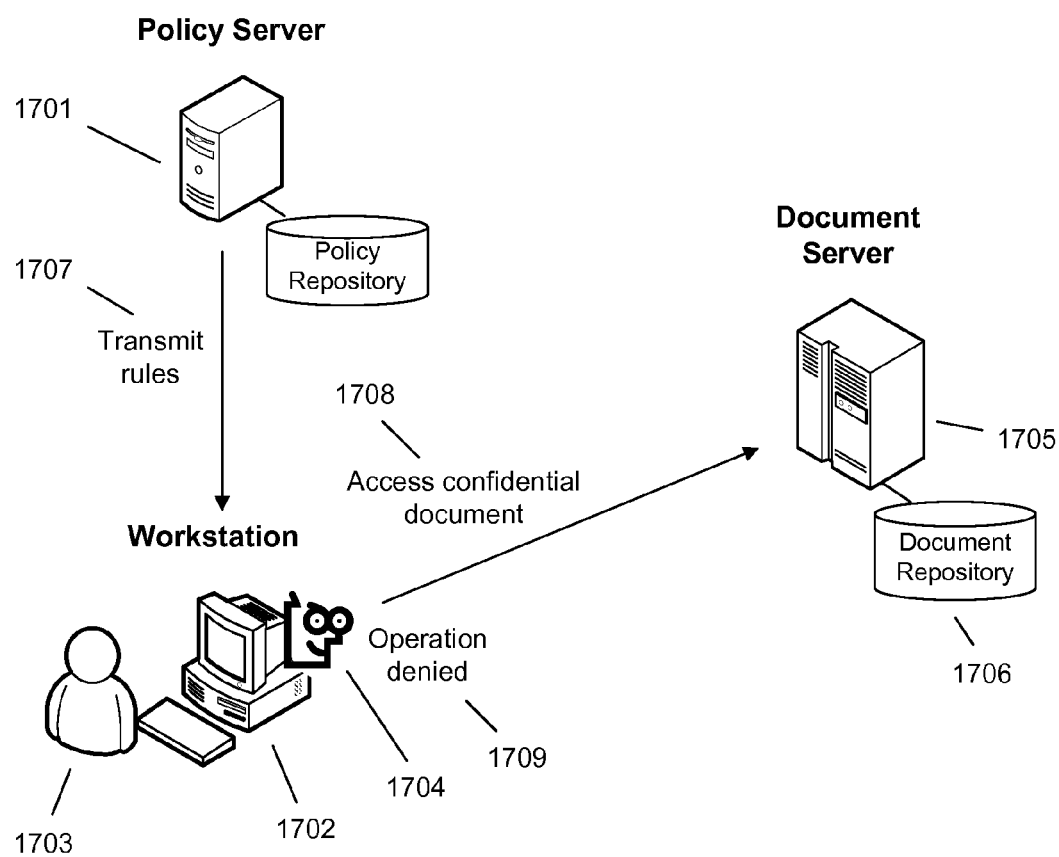
FIG. 18 shows accessing confidential document, seeking approval, with distributed decision.

FIG. 18 shows accessing confidential document, seeking approval, with distributed decision. An information system is show in the figure. There is a policy server 1701 in an organization which accesses a policy repository of policies or rules. The policy server distributes policies 1707 to policy enforcers, of which a policy enforcer 1704 in an example. A document server 1705 has a policy enforcer running on it monitoring access to documents and enforcing policies (or rules).

Figure 19:
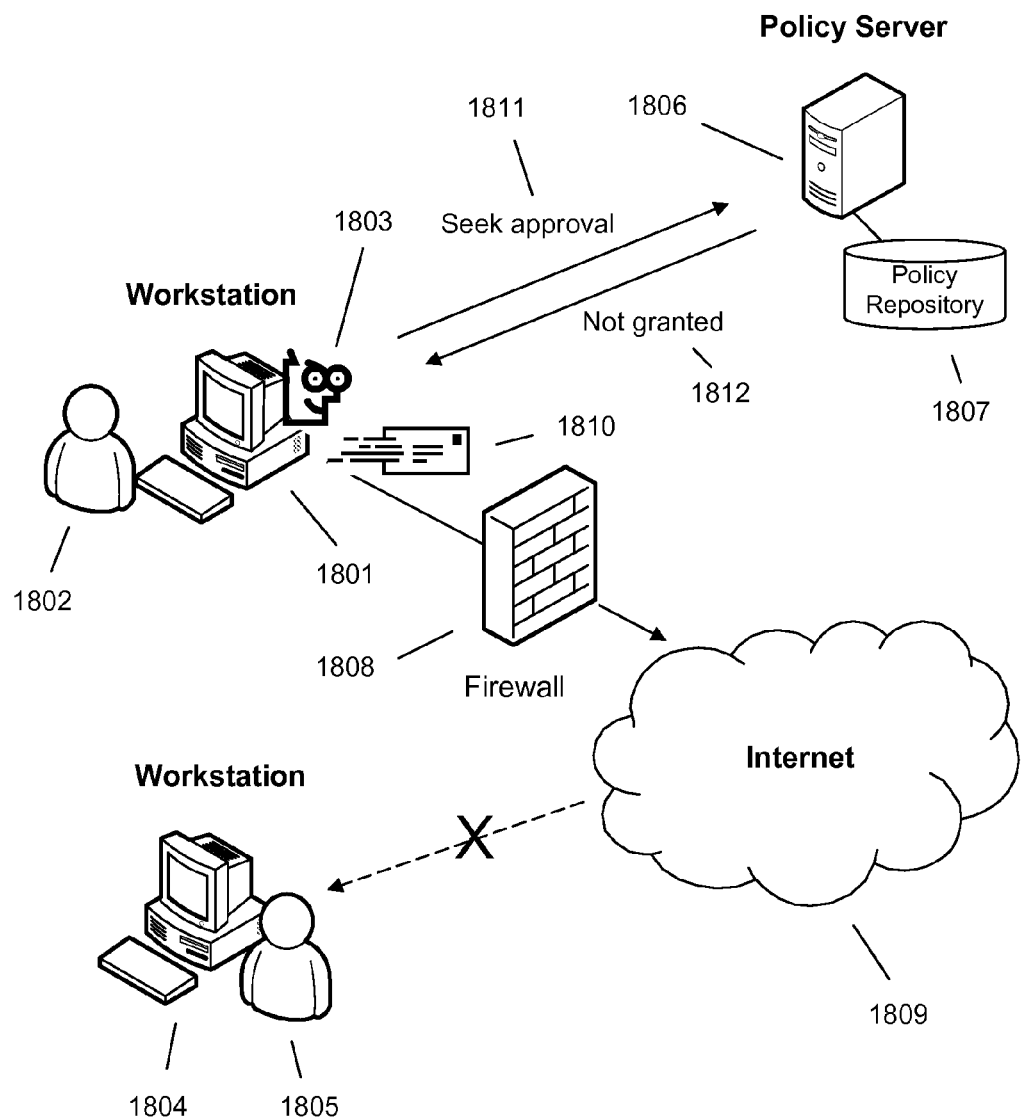
FIG. 19 shows blocking sending of a confidential document outside the company.

A user 1703 in the organization logs into a workstation 1702 with policy enforcer 1704. The user tries to access 1708 a confidential document on the document server, which is stored in a document repository 1706. The policy enforcer detects the access operation. The policy enforcer evaluates policies distributed to it to determine if approval should be granted to the access operation. In this example, based on one or more policies, the policy enforcer decides not to grant access 1709 to the document and it enforces the decision by blocking the access attempt by the user FIG. 19 shows blocking sending of a confidential document outside the company. There is a first user 1802 in an organization accessing an information system of the organization through a workstation 1801. There is a second user 1805 outside the organization. The second user is on a workstation 1804 and is connected to the Internet 1809. There is a firewall 1808 between workstation 1801 and the Internet.

The first user tries to send a confidential message 1810 to the second user. The workstation the first user used to send the confidential message has a policy enforcer 1803 installed. The policy enforcer on the workstation intercepts the send operation and seeks approval 1811 from a policy server 1806. The policy server is connected to a policy repository 1807 which holds the policies. The policy server decides not to grant approval 1812 to the send operation. The policy enforcer implements the decision by blocking the confidential message from being sent by the first user.

Figure 20:
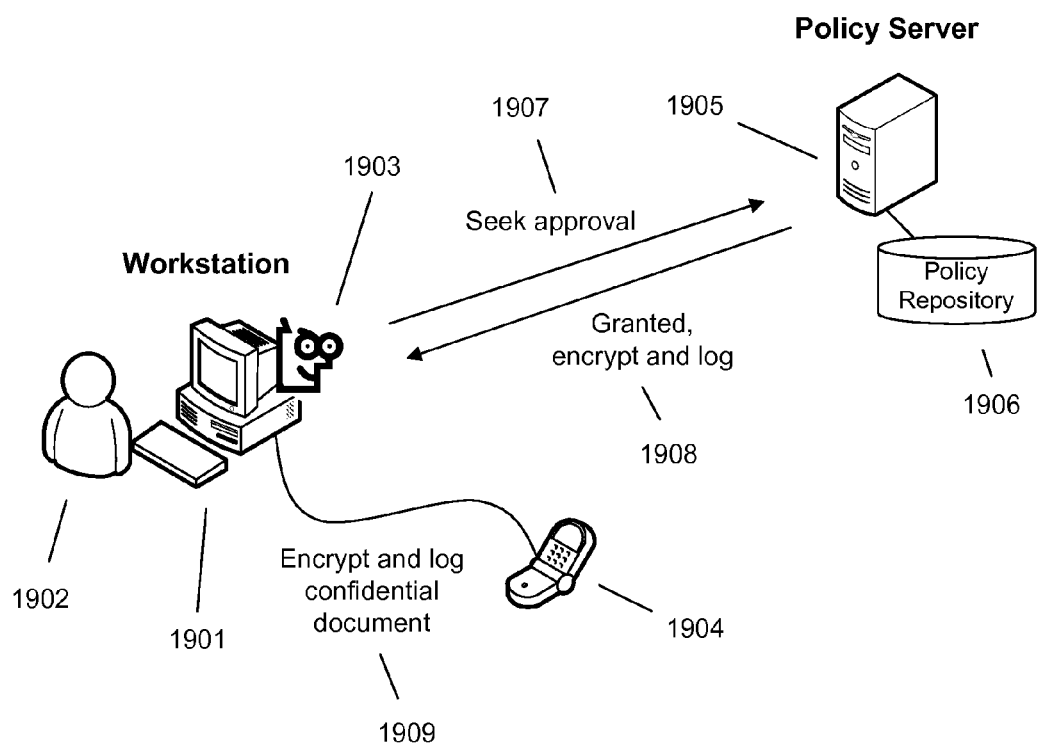
FIG. 20 shows encrypting a confidential document when copying to a removable device.

FIG. 20 shows encrypting a confidential document when copying to a removable device. There is a user 1902 in an organization. The user is logged into a workstation 1901. The user tries to copy a confidential document to a removable media 1904, such as a CD-ROM, DVD-ROM, floppy disk, smart phone, PDA, MP3 player, or USB drive. The workstation the user used to copy the confidential document has a policy enforcer 1903 installed. The policy enforcer on the workstation intercepts the copy operation and seeks approval 1907 from a policy server 1905. The policy server accesses a policy repository 1906 which holds the policies.

In this example, the policy server decides to grant approval 1908 to the copy operation but require that the confidential document be encrypted 1908 before placing on the removable media and this operation to be logged. The policy enforcer implements the decision by effecting encryption 1909 of the confidential document and allowing the copy operation to complete, and recording the operation in an activity log. The activity log may be later used in correlation (discussed later).

The encryption process can be done in many ways. For example, policy enforcer can be equipped to perform encryption. However, there are also devices that can handle encryption automatically. Alternatively, file system such as NTFS can also handle encryption if a file attribute is set. Effecting encryption of the confidential document may be done by, for example, (1) a policy enforcer performing encryption, (2) a policy enforcer setting a file attribute to cause a file to be encrypted, (3) a policy enforcer doing nothing because the device automatically encrypts, or (4) other encryption techniques.

Figure 21:
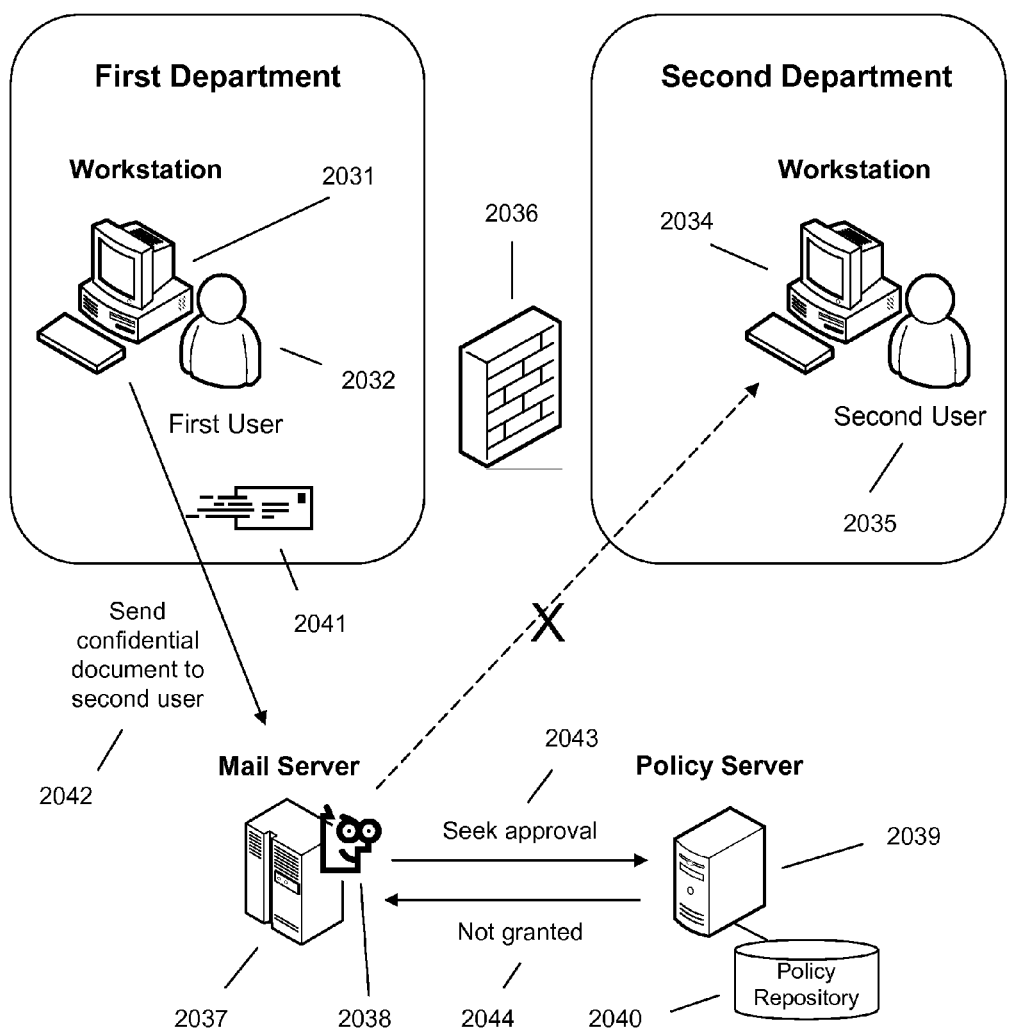
FIG. 21 shows sending of a confidential document between users who should observe separation of duties.

FIG. 21 shows sending of a confidential document between users who should observe separation of duties. This type of policy for separation of duties is sometimes known as an "ethical wall" or "Chinese Wall," which may be useful in preventing or managing potential conflict of interest situations. California Justice Harry Lowe has taken offense to the phrase "Chinese Wall" and wrote an opinion at *Peat, Marwick, Mitchell & Co. v. Superior Court* 200 Cal.App.3d 272, 293-294, 245 Cal.Rptr. 873, 887-888 (1988) (Low, Presiding Justice, concurring and suggesting using "ethics wall" instead of "Chinese Wall").

There are a first department and second department in an organization. Although in this specific example, the first department and second department are groups in the same organization, the first department and second department may be groups of different organizations or may be entirely different organizations themselves. And although two departments or groups are shown, such an ethical wall policy may be implemented among any number of groups, including two, three, four, five, or more groups. Some of the groups may be in the same organization, while other groups are in different organizations or outside an organization. The groups in the same organization may be managed by one information management systems or multiple information management systems.

The users in first department and second department are required to observe separation-of-duty rules such that no exchange of confidential information among users in first department and users in second department is allowed. This policy is illustrated as a firewall 2036 between the first and second departments. There is a first user 2032 on a workstation 2031 in the first department. There is a second user 2035 on a workstation 2034 in the second department. The first user tries to send a confidential message 2031 to the second user.

The confidential message is sent through a mail server 2037. The mail server has a policy enforcer 2038 installed. The policy enforcer on the mail server intercepts 2042 the sending of the confidential message. The policy enforcer seeks approval 2043 from a policy server 2039, which accesses rules in a policy repository 2040. The policy server does not grant approval 2044 to the sending of the confidential message. The policy enforcer on the mail server blocks the sending of the confidential message.

When implementing separations of duty, the policies of the system may block a user from accessing to information of another group, block connections between users of two groups, or block access to applications belonging to another group. Connections including instant messenger, peer-to-peer, voice-over-IP calls, and e-mail may be managed by the system. Applications or access such as through an FTP server, web server, or file server may be managed by the system. Based on the policies, a user will be allowed or denied access to the information or resource the user requested.

The expressiveness of the policy language of the invention allows complex policies that depend on one or more resources, one or more persons, one or more locations, time, connectivity, or any combination of these, or others to be specified. In one application of the policy language, policies may be specified to create an information barrier (ethical wall or "Chinese Wall") among groups of people (e.g., users or recipients), among groups of devices (e.g., desktops or servers), among groups of application programs (e.g., mail servers or clients, instant messaging servers or clients, voice over Internet protocol (VoIP) servers or clients, or FTP servers), or among groups of people and groups of resources where complex relationships among people and resources such as mutually exclusive access to a resource may be specified.

Policies designed to create an information barrier are typically implemented in finance, legal, manufacturing, and other industries to prevent personnel in a company from carrying out tasks that may result in a "conflict of interests" situation. For example in the finance industry, security regulations often prohibit staffs in a trading group of a company from exchanging information related to securities with staffs in other product or service groups of the company.

Therefore, an information barrier needs to be created between the trading group and other groups in the company. An example of the manufacturing industry, a contract manufacturer of technology products may serve two or more clients which compete in the same market. The contract manufacturer is responsible for protecting intellectual properties, project plans, marketing and sales data and other confidential and proprietary information of each client. As a result, information barriers are erected among groups of employees working on products of different clients. The information barriers described in the above examples may be implemented using policies based on the policy language described in the above.

In a centralized decision system, the decision may be made by a policy engine (or policy decision point) at a central server. In a distributed decision system, the decision may be made by a policy engine residing on the users device. A system may be a combination of centralized and distributed decision making.

The following discusses binding in more detail. For the purpose of illustration, the following examples show binding of one policy in the policy binding step (in a policy server). In practice, the binding step can select any number of policies, such as no policies, one policy, two policies, three policies, or four or more policies relevant to a target, one or more policy abstractions relevant to a target, one or more policy abstractions associated with the selected policies, one or more policies associated with the selected policy abstractions, or any combination of these.

Figure 22:
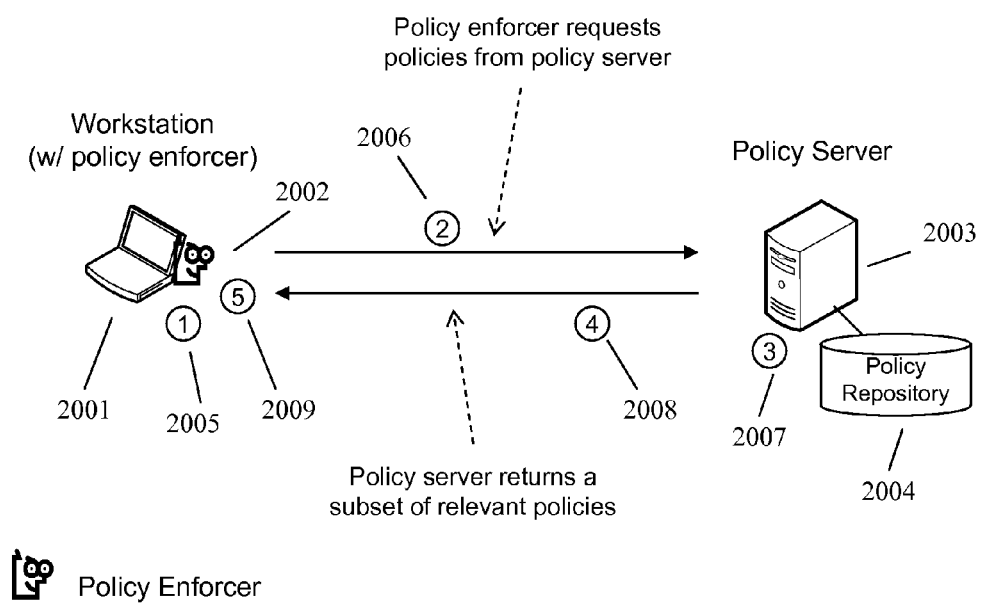
FIG. 22 shows an example of a deployment operation to a workstation of an information management system.

FIG. 22 shows an example of late policy binding which occurs when a client workstation 2001 request for policies after it starts up. Below is a policy that successfully binds to the client workstation based on a target profile provided by the client workstation. This example also illustrates the function of a "pull" mode of policy distribution.

```
FOR document.name = "*.doc" OR document.name = "*.xls"
ON COPY
BY user = Finance
WHERE device.type = "workstation" AND
destination.device.category = "portable"
DO ALLOW AND ENCRYPT AND LOG
OTHERS ALLOW
```

The simplified system described in this example includes a client workstation 2001 which has a policy enforcer installed 2002 and a policy server 2003. In a step 1 (2005), the policy enforcer performs its function at client workstation start up. The policy enforcer attempts to contact the policy server in a step 2 (2006) trying to obtain an initial set of policies relevant to the client workstation or obtain a policy update. In the process, the policy enforcer provides the policy server with a target profile which includes information such as client workstation's host name, IP address, and other relevant information.

In a step 3 (2007), the policy server receives the request initiated by the policy enforcer on the client workstation. The policy server processes the request by selecting relevant policies from a policy repository 2004. The selection process results in a subset of policies matching the target profile which may include zero, one, or more than one policy. This selection process is called policy binding. The resulting subset of policies and related support information together is called a policy bundle.

During the binding process, a policy server can make intelligent decision on whether a policy is relevant to a target based on an analysis of different elements in a policy combined with information about the target. For example, the binding process may identify a policy applies to file access based on information specified in the policy's resource element. At the same time, the target profile indicates that the target can only handle e-mail messages and calendar functions but not file access. The binding process decides that such policy is not relevant to the target. In addition, the binding process can also use deployment directives entered by a policy author to determine if the policy relevant to the target.

This example assumes that the binding process resulted in the selection of the above policy because the target profile specifies a device type of "workstation" (the device type may be provided by the policy enforcer directly or by looking up information stored in a LDAP directory) and the context element (or WHERE element) in the above policy specifies the policy applies to a workstation. In this case, the policy bundle created by the policy binding process includes the above policy and information relevant to that policy.

In a specific implementation where a management system supports policy abstraction, the policy binding process includes selection of policy abstractions associated with the selected policies and policy abstractions matching the target profile along with other related policy abstractions and policies. The binding process may also produce additional information relevant to support evaluation of the selected policies and policy abstractions. In this case, the policy bundle created by the policy binding process includes a subset of policies, a subset of policy abstractions and all relevant information. The relevant information may include configurations and support data.

In a specific implementation where a management system does not require dynamic distribution of policies, the policy binding process selects policies and policy abstractions matching a target profile and all policy abstractions being referenced. The binding process may also produce additional information relevant to support evaluation of the selected policies and policy abstractions. In this case, the policy bundle created by the policy binding process includes a subset of policy abstractions and all relevant information (where the selected policies are excluded).

In a specific implementation where a management system does not require dynamic distribution of policy abstractions, the policy binding process selects policies and policy abstractions matching the target profile and all policy abstractions being referenced. The binding process may also produce additional information relevant to support evaluation of the selected policies. In this case, the policy bundle created by the policy binding process includes a subset of policies and all relevant information (where the selected policy abstractions are excluded).

If a policy bundle is produced in step 3, the policy server returns a policy bundle to the client workstation in a step 4 (2008) along with any additional support information.

In a specific implementation, the policy server performs optimization on policies and policy abstractions produced by the policy binding process and transfer the optimized subset of policies and policy abstractions in a policy bundle to the client workstation. The optimized policies and policy abstractions may have the same policies format as the preoptimized policies or may be transformed to a different policy format.

In a specific implementation, the policy server performs optimization on policies produced by the policy binding process and transfer the optimized subset of policies in a policy bundle to the client workstation. The optimized policies and policy abstractions may have the same policies format as the preoptimized policies or may be transformed to a different policy format.

In a specific implementation, the policy server performs optimization on policy abstractions produced by the policy binding process and transfer the optimized subset of policy abstractions in a policy bundle to the client workstation. The optimized policies and policy abstractions may have the same policies format as the preoptimized policies or may be transformed to a different policy format.

In a specific implementation, the policy server compiles a list of differences between the subset of policies and policy abstractions produced in the policy binding process and the subset of policies and policy abstractions on the client workstation and transmits the list of differences and other supporting information in a policy bundle to the client workstation.

In a specific implementation, the policy server compiles a list of differences between the subset of policies produced in the policy binding process and the subset of policies on the client workstation and transmits the list of differences and other supporting information in a policy bundle to the client workstation.

In a specific implementation, the policy server compiles a list of differences between the subset of policy abstractions produced in the policy binding process and the subset of policy abstractions on the client workstation and transmits the list of differences and other supporting information in a policy bundle to the client workstation.

The client workstation receives a response from the policy server in step 5 (2009). If the policy binding process in step 3 produces a policy bundle, the response contains a policy bundle. The subset of policies in the policy bundle is enforced at the client workstation.

In a specific implementation, the policy bundle received by the client workstation replaces the subset of policies or policy abstractions, or both, on the workstation.

In a specific implementation where multiple subsets of policies or policy abstractions, or both, are supported by a client workstation policy enforcer, the policy bundle received replaces at least one subset of policies or policy abstractions, or both, on the client workstation or combine with at least one existing subset of policies or policy abstractions, or both, on a workstation.

In a specific implementation where a client workstation policy enforcer supports transferring a list of differences in a policy bundle, the client workstation policy enforcer applies the list of differences in the policy bundle received to at least one subset of existing policies or policy abstractions, or both, to reconstruct the desired at least one subset of policies or policy abstractions, or both.

For ease of explanation, the followings are not shown in the above example: (1) policies not bound to the client workstation; (2) other policies (in additional to the one shown above) that bind to the client workstation; (3) policy abstractions associated with the above policy and other policies bound to the client workstation; and (4) policy abstractions not bound to the client workstation.

An aspect of deployment is that code is inspected before it is associated with a particular target. Code is associated to a target based on an inspection of the code. A target may be a device or a user. A number of code components may be inspected at one time and then transferred or otherwise associated to a target based on the target's profile. A code component may be a policy of an information management system.

In an implementation, the invention is a method including providing a number of code components; providing a number of devices having device profiles; and inspecting contents of the code components. The method includes based on a result of the inspection of the contents of the code components and the device profiles, determining which of the devices to associate a code component with.

The code component may be a policy or policy abstraction of a information management system. Further examples of a code component include a statement, a statement having at least one expression, a statement having at least one variable, a script, an uncompiled C language file, an uncompiled high-level programming language file, an ASCII file, an expression, an expression having at least one variable, a binary file, and an executable file.

The associated code with a device may be transferred to the device. If the code are policies, these will be the policies that are relevant to the device and govern access to information via the device. The associated code may be altered in some way, such as optimized, translated, or converted to a different form.

For example, the associated code may have common subexpressions replaced before transferred the code to the associated device.

In an implementation, the invention is a system including a database having a number of policies and a number of devices, each having a profile. There is an inspection engine having executable code to cause inspection of each of the policies and executable code to determine based on the result of the inspection and the profiles of the devices which of the devices each of the policies will be associated with.

In an implementation, the invention is a system including a number of code files and a number of devices, each having a profile. There is an inspection engine including executable code to cause inspection of each of the code files and executable code to determine based on the result of the inspection and the profiles of the devices which of the devices each of the code files will be associated with.

In an information management system, relevant policies are deployed to targets while policies which are not relevant are not. By deploying relevant policies, this reduces the amount of space requirements at the target to store the policies and the amount of data that needs to be sent to the target. Also, execution speed at the target may increase since the target does not need to evaluate policies that are not relevant.

In an implementation, the invention is a method including providing a number of policies, where the policies are applicable to a number of target profiles, each having a set of target attributes and analyzing a policy to determine whether that policy is relevant to a specific target profile with a set of specific target attributes. The method includes determining a policy is relevant when a value of at least one of the specific target attributes is used during an evaluation of the policy. The policy may include policy abstractions.

In an implementation, the invention is a method including providing a number of policies, where the policies are applicable to a number of target profiles, each having a set of target attributes and analyzing a policy to determine whether that policy is relevant or irrelevant to a specific target profile with a set of specific target attributes. The method includes transferring relevant policies to a specific target with the specific target profile and not transferring irrelevant policies to the specific target.

Further in a specific implementation, the method may include when the specific target attributes of the specific target profile changes, reanalyzing the policy to determine whether that policy is relevant or irrelevant; and retransferring relevant policies changes to the specific target with the specific target profile with the changed specific target attributes. Alternatively, the relevant policies, not just the changes may be transferred to the specific target.

Further, in a specific implementation, the method may include disconnecting the specific target from a system and then subsequently reconnecting the specific target to the system; and after reconnecting the specific target to the system, reanalyzing the policy to determine whether the policy is relevant or irrelevant to the specific target. After reanalyzing the policy, relevant policies may be retransferred to the specific target with the specific target profile.

In an implementation, the invention is a method including providing a number of policies applicable to a number of targets, each target having a set of capabilities, where a policy includes an expression and an event; determining whether a policy is relevant or irrelevant to a specific target; and transferring relevant policies to the specific target and not transferring irrelevant policies to the specific target. Relevant policies may be evaluated at the target.

In a further aspect of deployment, policies are deployed to targets and targets can evaluate the policies whether they are connected or disconnected to the system. The policies may be transferred to the target, which may be a device or user. Relevant policies may be transferred while not relevant policies are not. The policies may have policy abstractions.

In an implementation, the invention includes a method of operating an information management system including providing a device having a decision engine to manage information accessible via the device according to a first set of policies stored on the device; connecting of the device to a network with a server having access to a central policy database; and via the server, sending the device a second set of policies to replace the first set of policies. The method includes after receiving the second set of policies at the device, using the decision engine to manage information accessible via the device according to the second set of policies, whether the device is connected or disconnected from the network.

In an implementation, the invention includes a method of operating an information management system including providing a device having a decision engine to manage information accessible via the device according to a first set of policies stored on the device; connecting of the device to a network with a server having access to a central policy database; and via the server, sending the device a second set of policies. The method includes after receiving the second set of policies at the device, using the decision engine to manage information accessible via the device according to a combination of the first and second set of policies, whether the device is connected or disconnected from the network.

In an implementation, the invention includes a method of operating an information management system including providing a device having a decision engine to manage information accessible via the device according to a first set of policies stored on the device; connecting of the device to a network with a server having access to a central policy database; and via the server, sending the device a set of policy alterations. The method includes on the device, altering the first set of policies based on the set of policy alterations to obtain a second set of policies; and after altering the first set of policies, using the decision engine to manage information accessible via the device according to the second set of policies, whether the device is connected or disconnected from the network.

In an implementation, the invention includes a method of managing information of a network including providing a server handling a first policy language having access to a policy database; providing a first device having a decision engine to manage information accessible via the device according to a first set of policies stored on the device, where the first set of policies is associated with the first policy language; and providing a second device that handles a second policy language. The method includes translating a first policy of the policy database into the second policy language and transferring the first policy in the second policy language to the second device.

In an implementation, the invention includes a method of managing information of a network including providing a number of rules, where a rule includes an expression; providing a device having a target profile; and determining a subset of the rules relevant to the target profile, where the target profile indicates applications available on the device. The method includes transferring the subset of rules to the device having the target profile and controlling access to the information based on the subset of rules.

In an implementation, the invention includes a method of managing information of a network including providing a number of policies on a server; selecting a subset of policies of the server to transfer to a device based on attributes associated with the device; transferring the subset of policies to the device; and controlling access of information by the device using the subset of policies.

In an implementation, the invention includes a method including providing a first policy having an expression where an evaluation of the expression requires information provided by a first device of a network. When a second device is connected to a network, the first policy is deployed on the second device by altering the first policy to obtain a second policy by removing a reference in the expression to the information provided by the first device of the network; and transferring the second policy to the second device. The method includes enforcing the second policy on the second device, where enforcement of the second policy does not request information from the first device.

In an implementation, the invention includes a method including providing a first policy having an expression where an evaluation of the expression requires information provided by a first device of a network. When a user logs onto a second device, which is connected to a network, the first policy is deployed on the second device by altering the first policy to obtain a second policy by removing a reference in the expression to the information provided by the first device of the network; and transferring the second policy to the second device. The method includes enforcing the second policy on the second device, where enforcement of the second policy does not request information from the first device.

Figure 23:
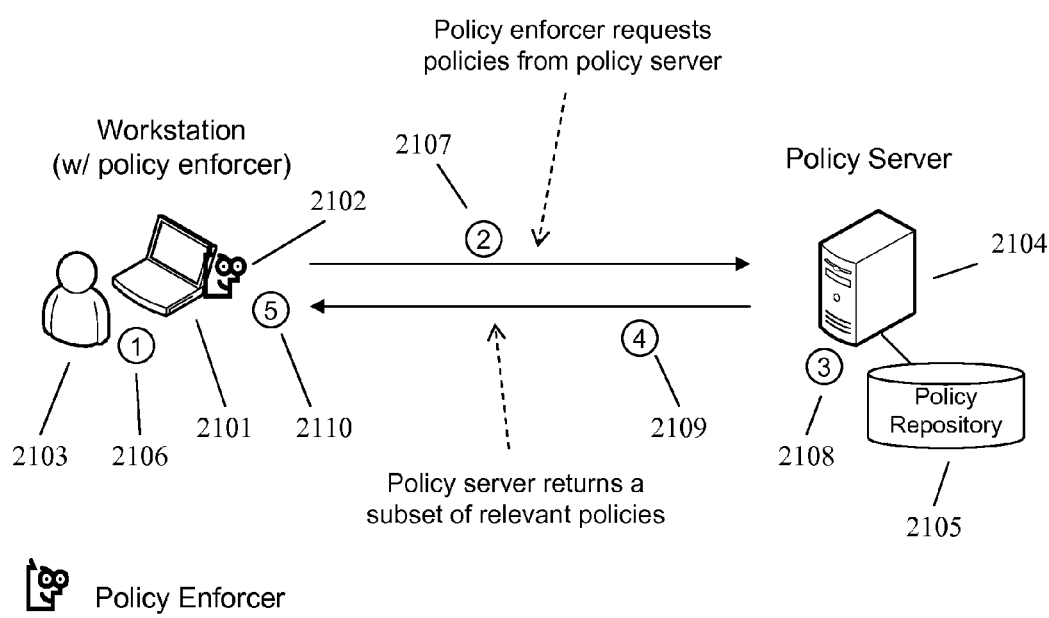
FIG. 23 shows an example of a deployment operation of rules associated with a user.

FIG. 23 shows an example of late policy binding which occurs when a user 2103 logs on to a client workstation 2101. The policy enforcer 2102 on the client workstation requests for policies relevant to the user. Below is a policy that successfully binds to the user based on a target profile provided by the policy enforcer. This example also illustrates the function of a "pull" mode of policy distribution.

```
FOR document.name = "file://server1/**"
  OR document.name = "file://server2/finance/**"
  OR document.name = "http://staff.company.com/marketing/**"
  OR document = Sensitive
ON OPEN
BY user < > Managers AND user < > Executives
DO DENY
```

The simplified system described in this example includes a client workstation 2101 which has a policy enforcer installed 2102, a policy server 2104, and a policy repository 2105. In step 1 (2106), a user who is a general administration staff 2103 logs on to the client workstation. The policy enforcer on the client workstation intercepts the log on operation and contacts the policy server in a step 2 (2107) to obtain a set of policies relevant to the user or obtain a policy update. In the process, the policy enforcer provides the policy server with a target profile which includes information about the workstation and the user such as login name or SID on a Windows client.

The policy server receives the request initiated by the policy enforcer on the client workstation in a step 3 (2108) along with the target profile. The policy server processes the request by selecting relevant policies from the policy repository. The selection process results in a subset of policies matching the target profile which may include zero, one, or more than one policy. This selection process is called policy binding. The resulting subset of policies and related support information together is called a policy bundle.

During the binding process, a policy server can make intelligent decision on whether a policy is relevant to a target based on an analysis of different elements in a policy combined with information about the target. For example, the binding process may identify a policy applies to file access based on information specified in the policy's resource element. At the same time, the target profile indicates that the target can only handle e-mail messages and calendar functions but not file access. The binding process decides that such policy is not relevant to the target. In addition, the binding process can also use deployment directives entered by a policy author to determine if the policy relevant to the target.

This example assumes that the binding process resulted in the selection of the above policy because the target profile specifies a user (e.g., "mjohnson") who is neither in Managers nor Executives user groups, and matching the subject element (or BY element) of the above policy. The positive consequence of the policy suggests a blocking action making it a useful policy. In this case, the policy bundle created by the policy binding process includes the above policy and information relevant to that policy.

In a specific implementation where a management system supports policy abstraction, the policy binding process includes selection of policy abstractions associated with the selected policies and policy abstractions matching the target profile along with other policy abstractions being referenced and policies reference any selected policy abstractions. In this case, the policy abstraction "Sensitive" is included. Depending on the definitions of policy abstractions "Managers" and "Executives" and optimization techniques applied at the policy server, the policy abstractions "Managers" and "Executives" may be included. The binding process may also produce additional information relevant to support evaluation of the selected policies and policy abstractions. In this case, the policy bundle created by the policy binding process includes a subset of policies, a subset of policy abstractions and all relevant information.

If a policy bundle is produced in step 3, the policy server returns a policy bundle to the client workstation in a step 4 (2109) along with any additional support information.

In a specific implementation, the policy server performs optimization on policies and policy abstractions produced by the policy binding process and transfer the optimized subset of policies and policy abstractions in a policy bundle to the client workstation.

In a specific implementation, the policy server compiles a list of differences between the subset of policies and policy abstractions produced in the policy binding process and the subset of policies and policy abstractions on the client workstation and transmits the list of differences and other supporting information in a policy bundle to the client workstation.

The client workstation receives a response from the policy server in a step 5 (2110). If the policy binding process in step 3 produces a policy bundle, the responses contains a policy bundle. The subset of policies in the policy bundle is enforced at the client workstation.

In a specific implementation, the policy bundle received by the client workstation replaces the subset of policies or policy abstraction, or both, on the workstation.

In a specific implementation where multiple subsets of policies or policy abstractions, or both, are supported by a client workstation policy enforcer, the policy bundle received may replace one subset of policies or policy abstractions, or both, on the client workstation or combine with at least one subset of existing policies or policy abstractions, or both, on a workstation.

In a specific implementation where a client workstation policy enforcer supports transferring a list of differences in a policy bundle, the client workstation policy enforcer applies the list of differences in the policy bundle received to an existing subset of policies or policy abstractions, or both, to reconstruct the desire subset of policies or policy abstractions, or both.

For ease of explanation, the followings are not shown in the above example: (1) policies not bound to the user or the client workstation, or both; (2) other policies (in additional to the one shown above) that bind to the user or the client workstation, or both; (3) policy abstractions associated with the above policy and other policies bound to the user or the client workstation, or both; and (4) policy abstractions not bound to the user or the client workstation, or both.

Figure 24:
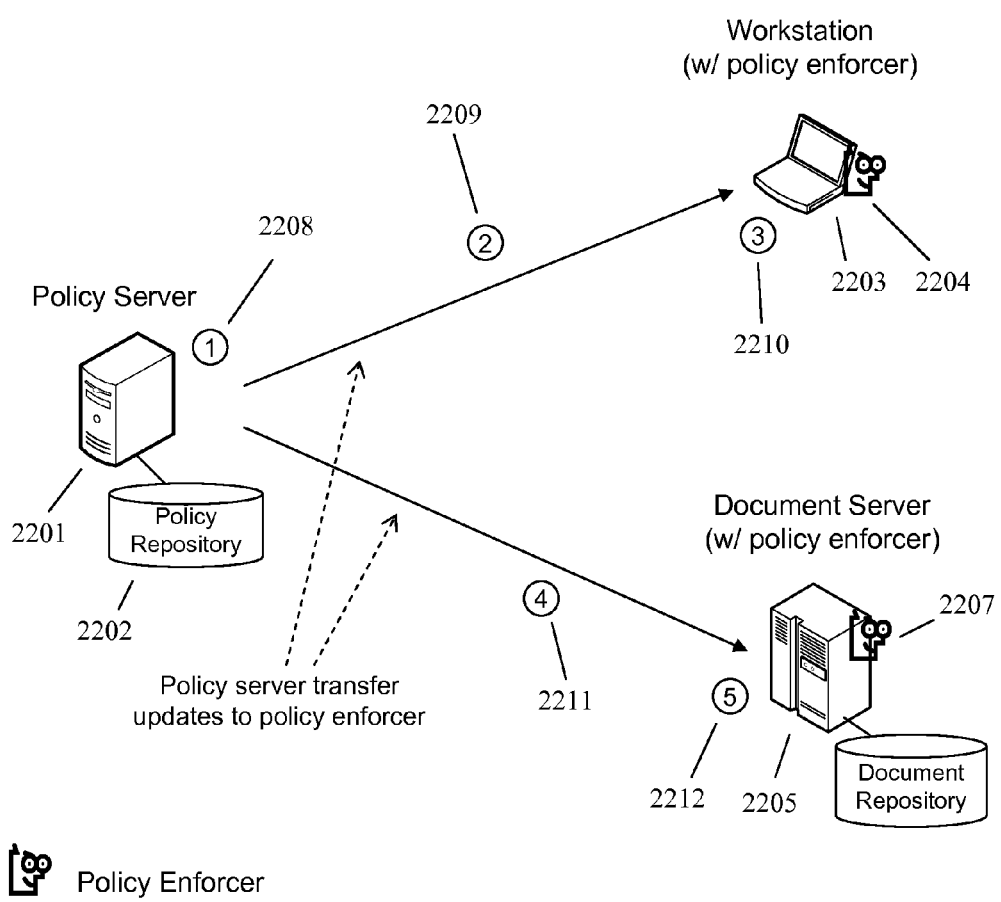
FIG. 24 shows an example of a push operation, pushing one set of rules to a workstation and another set of rules to a server.
Figure 25:
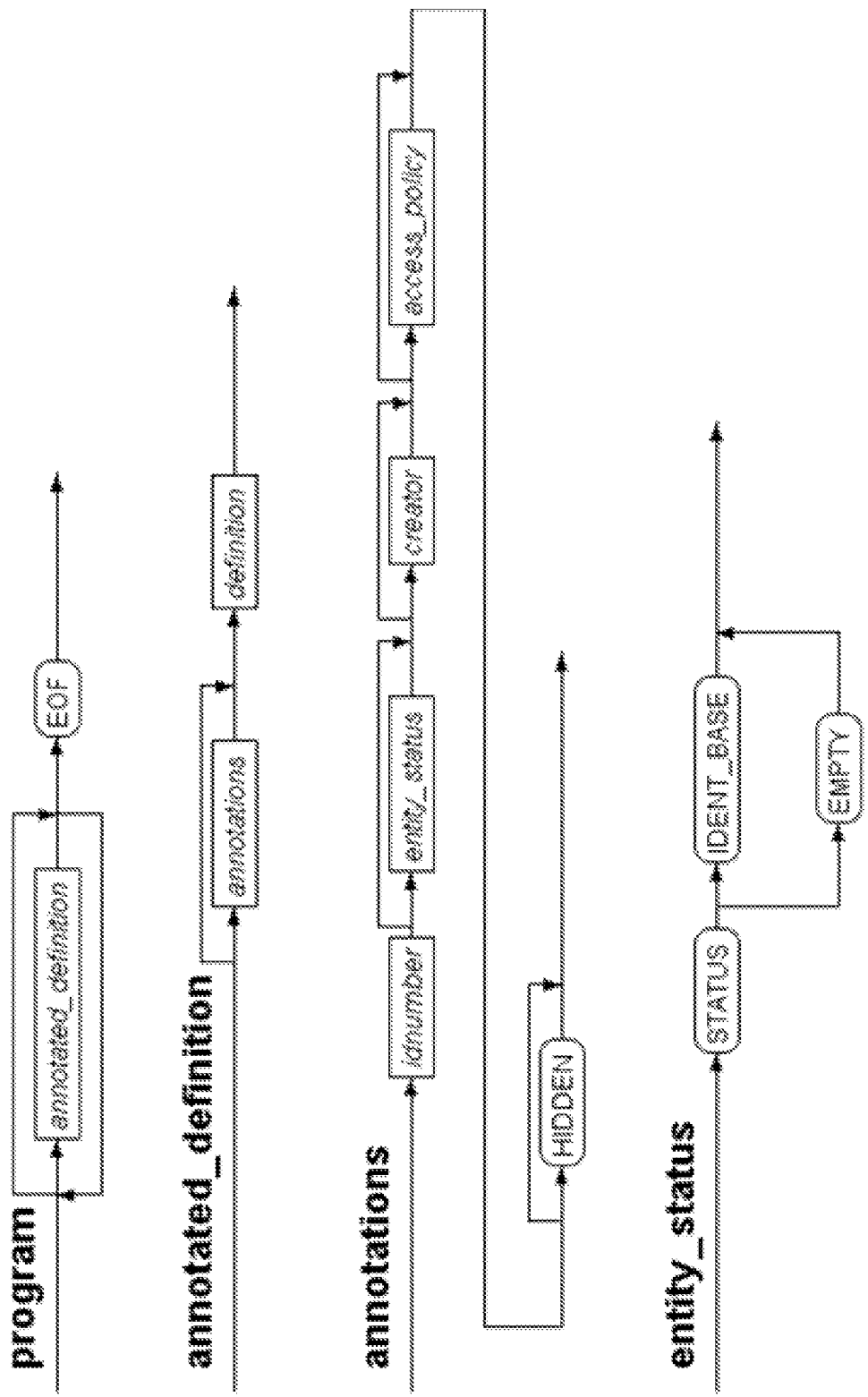
Figure 26:
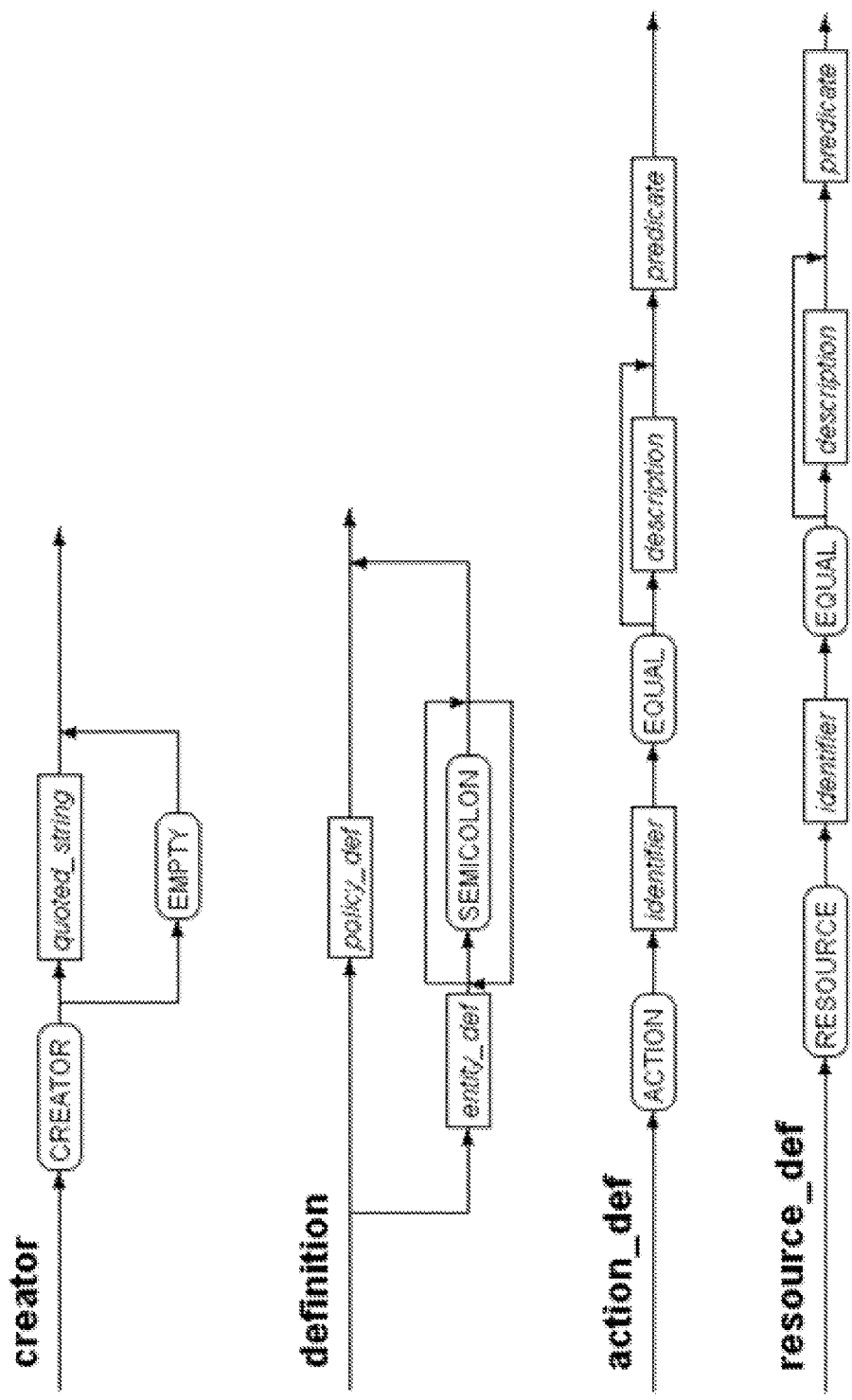
Figure 27:
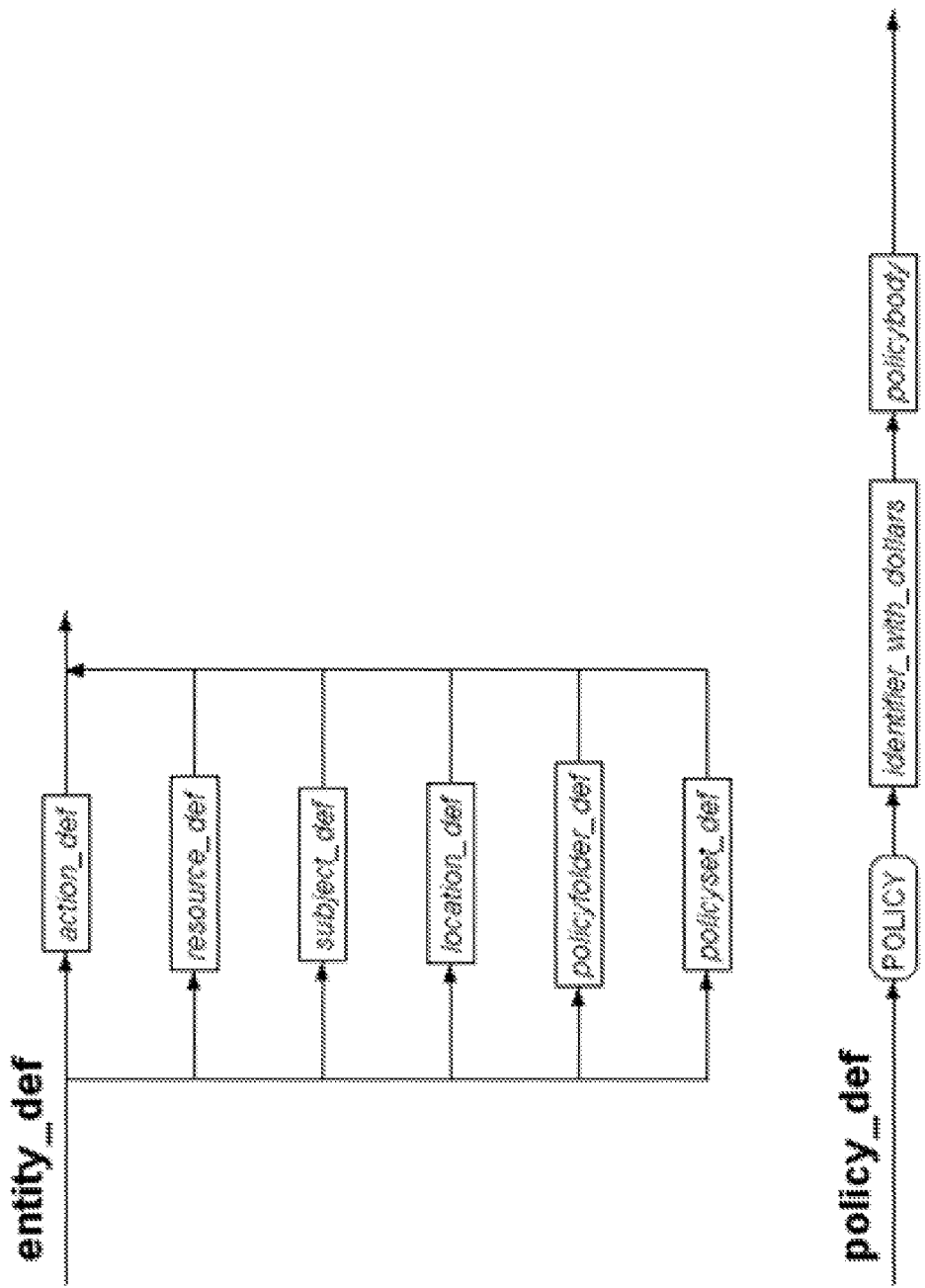
Figure 28:
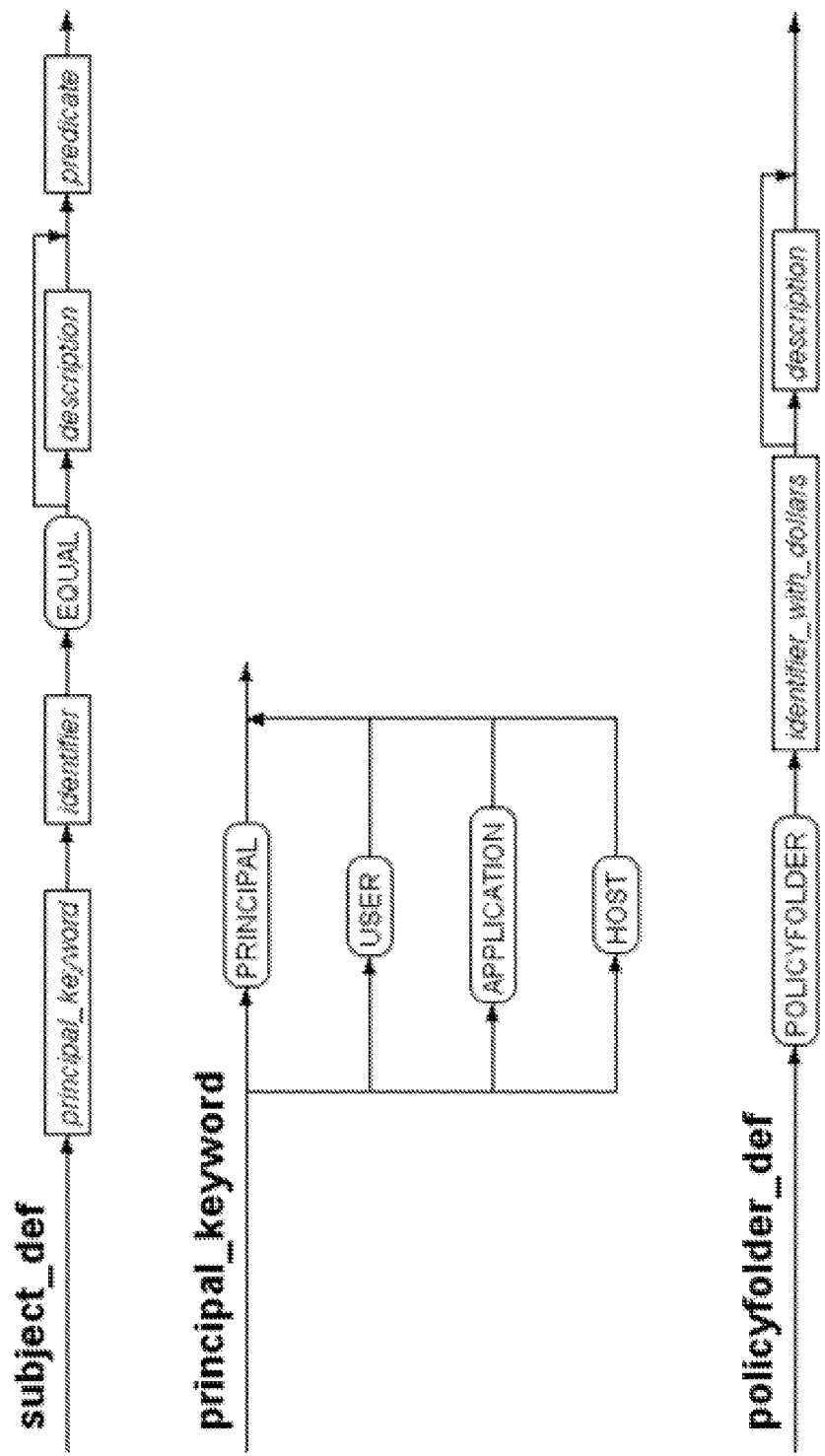
Figure 29:
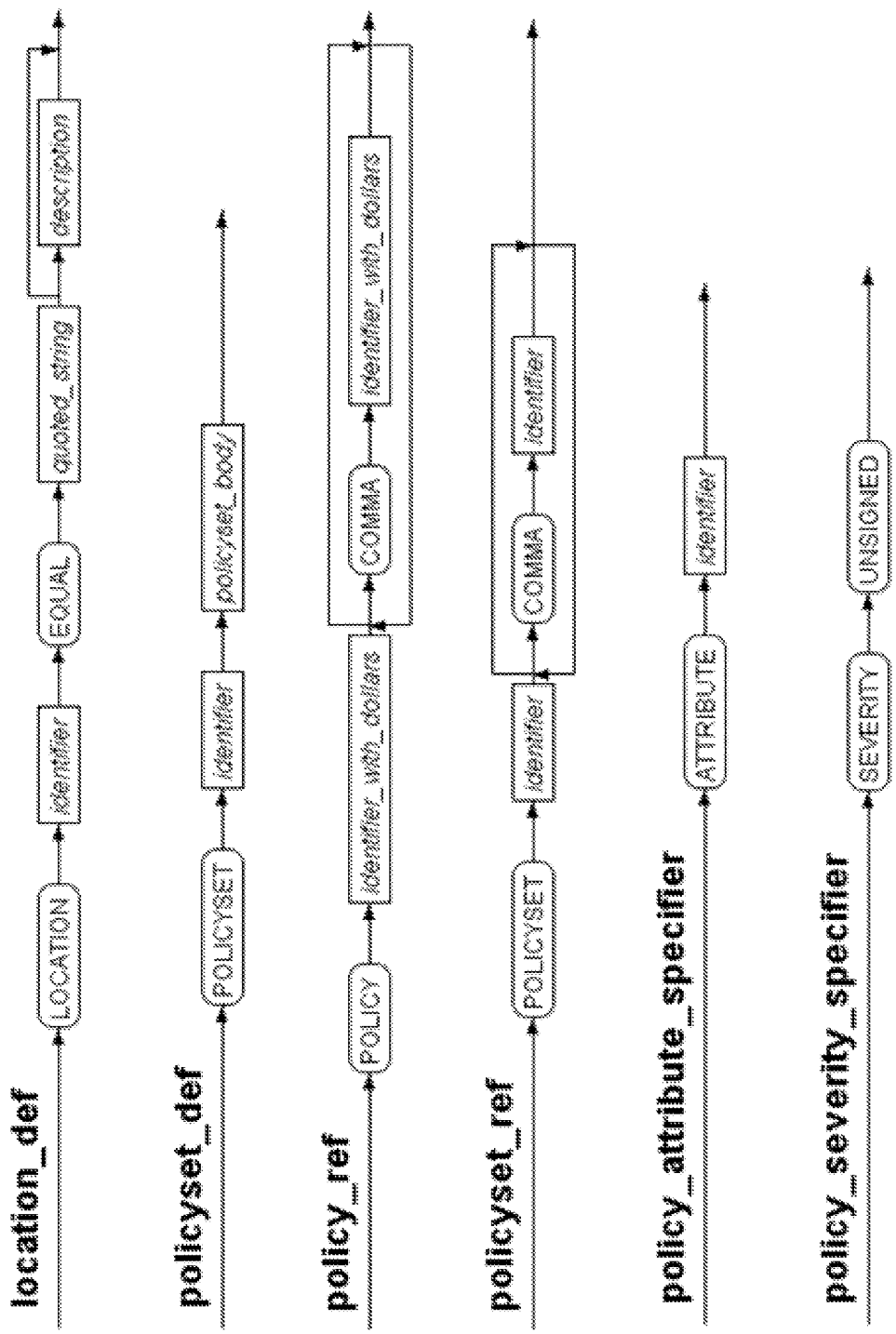
Figure 30:
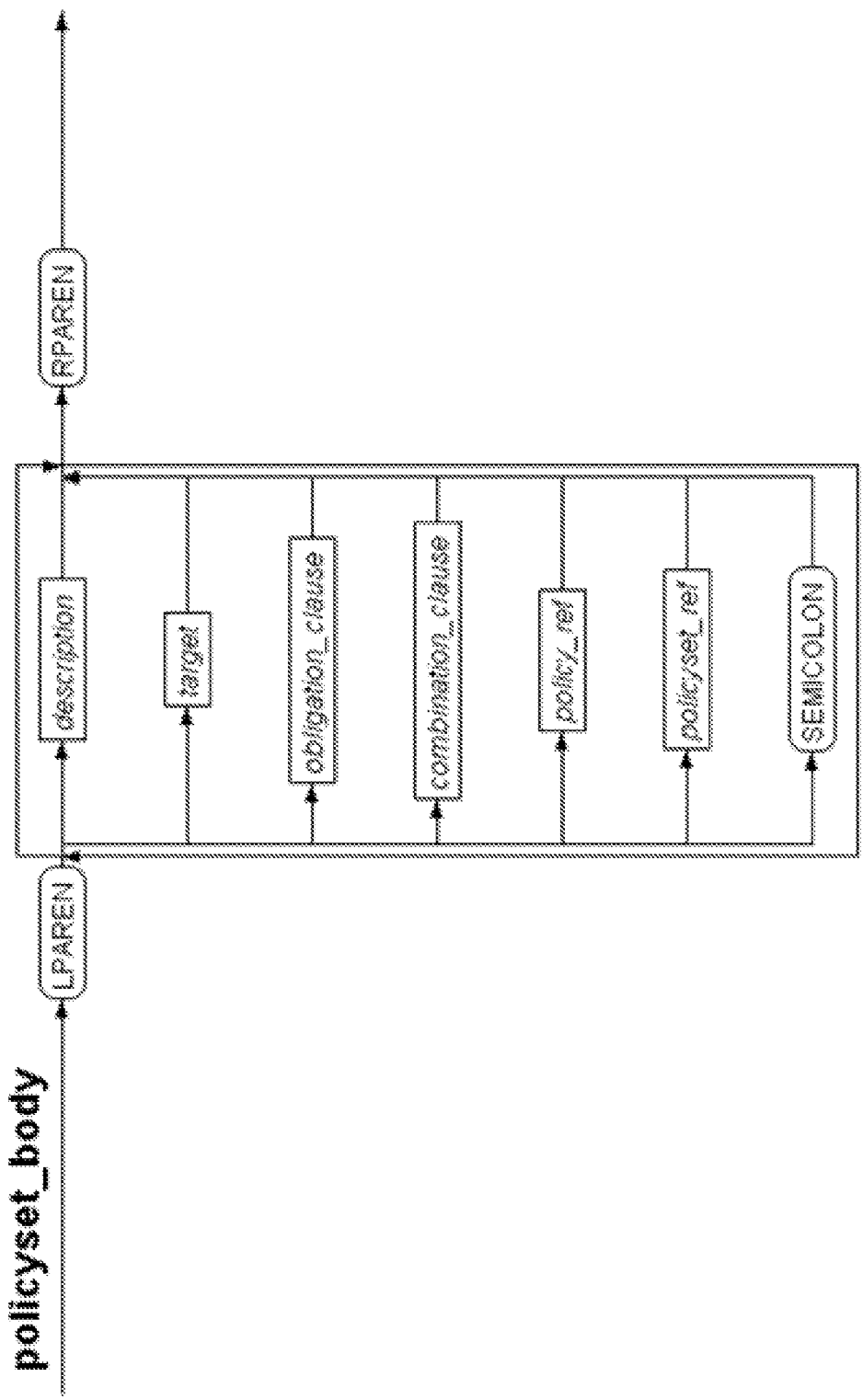
Figure 31:
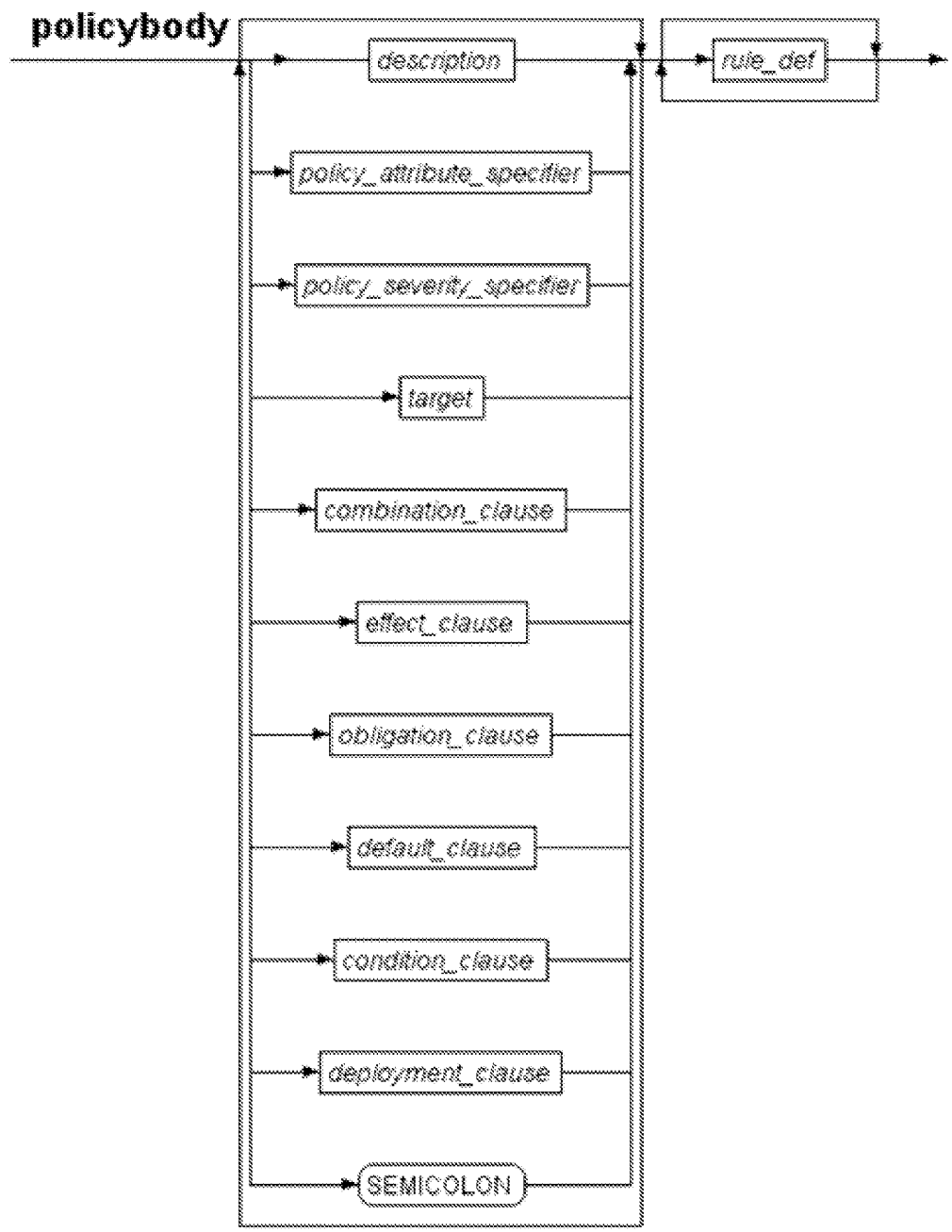
Figure 32:
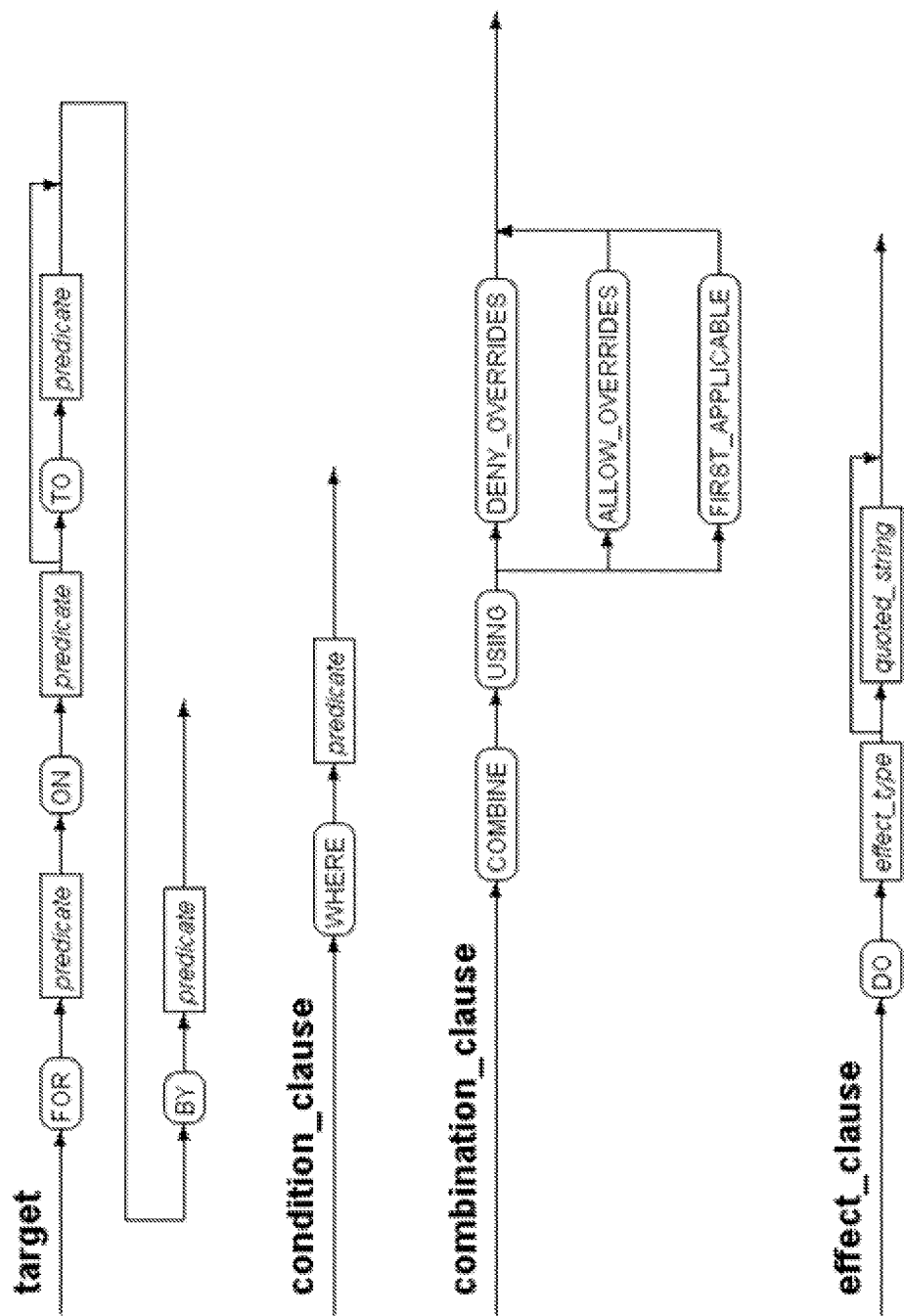
Figure 33:
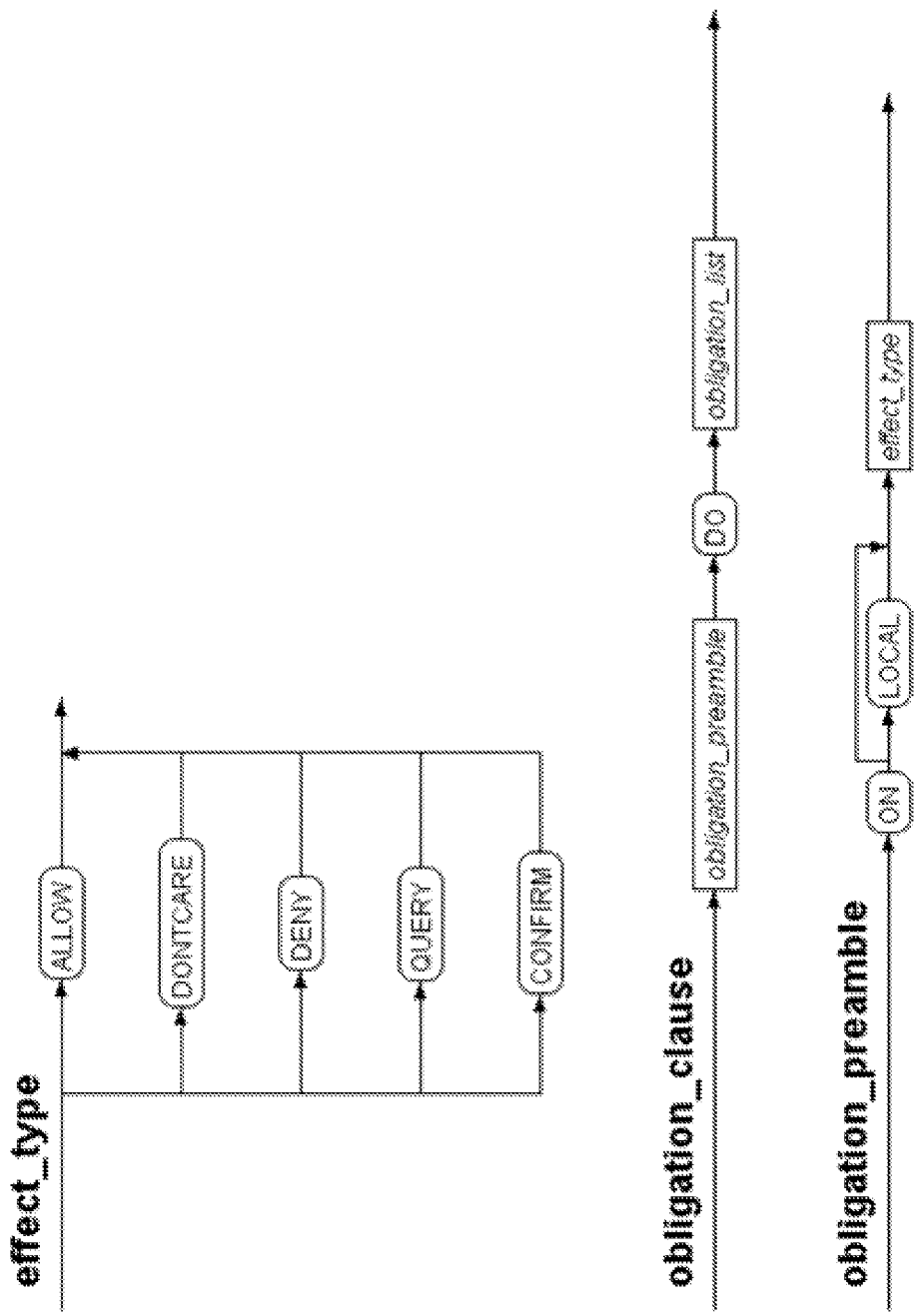
Figure 34:
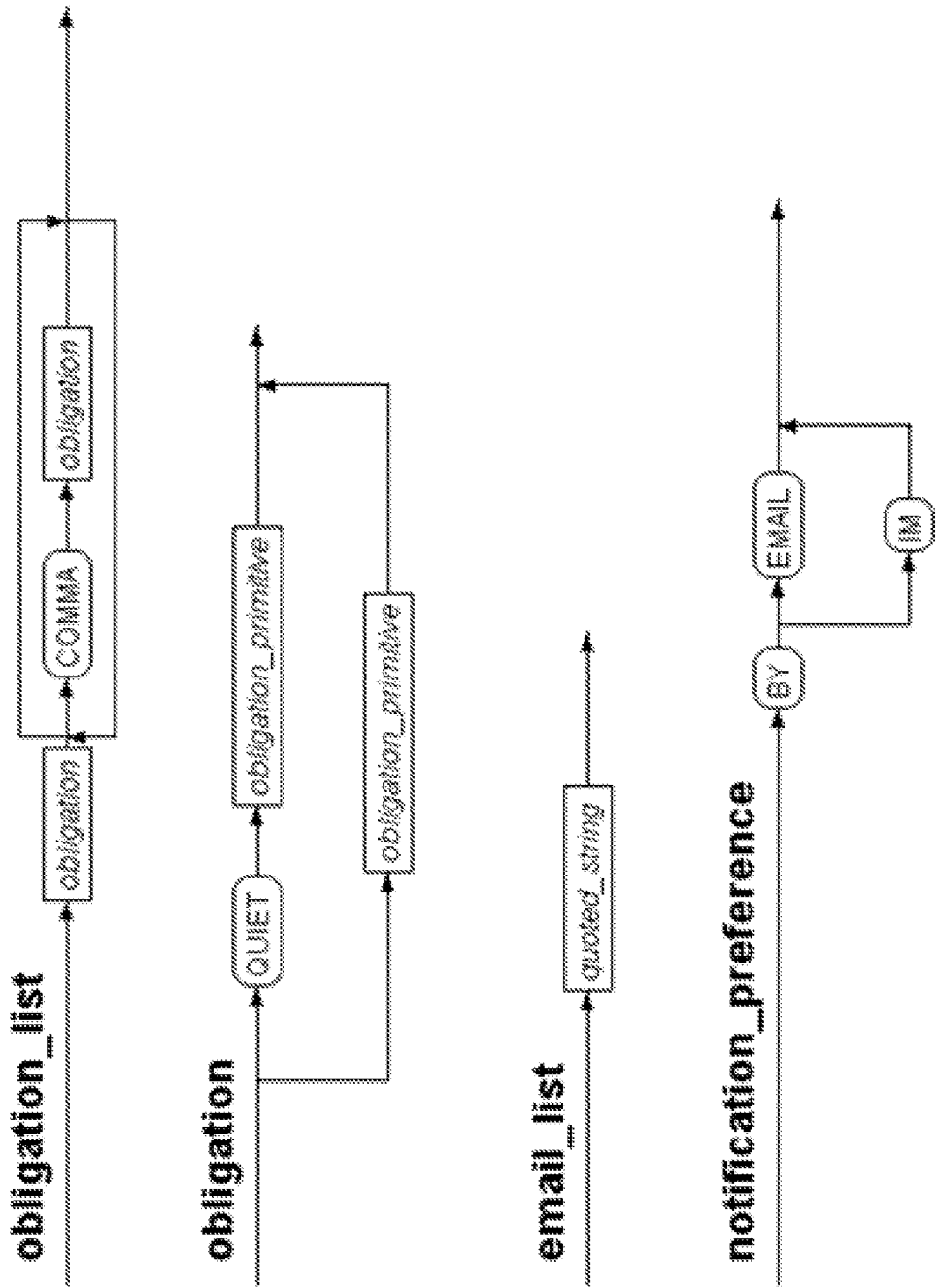
Figure 35:
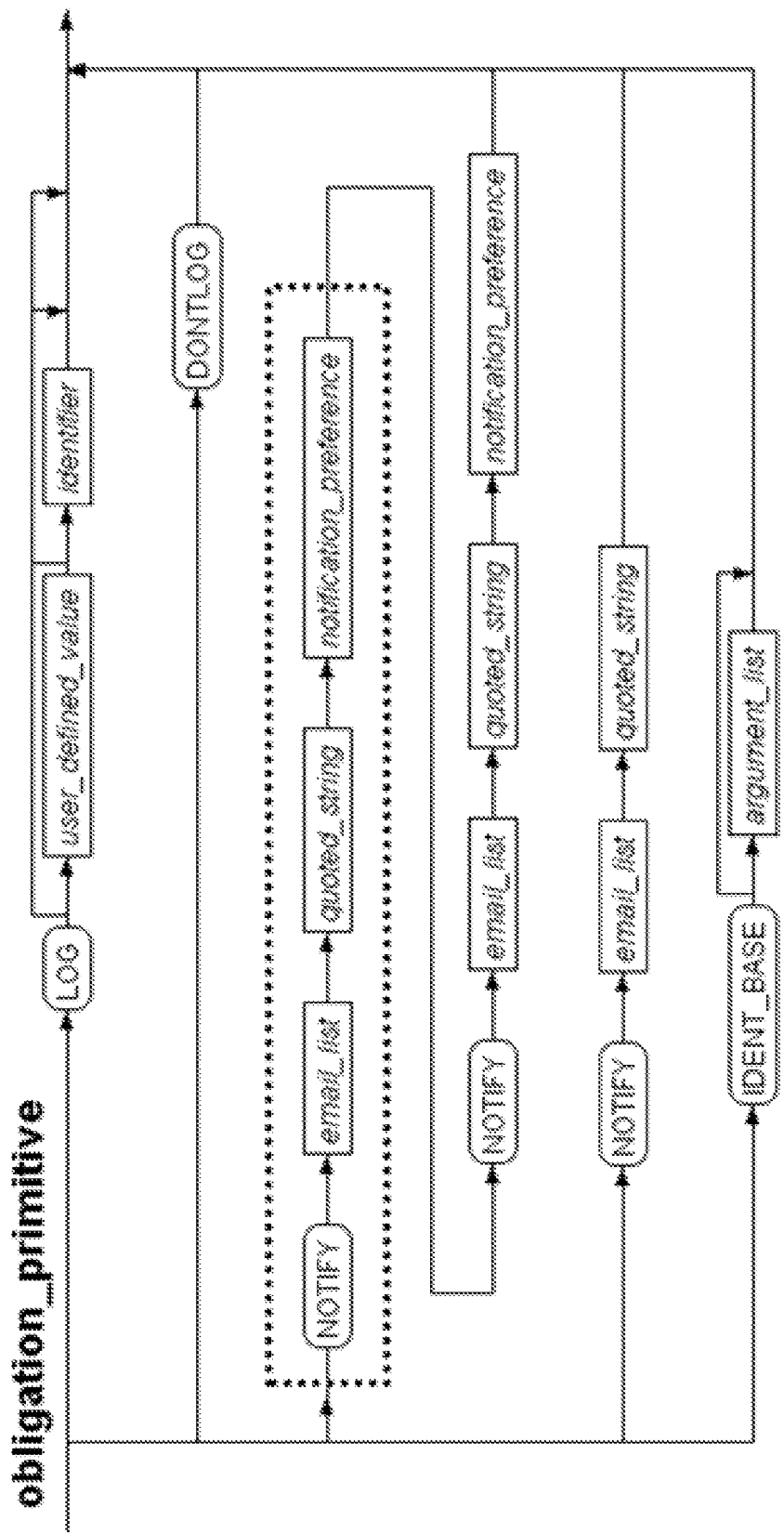
Figure 36:
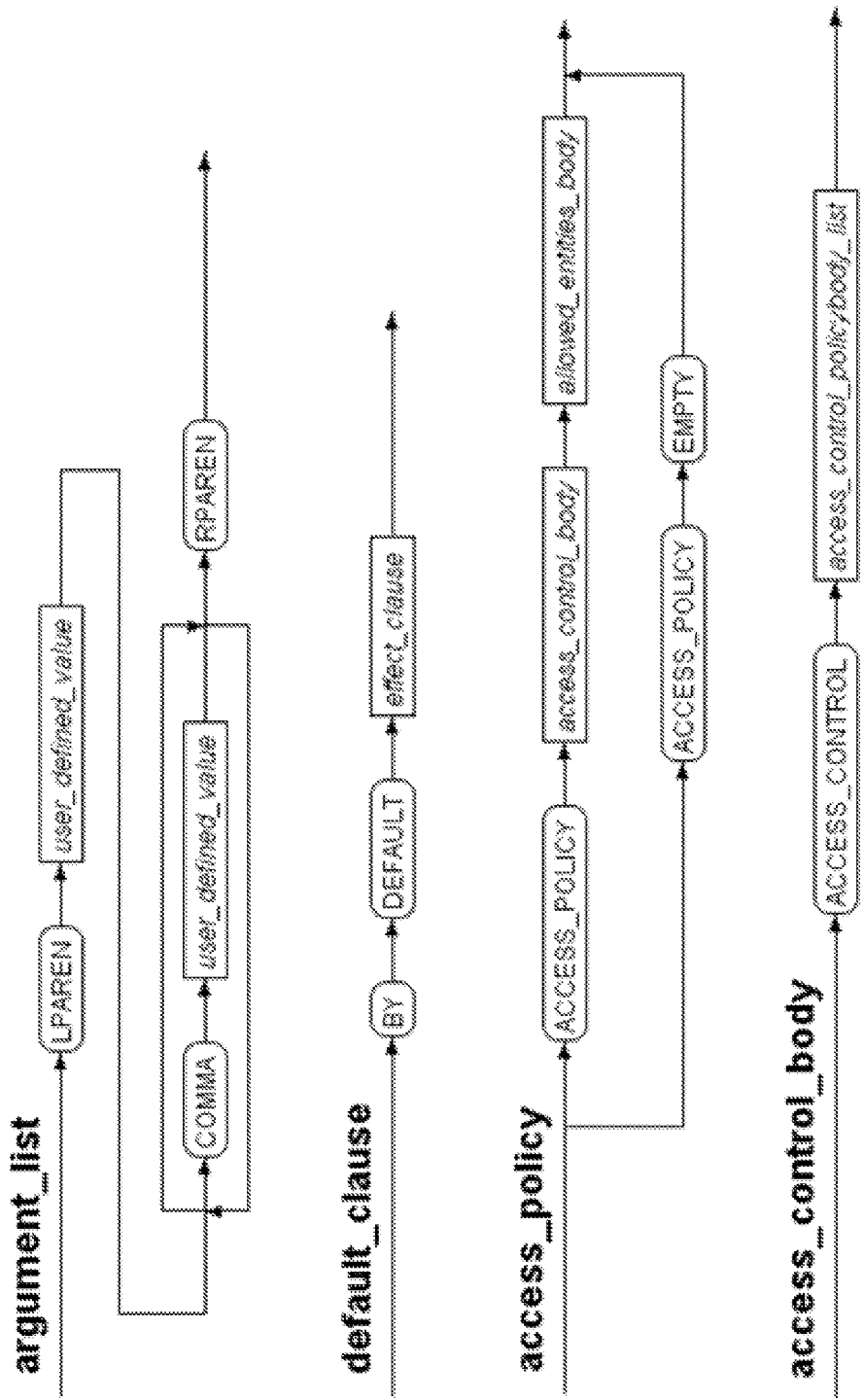
Figure 37:
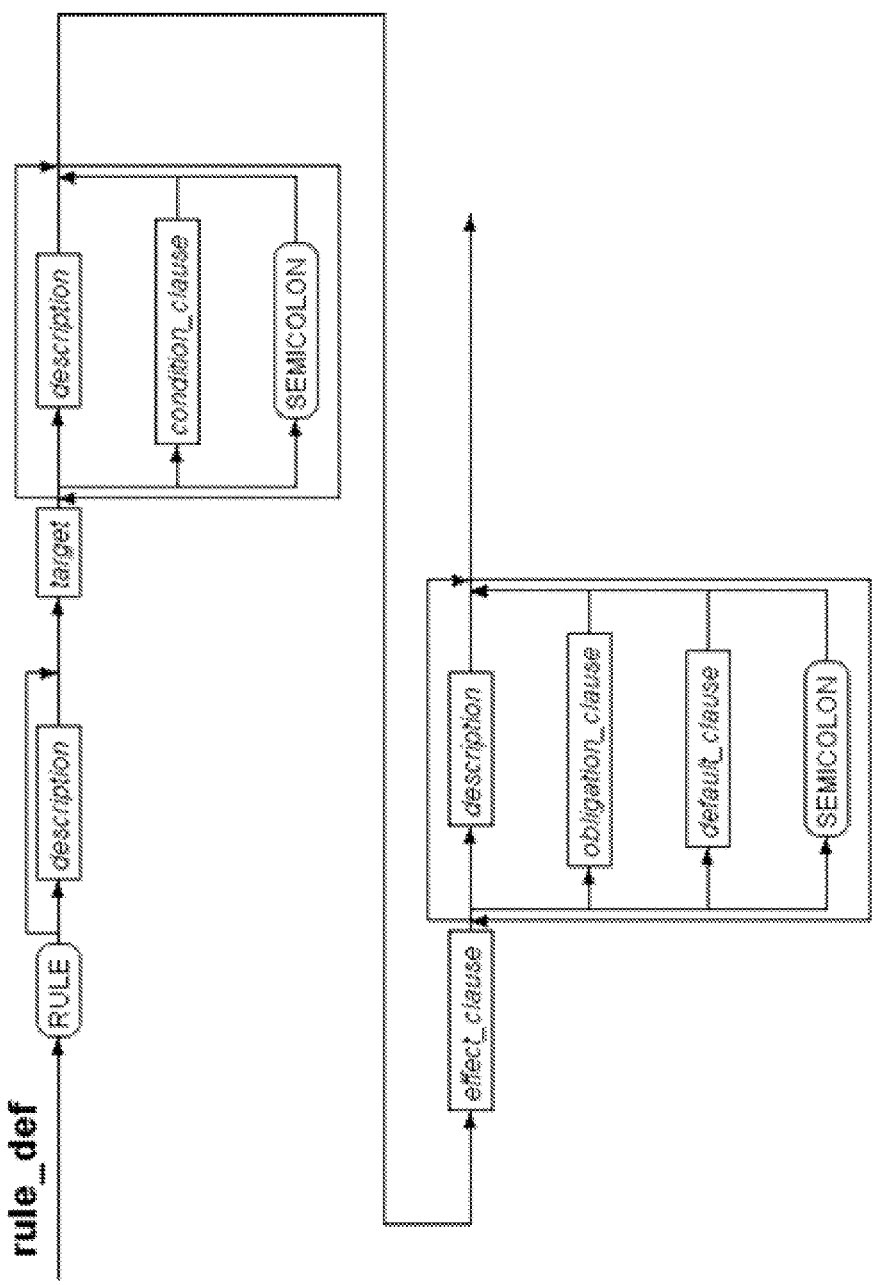
Figure 38:
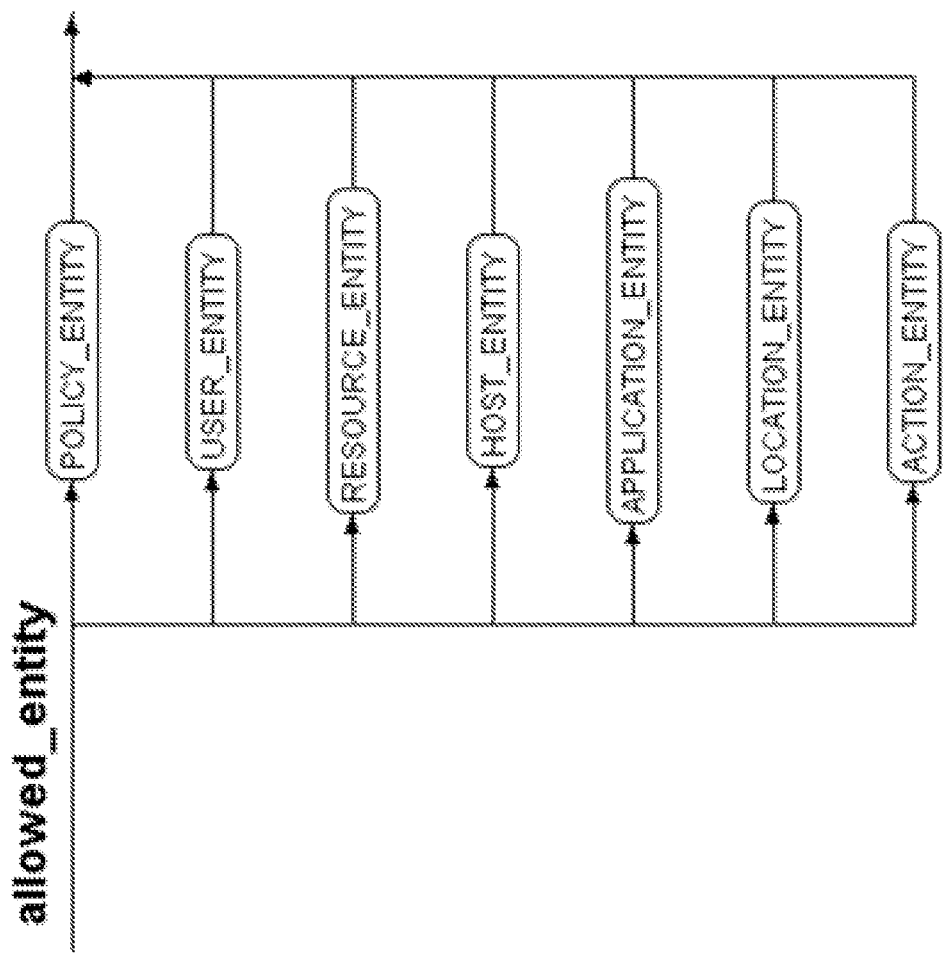
Figure 39:
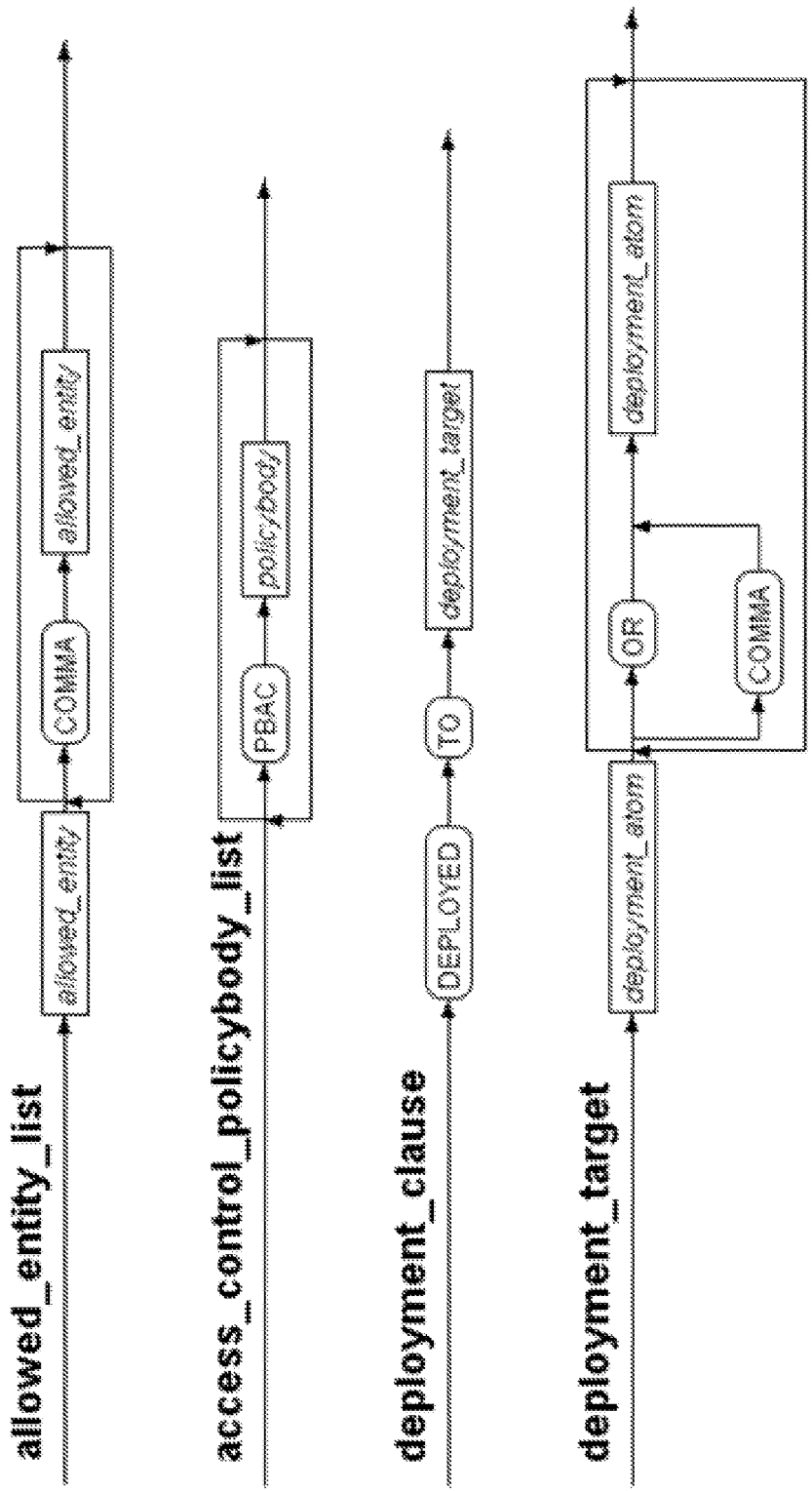
Figure 40:
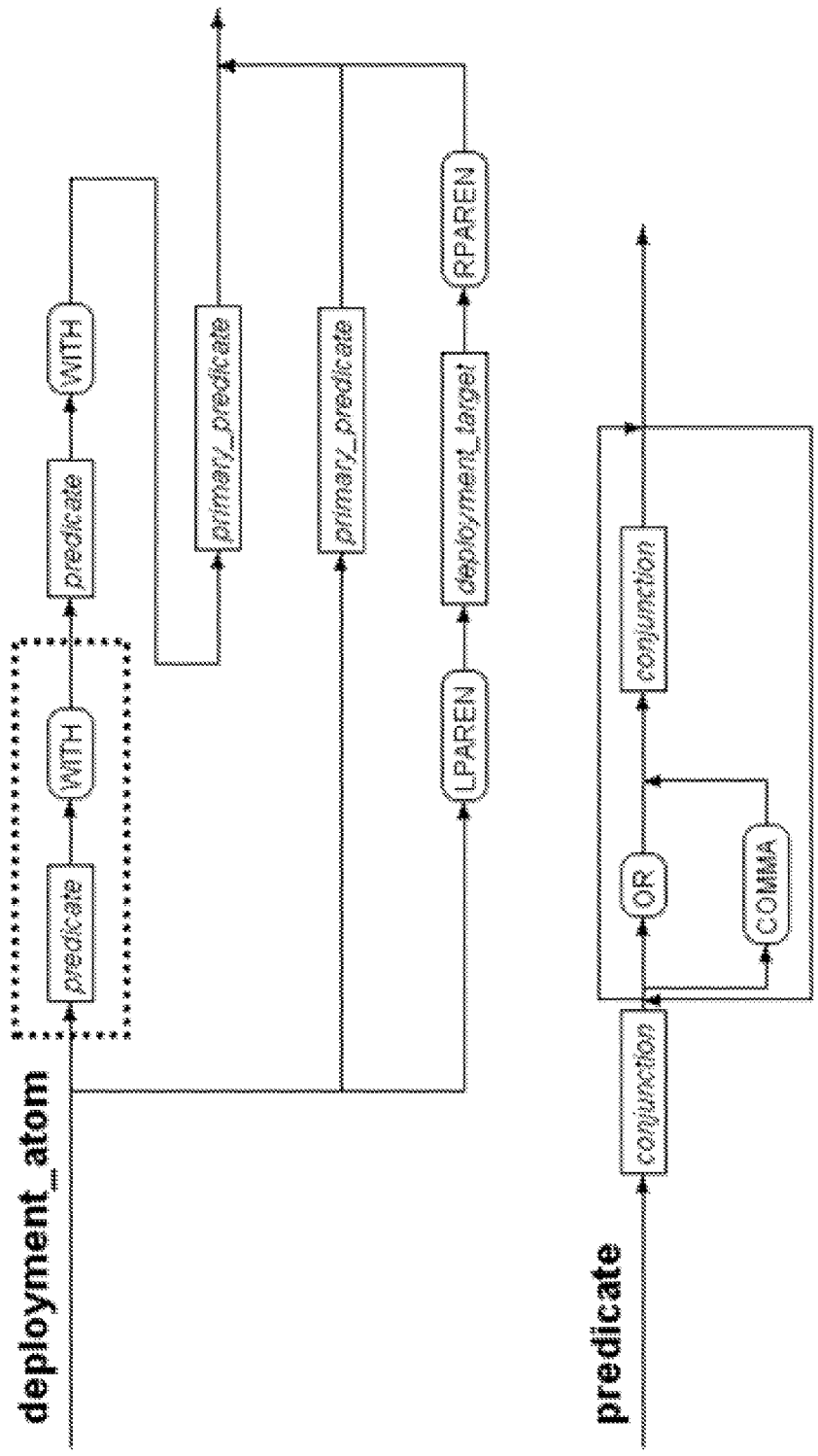
Figure 41:
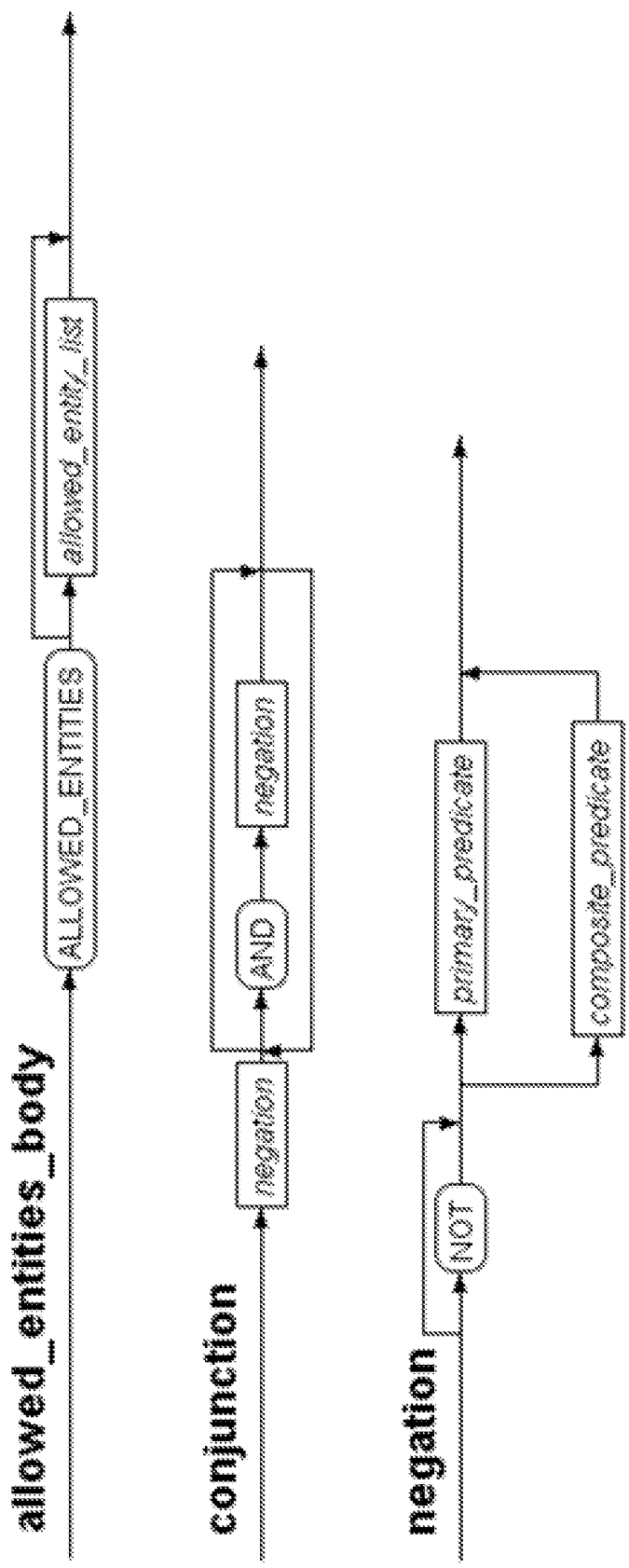
Figure 42:
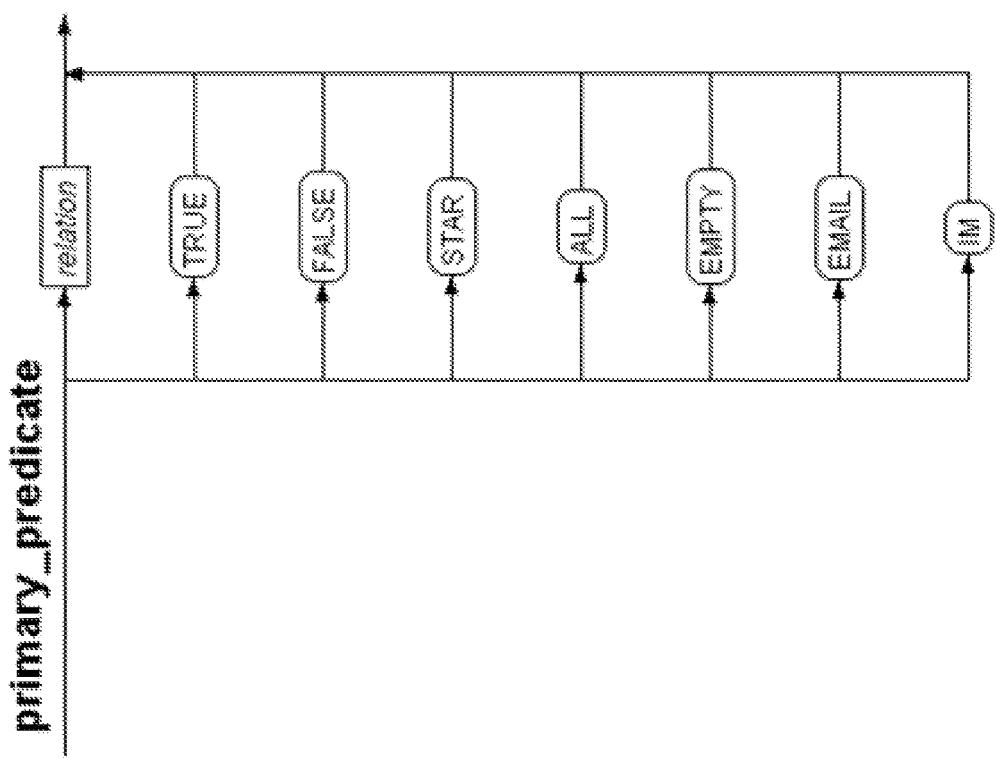
Figure 43:
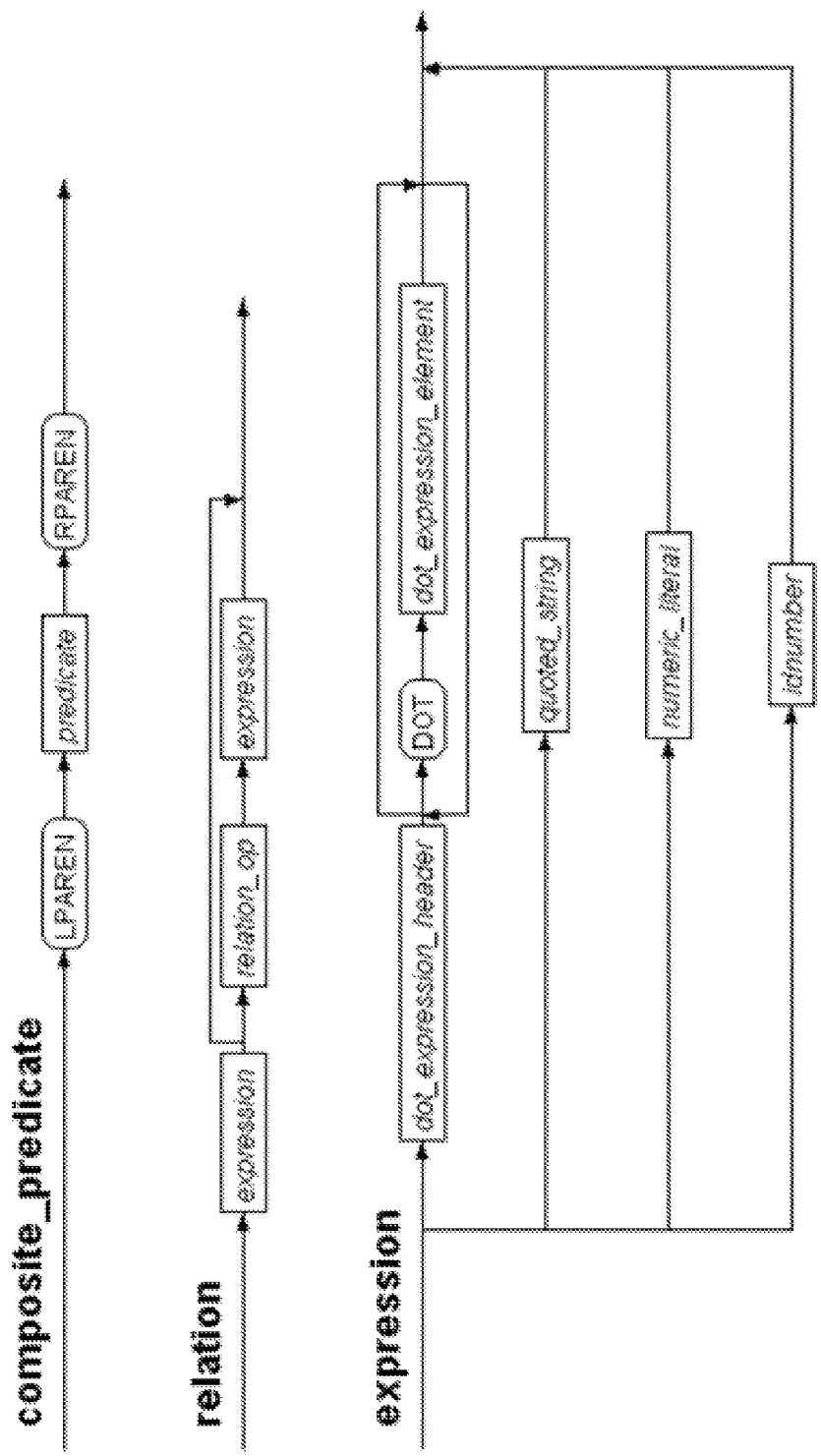
Figure 44:
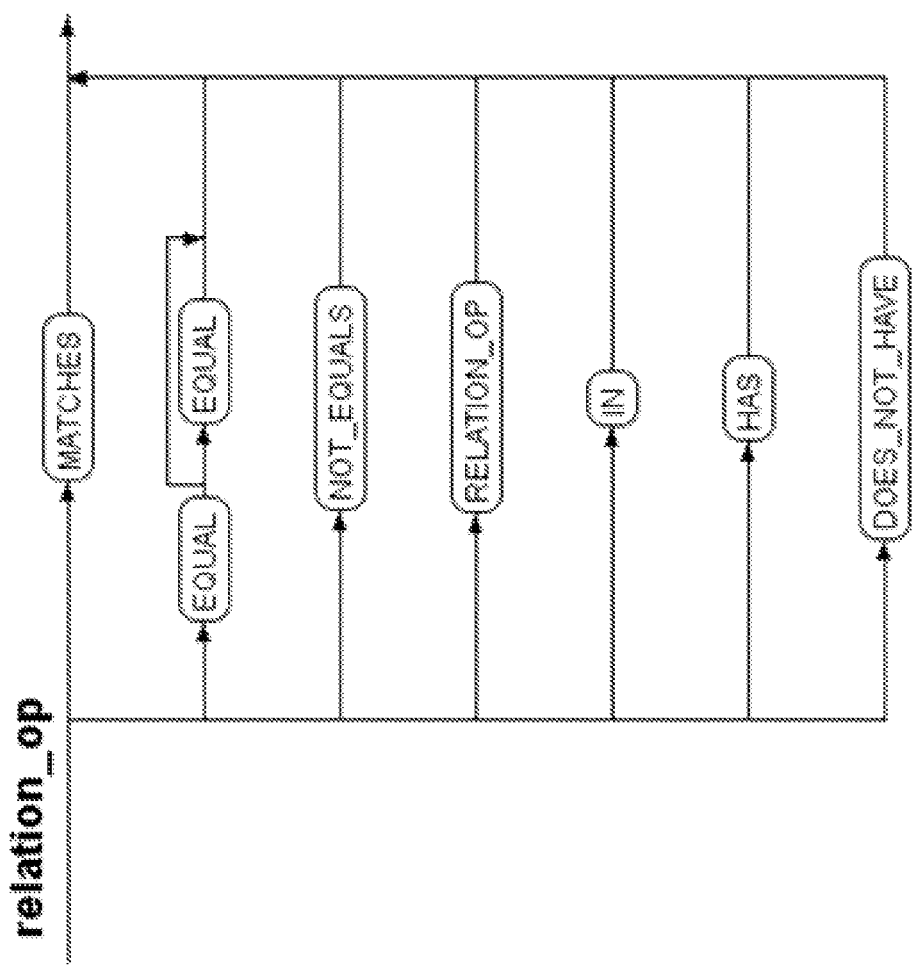
Figure 45:
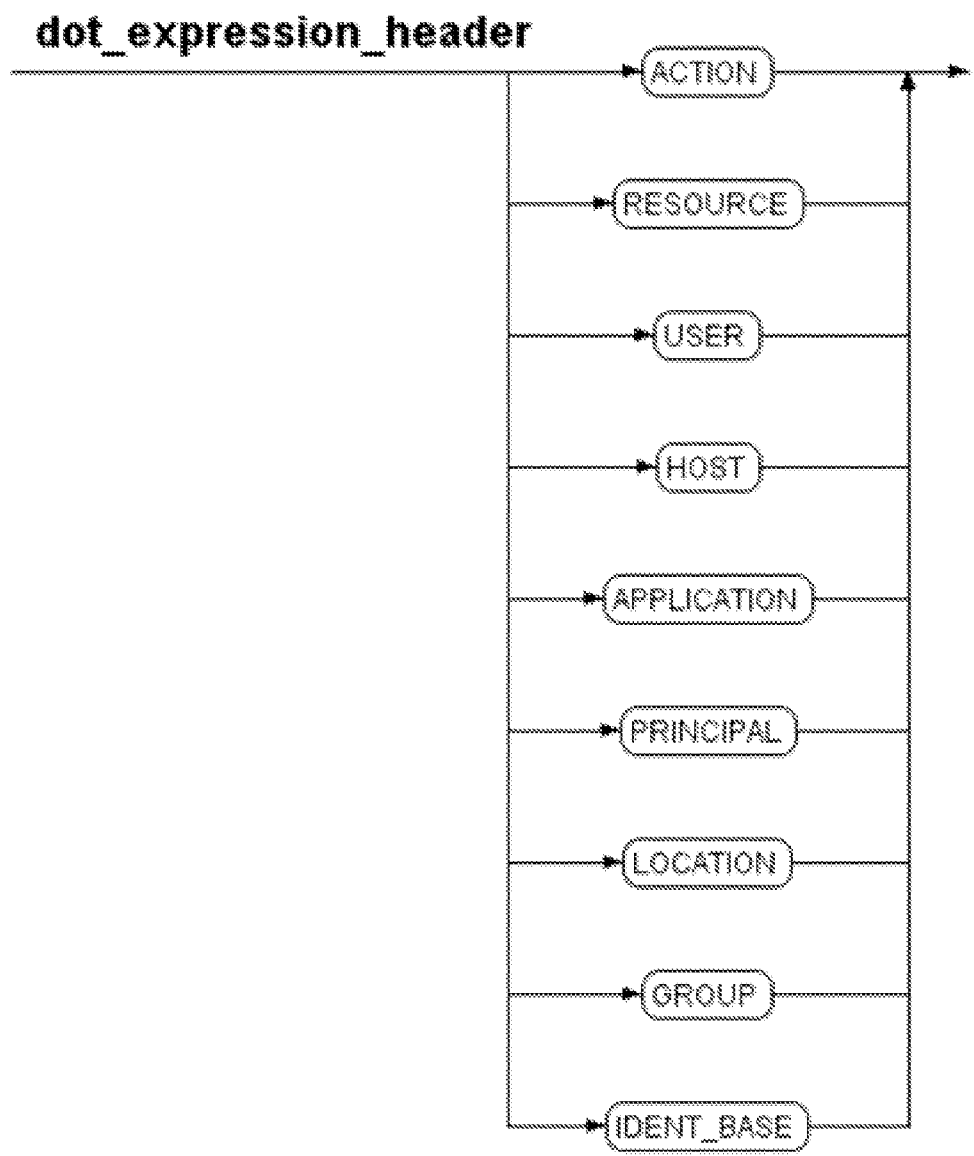
Figure 46:
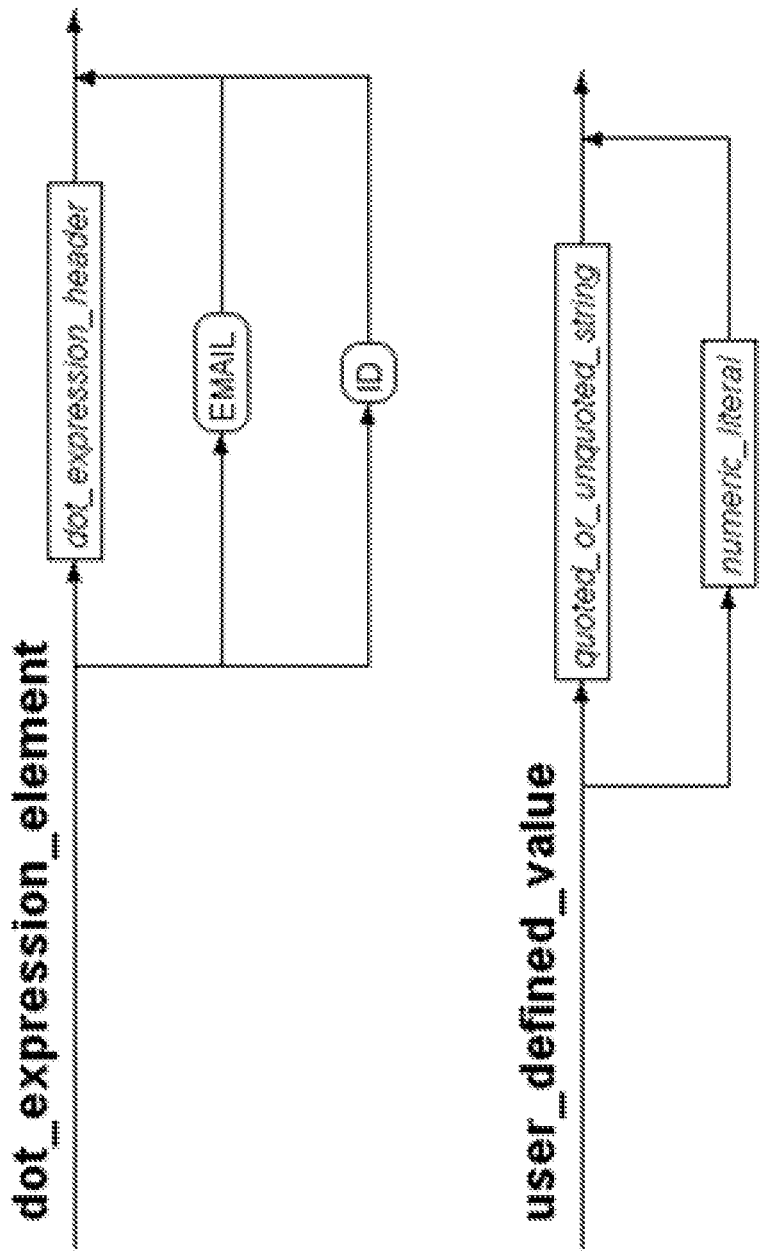
Figure 47:
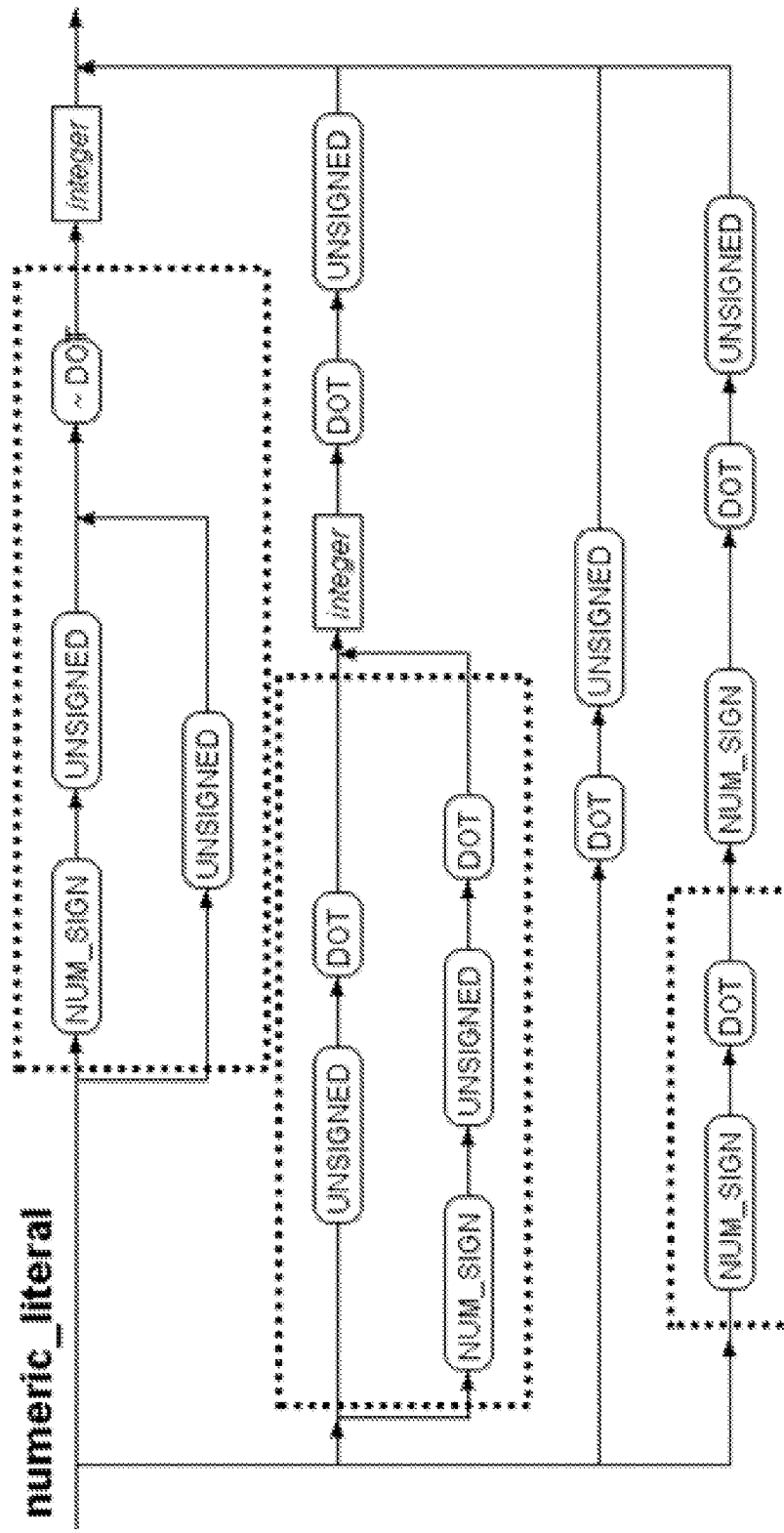
Figure 48:
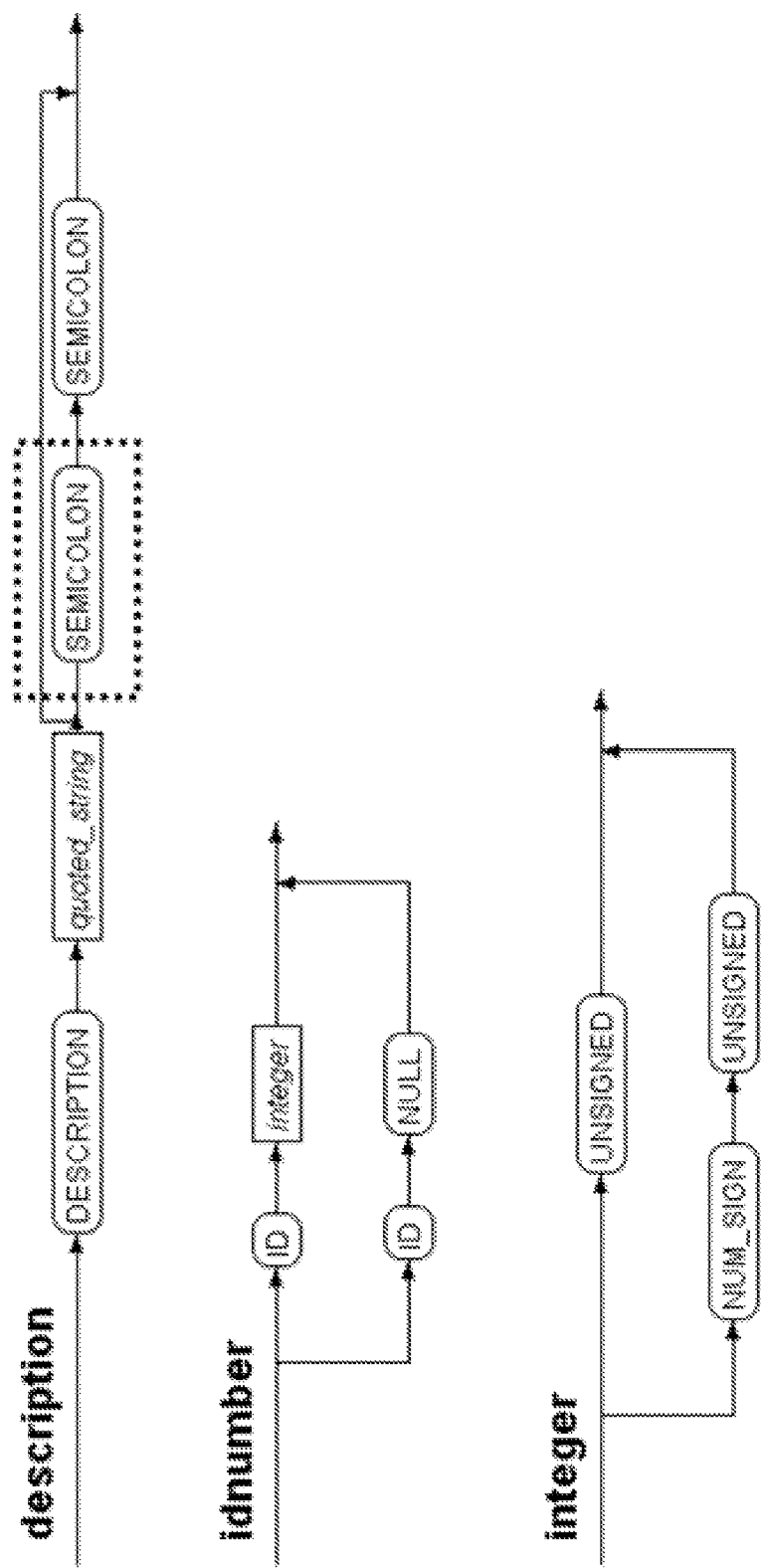
Figure 49:
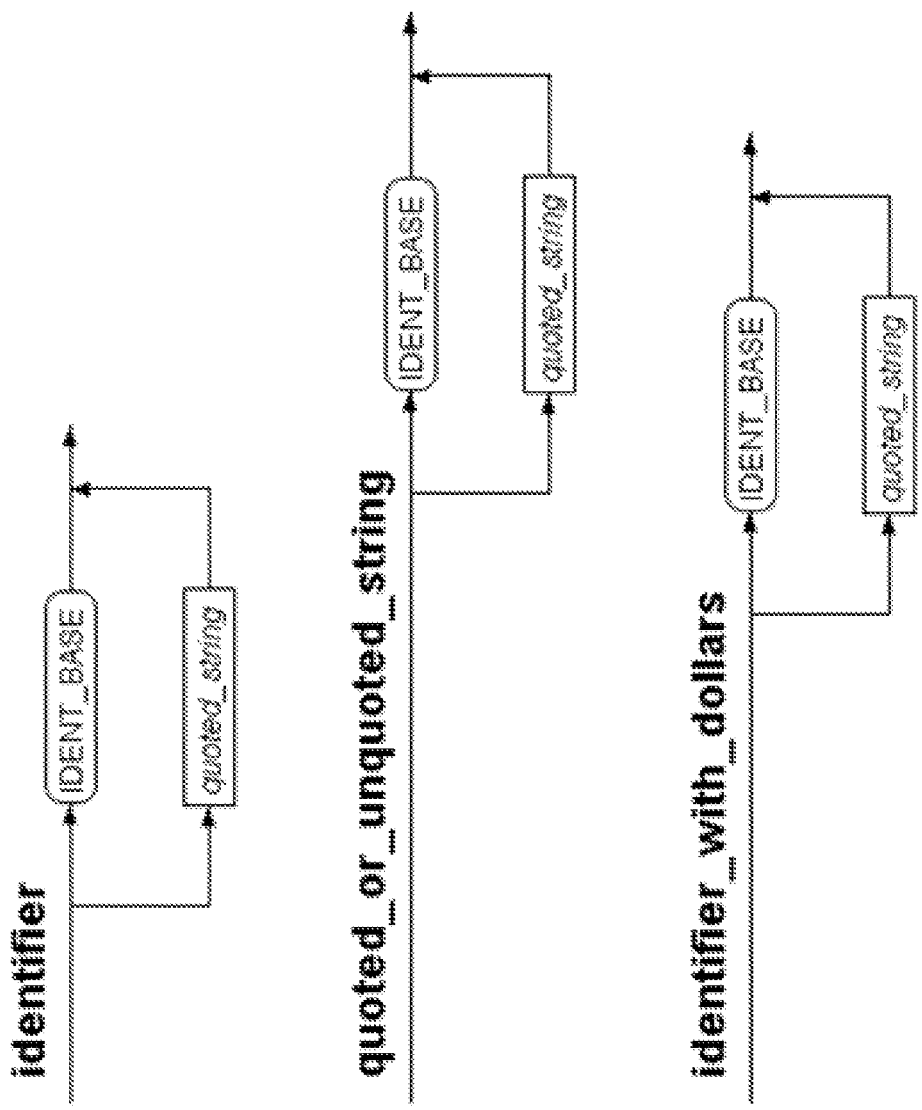
Figure 50:
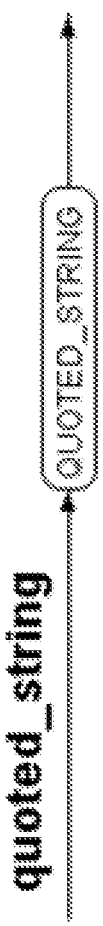
Figure 51:
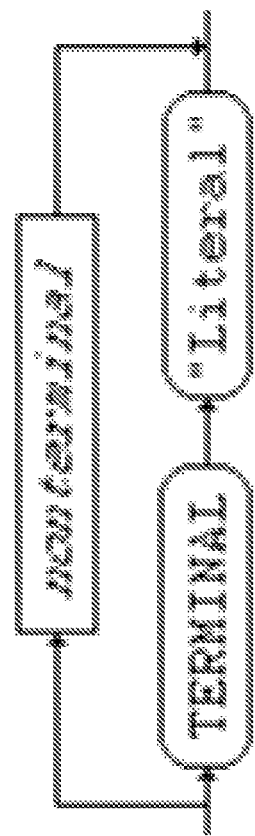

FIG. 24 shows an example of late policy binding which occurs when a policy server 2201 initiates transfer of policies to a client workstation 2203 and a document server 2205. Below are three policies where policy 1 and policy 2 are bound to the client workstation and policy 3 is bound to the document server. This example also illustrates "push" mode of policy distribution.

```
# {POLICY 1}
FOR document.name = "file://server1/merger-docs/**"
ON OPEN
BY user <> Executives
DO DENY
# {POLICY 2}
FOR document = Confidential
ON COPY
WHERE device.type = "workstation" AND
destination.device.category = "portable"
DO DENY AND LOG
OTHERS ALLOW
# {POLICY 3}
[[EXCHANGE-SERVER]]
FOR message = Confidential AND message.recipient = NOT
Employees
ON SEND
BY user = Employees
DO ALLOW AND ENCRYPT
OTHERS ALLOW
# {POLICY ABSTRACTION 1}
Executives = <map to LDAP group "executive">
# {POLICY ABSTRACTION 2}
Confidential := document.name = "file://project-server/unrelease/**"
    OR document.name = "*-contract.doc"
    OR document.properties.category = "Confidential"
    OR message.subject CONTAINS "Confidential"
# {POLICY ABSTRACTION 3}
Employees = <map to LDAP group "complete-hr-list">
```

The simplified system described in this example includes a policy server 2201, a policy repository 2202, a client workstation 2203 which has a policy enforcer installed 2204, a document server 2205 which has a Microsoft Exchange Server installed, and a policy enforcer 2207 installed on the document server. In a step 1 (2208), a policy administrator publishes the three policies illustrated above for immediate deployment. The policy server executes its "push" mode policy deployment process. The push mode deployment process requires that the policy server contacts all relevant policy enforcers, and for each policy enforcer, deliver one or more of the above three policies which are relevant to the target that the policy enforcer manages. The policy server looks up information regarding active policy enforcers and located the client workstation and the document server and their respective target profiles.

In a specific implementation, the policy server stores active target profiles in a local database and retrieves the target profiles from the local database to enable late binding of policies or policy abstractions, or both, to carry out push mode policy distribution.

In a specific implementation, the policy server makes a request to each policy enforcer to acquire a current target profile to facilitate late binding of policies for a push mode policy distribution.

In a specific implementation, the policy server broadcast a message to all active policy enforcers instructing each policy enforcers to initiate a pull mode policy update process.

The policy server processes a target profile associated with the client workstation. In doing so, the policy server's policy binding process bound policy 1 and policy 2 to the client workstation.

For policy 1, the policy binding process determined that the resource element refers to file objects and subject element refers to user whose is not in Executives group. The target profile either explicitly indicates that the client workstation is capable of handling file objects, or the policy binding process deduces from the client workstation being a workstation which should have file handle capability. The target profile also indicates there is an active user on the client workstation. Based on the information available, the policy binding process determines that policy 1 is relevant to the client workstation.

For policy 2, the policy binding process identified form the resource element that the policy applies to documents and from the context element that the policy should apply to a workstation. Based on this information, the policy binding process determines that the policy is relevant to the client workstation.

After policy binding process determines policy 1 and policy 2 are relevant to the client workstation, it finds all policy abstractions referenced by the two policies. In this case, the policy abstractions are "Executives" and "Confidential." The two policies and two policy abstractions are places in a policy bundle. If there is any additional configuration information these policies or policy abstractions depend on, they are also added to the policy bundle.

The policy binding process discussed above performs inspection on policies and then locates policy abstractions being references. In a policy server that supports policy abstraction, it is also necessary to performs inspection on policy abstractions and then locate associate policies. This bottom up technique requires policy abstractions be inspected before policies so that a relevant policy based entirely on policy abstraction can be successfully identified.

In a specific implementation, a system of the invention supports policies and policy abstractions but not dynamic distribution of policy abstractions (i.e., dynamically distribute policies only). The policy binding process inspects policies for its relevancy to a target. All relevant polices are placed in a policy bundle along with any information required to support evaluation of the selected policies and policy abstractions.

In a specific implementation, a system of the invention supports policies and policy abstractions but not dynamic distribution of policies (i.e., dynamically distribute policy abstractions only). The policy binding process inspects policy abstractions for its relevancy to a target. All relevant policy abstractions are placed in a policy bundle along with any information required to support evaluation of policies at the target using the selected policy abstractions.

In a specific implementation, a system of the invention supports policies and policy abstractions but not dynamic distribution of policies (i.e., dynamically distribute policy abstraction only). The policy binding process inspects policy abstractions for its relevancy to a target. The policy binding process may also inspect policies even though they are not being distributed to the target for relevancy. In addition, the relevant policies and policy abstractions can be cross referenced to further eliminate irrelevant policies and policy abstractions. At the end, only policy abstractions referenced by relevant policies are considered for distribution, and these policy abstractions will be referred to as truly relevant policy abstractions. All truly relevant policy abstractions are placed in a policy bundle along with any information required to support evaluation of policies at the target using the truly relevant policy abstractions.

In a step 2 (2209), the policy server transfers the policy bundle to the client workstation.

In a specific implementation, a policy server performs optimization on the policies, or policy abstractions, or both, in the policy bundle and transfers the optimized policies, or policy abstractions, or both, in a policy bundle along with all supporting information to the client workstation. The optimized policies and policy abstractions may have the same policies format as the preoptimized policies or may be transformed to a different policy format.

In a specific implementation, a policy server compiles a list of differences between the policies, or policy abstractions, or both, in the policy bundle and the policies, policy abstractions, or both, on the client workstation. The list of differences along with all supporting information are placed in a policy bundle and transferred to the client workstation.

The client workstation receives the policy bundle from the policy server in step 3 (2210). The subset of policies, or policy abstractions, or both, in the policy bundle is enforced at the client workstation.

In a specific implementation, the policy bundle received by the client workstation replaces the subset of policies or policy abstraction, or both, on the workstation.

In a specific implementation where multiple subsets of policies or policy abstractions, or both, are supported by a client workstation policy enforcer, the policy bundle received replaces at least one subset of policies or policy abstractions, or both, on the client workstation or combine with at least one subset of existing policies or policy abstractions, or both, on a workstation.

In a specific implementation where a client workstation policy enforcer supports transferring a list of differences in a policy bundle, the client workstation policy enforcer applies the list of differences in the policy bundle received to at least one subset of existing policies or policy abstractions, or both, to reconstruct the desired at least one subset of policies or policy abstractions, or both.

The policy server repeats the above policy binding and transfer processes on a target profile associated with the document server (including all implementation specific steps). Since the document server has a Microsoft Exchange Server installed, information related to Microsoft Exchange Server is provided in the target profile. Using such information, the binding process identifies that policy 3 is relevant to the target. Specifically, policy 3 contains a deployment directive "EXCHANGE-SERVER" specifying it should be deploy to all targets running Microsoft Exchange Server.

In a step 4 (2211), a policy bundle constructed in the policy binding step is transferred to the document server. Step 4 may also include implementation specific optimization and other transformation steps described under step 2.

The document server receives the policy bundle from the policy server in a step 5 (2212). The subset of policies, or policy abstractions, or both, in the policy bundle is enforced at the client workstation. Step 5 may also include implementation specific processing steps described under step 3.

For ease of explanation, the followings are not shown in the above example: (1) policies not bound to the targets; (2) other policies (in additional to those policies shown above) that bind to the targets; (3) policy abstractions associated with the above policies and other policies bound to the targets; and (4) policy abstractions not bound to the targets.

For access control application, policies are often optimized to obtain real-time performance. Policy optimization can be applied to an individual policy or a set of policies.

| Optimization Technique | Apply to Individual Policy | Apply to a Set of Policies |
| --- | --- | --- |
| Common subexpression elimination | Yes | Yes |
| Constant folding | Yes | Not applicable |
| Constant propagation | Through policy abstraction | Through policy abstraction |
| Dead code removal | Yes | Not applicable |
| Comparison optimization | Yes | Yes |
| Redundant policy elimination | Not applicable | Yes |

For common subexpression elimination, take all subexpressions in a policy that are identical and replace them with a variable. Then add a variable to the policy and evaluate the variable the first time it is encountered. If the policy refers to abstractions that have the same subexpressions, these will also be replaced by the variable.

Common subexpression elimination can be applied locally (within a policy) or globally within a policy subset. When applied globally, multiple policies can share the same subexpression. In this case, subexpressions in both policies can be replaced with a variable.

In addition, a greedy algorithm can be used to identify common subexpressions. A greedy algorithm tries to looks for the longest possible common pattern that an optimization program can find. For example, for a resource expression:

```
(document.category = "confidential" AND document.name = "*.doc")
OR (document.category = "confidential" AND document.name = "*.doc"
AND document.owner = Human-Resources)
OR (document.category = "confidential" AND document.name = "//server1/shared/**")
```

The result produces by a greedy algorithm is:

```
tmpvar1 = document.category = "confidential" AND
document.name = "*.doc"
(tmpvar1) OR (tmpvar1 AND document.owner = Human-Resources)
   OR (document.category = "confidential" AND
   document.name = "//server1/shared/**")
```

And the result produces by a nongreedy algorithm is:

```
    tmpvar1 = document.category = "confidential"
    tmpvar2 = document.name = "*.doc"
    (tmpvar1 AND tmpvar2)
       OR (tmpvar1 AND tmpvar2 AND document.owner =
       Human-Resources)
       OR (tmpvar1 AND document.name = "//server1/shared/**")
```

If a multipass optimization algorithm is use, the result can be further improved. For example, a second pass on the nongreedy algorithm above produces:

```
tmpvar1 = document.category = "confidential"
tmpvar2 = document.name = ."doc"
tmpvar3 = tmpvar1 AND tmpvar2
(tmpvar3) OR (tmpvar3 AND document.owner = Human-Resources)
    OR (tmpvar1 AND document.name = "//server1/shared/**")
```

Common subexpression elimination is a technique that eliminates the evaluation of the same subexpression more than once in one evaluation step. A common subexpression refers to a portion of an expression that is syntactically identical to another portion of the same expression or another expression. For example, the subexpression 'document.name="//server1/docs/test/**"' appears two times in the resource element in the policy below. Common subexpression are typically found among resource element, subject element and context element in a policy. Common subexpression is also found in policy abstractions.

```
FOR (document.name = "//server1/docs/test/**"
    AND document.createDate > "2005-10-10")
    OR (document.name = "//server1/docs/test/**"
    AND document.fileSize > "10M")
ON OPEN
BY user = testers
DO DENY
```

To apply common subexpression elimination to a policy, a temporary variable is introduced to hold the result of evaluating the subexpression and all occurrences of the subexpression is replaced by temporary variable. The temporary variable is evaluated at policy evaluation time on an as needed basis. The result of applying common subexpression elimination to the above policy is shown below.

```
# {POLICY}
FOR (tmpvar1 AND document.createDate > "2005-10-10")
    OR (tmpvar1 AND document.fileSize > "10M")
ON OPEN
BY user = testers
DO DENY
# {VARIABLE}
tmpvar1 = document.name = "//server1/docs/test/**"
```

Common subexpression elimination can be applied across polices. The technique can be applied to a set of policies to maximize its benefit. For example, common subexpression elimination can be applied to the set of policies or policy abstractions, or both, produced by policy binding. It can also be applied to selected subset or all policies and policy abstractions, or both, at the target. Below are two policies where a subexpression "location=Home AND connection < > VPN" is common to both policies.

```
# {POLICY 1}
FOR document = Sensitive
ON OPEN
WHERE location = Home AND connection < > VPN
DO DENY
# {POLICY 2}
FOR document = Confidential
ON COPY
WHERE location = Home AND connection < > VPN
AND destination.device.type = "portable"
DENY
```

In a specific implementation, a greedy algorithm is employed where selection of subexpression gives preference to the longest matching subexpression.

In a specific implementation, a multipass algorithm is employed to create nested variables and recursively eliminate subexpressions. A multipass algorithm can contain a fix number of passes or stop when no more common subexpression can be located.

In a specific implementation, a cost-based technique is employed to select between two or more overlapping subexpressions. Overlapping subexpressions refer to at least two common subexpressions found in an expression where the at least two subexpressions share a same portion of the expression. With a cost-based technique, elimination of a subexpression that will yield most benefit is chosen over other competing subexpressions.

Constant folding is a technique that preevaluates a subexpression and replaces it with a constant when all terms in a subexpression are constant. For example, constant folding can be applied to an expression such as "document.size>100*1024*1024" where "100*1024*1024" evaluates to a constant.

```
FOR document.name = "*.doc"
ON OPEN
BY user = Finance
DO ALLOW
```

Consider the above policy bound to a target profile containing a user (e.g., "jdole") in the finance department. The subject expression is evaluated to true at binding time and thus no further evaluation of the subject element is necessary at run time. Below is a policy produced by applying constant folding to the above policy.

```
FOR document.name = "*.doc"
ON OPEN
DO ALLOW
```

Another optimization technique available is constant propagation. Constant propagation is most useful when applied to nested policy abstractions. By recursively applying constant folding to policy abstractions, policy abstractions can be eliminated or simplified, therefore improving run time performance.

For policies, or policy abstractions that contains one or more subexpressions that is not applicable when deployed to a specific target, dead code removal technique can be applied to remove the one or more subexpressions from a policy or policy abstraction minimizing the need to repeat examination of a one or more subexpressions that does not produce useful result at policy evaluation time.

A common situation that can produce dead code in a policy or policy abstraction includes: (1) A policy or policy abstraction is written for a class of resources and the policy or policy abstraction is deployed on a target that can handle only one type of resource in the class (e.g., a policy is written to cover all confidential files and e-mail messages but the policy is bound to a file server). (2) A policy or policy abstraction is written to cover different events that a target can handle but the policy or policy abstraction is bound to a target that has less capability. (3) A policy or policy abstraction is written for multiuser environment and the policy or policy abstraction is bound to a device that does not recognize different users. (4) A policy where its context element specifies device capabilities or other aspects that is not supported by a target (e.g., VPN or WLAN).

Below is a policy written for a client workstation environment where controlling access to and use of files and e-mail messages are desirable.

```
FOR document.name = "\\server1\docs\**"
 OR message.from = Finance
 ON OPEN
 BY user = Marketing
 DO ALLOW
```

When the policy describes above is bound to a portable e-mail reader which does not have file access capability. Dead code removable technique can be applied to such policy to optimize its performance on the e-mail reader. The same policy after dead code removal technique has been applied is illustrated below.

```
FOR message.from = Finance
 ON OPEN
 BY user = Marketing
 DO ALLOW
```

Below is another example where dead code removal technique can be applied. The policy is written for all e-mail servers supported. However, the policy is deployed only to one e-mail server application (i.e., Microsoft Exchange Server or IBM Lotus Domino Server) at a target.

```
FOR message.name = "exchange://**/Inbox/**"
 OR message.name = "domino://**/inbox/**"
 ON SEND
 BY user = Legal
 DO ALLOW AND ARCHIVE
```

In the case that the above policy is deployed to a Microsoft Exchange Server, the subexpression refers to an IBM Lotus Domino Server can be removed. And in case the policy is deployed to an IBM Lotus Domino Server, similar optimization step can be applied. Below are the results of applying dead code removal technique to the above policy.

```
FOR message.name = "exchange://**/Inbox/**"
 ON SEND
 BY user = Legal
 DO ALLOW AND ARCHIVE
```

```
FOR message.name = "domino://**/inbox/**"
 ON SEND
 BY user = Legal
 DO ALLOW AND ARCHIVE
```

When the variation of cost of applying different comparison operators is significant, comparison optimization technique can be applied to improve the average evaluation cost of an expression. For example, on common computer architectures today, the cost of performing integer comparison is often less than the cost of performing string comparison. The difference is more pronounced when we compare the cost of integer comparison with pattern matching using technique like regular expression.

Comparison optimization is a technique that reorders an expression to optimize best case evaluation performance. The reordered expression will remain functionally (or logically) equivalent to the original expression but execution order of comparison order is reshuffled. In a complex expression, reordering may also cause the expression to be expanded, or in some case, compressed. A comparison optimization technique can also be designed to improve average evaluation performance, or combination of best and average evaluation performance. Comparison optimization technique is useful when a policy language supports short circuit evaluation of expression.

Below is a policy with a resource expression that is not optimized for best case evaluation performance on common computer architectures.

```
FOR document.name = "//server1/**/docs/**/report/**"
 OR document.name = "//server1/data/report/storesales.xls"
 OR document.createData > "2005/1/1"
 ON OPEN
 BY user = Marketing AND user = Manager
 DO ALLOW
```

The resource expression in the above policy is reordered using comparison technique to improve best case evaluation performance. In this case, the subexpressions in the resource expression are arranged based on the average cost of evaluation. The subexpression 'document.createData>"2005/1/1"' is an integer comparison in most popular computer languages on common computer architectures. Subexpression 'document.name="//server1/data/report/storesales.xls"' is a string comparison operation and subexpression is 'document.name="//server1//docs//report/**"' a regular expression matching operation.

```
FOR document.createDate > "2005/1/1"
 OR document.name = "//server1/data/report/storesales.xls"
 OR document.name = "//server1/**/docs/**/report/**"
 ON OPEN
 BY user = Marketing AND user = Manager
 DO ALLOW
```

Another optimization technique is redundant policy elimination. A redundant policy is a policy in a set of policies where the redundant policy is functionally a subset of another policy. Having redundant policies in a set of policies increases the time it takes to evaluate the set of policies.

```
# {First policy}
FOR document.name = "//server1/data/report/**"
ON OPEN
BY user = Manager
DO ALLOW
# {Second policy}
FOR document.name = "//server1/data/report/**/quarterly/*.xls"
ON OPEN
BY user = Manager
DO ALLOW
```

The above example shows two policies where the first policy is a functional subset of the second policy when "deny override" combining algorithm is used. For example, when both policies are applied to a file "//server1/data/report/abc.doc" accessed by a user who is a manager, the first policy produces a policy effect ALLOW while the second policy produces a policy effect DENY. A "deny override" combining algorithm adopts the policy effect produced by the second policy making the first policy a functional subset of the second policy. In this case, the first policy can be eliminated from the set of policies without affecting the function of the policies.

The technique described here for identifying redundant policies is not restricted to resource expression. It can be applied to other elements in a policy including event expression, subject expression, context expression, positive consequence, negative consequence, or any combination of these elements. In addition, the technique can be applied to other combining algorithms including permit override.

In an embodiment, a system of the invention collects data on information usage activity and stores the activity data (or log data) in a central database. This database may be called a historical database or activity database. The information usage activity data collected is analyzed to perform at least one of reporting information usage activities, detecting information misuse, detecting fraud, detecting anomalies, identifying information usage trends, understanding resource usage, identifying resource usage trends, identifying potential resource optimization opportunities, understanding workforce productivity, identifying potential workforce productivity improvement opportunities, and more.

The information management system further includes support of threshold settings and detects threshold violations. The information management system further includes support of activity profiles and detects deviation from the activity profiles. There are many techniques to detect or evaluate the activity data. Some of these detection techniques are based on inferencing, event correlation, expert system, fuzzy logic, neutral network, genetic algorithm, on-line analytical processing (OLAP), or data mining.

Instead of a detection algorithm, another technique for analyzing the activity data is by pattern matching. For example, a technique may scan the activity data for specific patterns, and the entries in the activity data that match the pattern will be listed or provided. The specific pattern to be searched for may be presented by an expression, string matching, arithmetic expression, expression with wildcard characters, operator, comparison, or other techniques. Some examples of specific patterns may be to list occurrences where a user used a specific application program, used a specific device type, or spent more than a specific time in an application program.

An example of pattern matching is to search through the activity data to find all occurrences of e-mail being sent to a particular user. Another example of pattern matching is to search through the activity data to find all entries for a user. Another example of pattern matching is to search through the activity data to find all entries for a specific application program. Another example of pattern matching is to search through the activity data to find all entries occurring during a specific time period.

In a specific implementation, the information management system collects data on information usage activity and stores the activity data in a local database. The local database may reside on the device the user is logged into the system through. In a specific implementation, the activity data stored locally may be uploaded periodically to a central database. For example, the local data may be sent at set time such as when the user logs off or on a set schedule such as every hour. In such a fashion, the local database may act as a buffer to reduce network traffic. Collected activity data will be sent in a more efficient manner, rather than having many different devices sending activity every few seconds.

Collection of information usage activity data is performed by a policy enforcer while processing a policy evaluation request. The policy enforcer is typically installed on a device (e.g., workstation, server or personal digital assistant) where it monitors information usage activity and enforce information usage policies. The policy evaluation request is typically initiated by an interceptor installed in an application program or operating system. Policy evaluation request can also be initiated by application program or operating system authorization logic that requests approval from a policy engine before carrying out an operation.

In a specific implementation, the policy enforcer includes of a policy engine and at least one policy enforcement point running on separate computers. Collection of information usage activity data is performed at the location of the policy engine to a local or central database.

In a specific implementation, the information management system includes of at least one policy decision server dedicated to make policy decisions. Collection of information usage activity data is performed at the location of the policy decision server to a local or central database.

In a specific implementation, the policy engine (e.g., in a policy enforcer) supports a policy language that allows a policy to control logging of information usage activity data. A policy can specific whether information regarding a policy evaluation request should be logged. Optionally, a policy can specify what information to be included in the activity log.

In a specific implementation, collection of information usage activity data is performed by a data collection agent installed on a device (e.g., workstation or server). The data collection agent collects information usage activity data by installing interceptors in application programs or operating systems, or both. The data collection agent can also collected information usage activity data provided by data collection points embedded into application programs, or operating systems, or both. In addition, a data collection agent can also collect information usage activity data through standard application program, operating system or network management interfaces, or any combination of these, including Simple Network Management Protocol (SNMP), Windows Management Instrumentation (WMI), Java Management Extensions (JMX), or syslog.

The information usage activity data collected by the policy enforcer or the data collection agent includes any combination of:

(1) the time an event occurs;

(2) the event (e.g., a user action, an application program operation, an operating system operation, an internal event, or an external event);

(3) one or more attributes associated with the event (e.g., Is this a root event? What recent event is the event related to? If a policy enforcer or data collection agent supports aggregation, then how many times does this event occur in a sequence? What application function or command trigger this event?)

(4) one or more resources associated with the event, where the event is a user action (e.g., file, e-mail, selected data or range of data in an application program);

(5) one or more resources associated with the event, where the event is an application program operation (e.g., file, e-mail, Web page, application, computer, or data object);

(6) one or more resources associated with the event, where the event is an operating system operation (e.g., file, URL, network packet, or data object);

(7) user or user account with which the operation is invoked;

(8) one or more users or user accounts with which the operation is associated, originated, or destined;

(9) machine or device on which the operation is carried out (e.g., host name or IP address);

(10) one or more attributes associated with the machine or device on which the operation is carried out (e.g., desktop, laptop, thin client, PDA, smart phone, instance of an operating environment on a terminal server, location—Home or "Boston Office," group—"finance department computer," operating system—Solaris, Windows, NAS, firewall, switch, router or load balancer);

(11) one or more machines or devices with which the operation is associated, originated, or destined;

(12) one or more components on the machine or device (e.g., USB, hard disk, CD-ROM, DVD-ROM, or Flash memory device);

(13) connectivity (e.g., LAN, WAN, WLAN, VPN, IPSec VPN, SSL VPN, Bluetooth, DSL, Internet, dial-up, compression, caching, acceleration, or bandwidth);

(14) one or more application programs associated with the event (e.g., Windows file server, Microsoft Exchange Server, Apache HTTP Server, Oracle 10g database, Microsoft Outlook, Yahoo Messenger, Internet Explorer, Mozilla Firefox, Windows Explorer, DOS command prompt or DOS xcopy.exe);

(15) one or more attributes associated with the application program associated with the event (e.g., version, type—file server, e-mail server, portal server, database server, Web server, spreadsheet, instant messenger, Web browser, e-mail client, command shell, operating system utility, group—Microsoft Office, GNU utilities, or functionality—installed modules or Professional Edition, or serial number); and

(16) additional data (e.g., any configuration or environment data).

Analysis of information usage activity data in a central database is performed at a policy server or at least one server dedicated to perform data analysis. The analysis operation further includes correlating activity data in the database. Correlation can be applied to any information usage activity data including those described above. Typically, the correlation operation correlates activities based on at least one of:

(1) one or more resources (e.g., a particular file, all files on a particular server, all e-mail message sent by a user, all e-mail messages sent to a particular recipient, all e-mail messages with total attachment size greater than one megabyte, all "Save As" application function on all confidential data, and more);

(2) one or more users (e.g., all files opened by a user, all servers a user had accesses in the past 24 hours, all e-mail messages a user had sent outside the company in the past week, the amount of time a user spent on instant messenger application programs, How much time a user spend on an e-mail client each day? What is the average number of e-mail messages a user in the support department send and receive each day? Who are the users that log in less than once a day?);

(3) one or more events (e.g., How many files are copied to portable storage devices by nonsystem administration users? How many e-mail messages originated from executives are forwarded outside the company?);

(4) context (e.g., How many files on file server X is accessed from the branch office in Boston? How many users access files on file servers when connected using VPN? How many file on server X are accessed outside office hour?);

(5) one or more application programs (e.g., How many file open operations takes more than 5 minutes in the past 24 hours? How many users use Skype? How many users use Microsoft Office? Who are the users that use at least one FTP client program? Who is using both Microsoft Office and Open Office?);

(6) one or more hosts (e.g., Who logged on to this computer in the last 24 hours? How many users use a particular guest computer in the past month?); or (7) policy evaluation (e.g., How many users had been denied access to files more than five times in one day? Who are the users who had been denied access to file or e-mail messages more than 50 times in the past month? Is there any user that had been denied access to the same file more than five times in a minute? Who has accessed highly sensitive documents defined in policy X in the last week?).

Activity data correlation can be applied to one data field (e.g., a file or a user) or combination of multiple data fields (e.g., an event and a user within a particular time range). Activity data correlation can also be applied to activity data collected at one collection point, activity data collected at multiple collection point, or activity data collected at one or more collection point along with external event data.

Activity data analysis can include any combination of correlation, statistical analysis, trend analysis, threshold analysis, signature (or pattern) detection, and baseline-based anomaly detection.

In a specific implementation where information usage activity data is stored in a local database at a collection point, the analysis of information usage activity is performed at the collection point.

In a specific implementation, external event data is imported to the central database and analysis is applied to the combined set of external event data and information usage activity data collected.

In a specific implementation, the analysis operation acquires information from another application program to complete an analysis.

Activity data analysis can be performed automatically or manually. The result of activity data analysis can be stored in a database or trigger an action. The following are some common actions that can be triggered by an activity analysis process.

(1) Send an alert to another application program or system containing information about the result of the analysis (e.g., generate an SNMP trap).

(2) Send a notification to a user regarding the result of the analysis (e.g., sending an e-mail message describing the alert, or displaying a notification message in a dialog box).

(3) If the activity data analysis process is capable of interacting with an information management system, send an event to a policy decision server or policy enforcer to trigger policy evaluation at the decision server.

(4) If the activity data analysis process is capable of interacting with an information management system, send an event to the information management system to activate related policies.

(5) If the activity data analysis process is capable of interacting with an information management system, effect the creation and distribution of a new policy in the information management system.

(6) If the activity data analysis process is capable of interacting with an information management system, add or update data on a policy server or policy enforcer to effect change in outcome of evaluation of one or more policy context expressions in a number of polices and policy abstractions.

(7) Call another application program to carry out a task.

(8) And, perform a custom task.

In an embodiment, a system of the invention collects information usage activity data. Information usage activity data may also be referred to as information usage data, application usage activity data, application usage data, document access activity data, or policy enforcement activity data. Information usage activity data enables a data analysis process to detect misuse of information including:

(1) User A who is a recipient of a confidential document sent by user B forwards such document to a recipient user C who is not a member of an organization. The organization has policies dictating handling of confidential document which prohibits sending confidential document outside the organization without permission.

In a specific implementation, the case of information misuse described in this example can be detected by collecting application usage data on application program operations such as sending and forwarding e-mail messages and attaching documents to an e-mail message. Some examples of collecting application program operation data include intercepting and collecting data about application program operations in e-mail client (e.g., Microsoft Outlook or Eudora), Web browser (e.g., Yahoo Web mail), mail server (e.g., Microsoft Exchange Server or IBM Lotus Domino Server).

A data analysis process can correlate the application usage data based on an action (e.g., send, forward, or attach), a user, or a document (e.g., the confidential document). In this example, assuming the document is classified as confidential based on where it is stored on a file server and not by other document attributes, a correlation step in the data analysis process associates the following application usage data: (a) user B attaching the confidential document to an e-mail message; (b) user B sending the e-mail message to user A; and (c) user A forwarding the e-mail message to user C. Specifically, the correlation step should correlate (a) and (b) based on user B, (b) and (c) based on the e-mail message. In addition, information about classification of the document may be obtained from analyzing policies in an information management system of the invention or extracted from configuration data. The fact regarding user C being a subject who is not a member of the organization can be obtained by looking up a user database such as a LDAP directory.

Once the above application usage data is being correlated successfully, a detection algorithm based on signature analysis or pattern matching can be applied to the correlated data to identify the case of information misuse described in this example. Some example implementations of the detection algorithm include a set of detection rules executed in a rule-based expert system, a SQL statement or database stored procedure, an OLAP function or a custom coded function in scripting or programming language.

(2) A user copied a portion of a confidential document to an e-mail message and sent the e-mail message to a recipient not authorized to receive such information.

Application usage data that can be used to detect the case of information misuse described in this example includes data associated with cut-and-paste, drag-and-drop, and sending and forwarding e-mail message application program operations.

(3) A user copied a large amount of data from a server to a removal storage device where the copied data cannot be protected.

Collecting application usage data associated with copy operations from application programs such as file browser (e.g., Windows Explorer) and operating system utilities (e.g., DOS copy.exe), correlating the application usage data by destination of the copy operation and time of such activity, and inspecting the copy destination to identify the destination device type can discover the case of information misuse described in this example.

In an embodiment, a system of the invention collects information usage activity data which enables a data analysis process to detect information fraud or insider attack including:

(1) A user was blocked from accessing a document for a twenty times in five minutes by a file server policy enforcer. The frequency of the access attempts to a document that the user does not have access to matches a signature or pattern of hacking attempts by a malware infected system.

(2) A large number e-mail messages are sent outside a company by the same user with attachments in a short period of time.

(3) A user copied a file using a device at location A; within five minutes, the same user copied another file using a device at location B; location A and location B is 5000 miles apart.

In an embodiment, a system of the invention collects application usage activity data to identify potential resource optimization opportunities including:

(1) Identify how many users are using an application program that is not supported by an IT department and how much time each user spends on the application program, an IT administrator can determine if support on the application program should be provided.

(2) Identify how many users actively use an application program. If the number of users increases, an IT administrator may need to purchase additional software licenses. If the number of users decreases, number of software licenses may be reduced.

(3) Identify the frequency users use an application, the location at which the application is accessed, and how much time users spend on an application. Such information may help to determine the type of system and network configurations that is most cost effective or enabling users to be more productive, or both (e.g., running an application on a terminal server versus running an application on individual workstation when users need to access large files using a slow connection).

In an embodiment, a system of the invention collects application usage data to identify potential workforce productivity improvement opportunities including:

(1) Collect data on application usage such as application program functions invoked by a user. Analyze application usage data to identify repeated application usage patterns, or lack of specific application usage patterns, or both. Based on the one or more identified or not identified application usage patterns, determine if a user will benefit from additional training, improved application program user interface, or improved automation on application programs and operating systems (e.g., creating a macro or script to handle repetitive tasks), or any combination of these. Such change or changes may potentially enhance productivity and reduce work-related injuries.

For example, a user spends three hours each day using Microsoft Word to edit documents; within the three hours each day, the user selects menu item "Format|Paragraph . . . " two hundred times; also within the three hours each day, the user never selects a predefined formatting style. By analyzing application usage data over a period time on Microsoft Word, the patterns described above may be identified.

The application usage data that may be used to identify the above patterns includes: (i) number of seconds Microsoft Word is active on a user's workstation while logged in as the user, with which average daily Microsoft Word usage time can be calculated using usage data in seconds within a time period of a business day and the cumulative daily Microsoft usage time is averaged over a month; (ii) count number of times a particular menu item operation "Format|Paragraph" is invoked by the user within the same period of time described in (i); and (iii) count number of times within the same period of time described in (i) the user invokes apply formatting style operations, and the formatting style operations should include formatting style operations invoked using different methods (e.g., main menu, popup menus, list box on tool bar, tool bar button, formatting dialog, style formatting floating or docked tool palette).

The combination of having and lacking the two application usage activity patterns described above indicates that the user (a) spent a lot of time formatting paragraphs in Microsoft Word document, and (b) the user did not take advantage of the formatting style functions available in Microsoft. By providing appropriate training or application notes to the user, the user can begin to take advantage of the more advanced functionalities in Microsoft Word and reduce to amount of time spent on formatting paragraphs.

As a result, the use of application usage data analysis coupled with appropriate corrective action may improve the productivity of an organization personnel. In addition, minimizing repetitive formatting operations may also reduce work related injury.

(2) Detect from application usage data potential inadequacies in information technology (IT) infrastructure that may affect productivity of organization personnel. Some examples of symptoms affecting productivity include files taking too long to open, or web pages taking too long to load. These symptoms may indicate undesirable side effects of IT infrastructure changes, or information or resource usage pattern changes, or both.

If the IT infrastructure problem is related to limited bandwidth and high latency of a WAN connection, the organization may benefit from adding WAN acceleration devices. If the symptom is slowness in loading Web pages, the organization may be benefited from install Web caching servers, caching proxy servers, or Web caching devices.

For the examples, when an appropriate IT infrastructure improvement is made, users should spend less time waiting for files to open or Web pages to load and thus improve productivity of organization personnel.

(3) Collect application usage data on specific application program operations. Some examples application program operation data include recording or editing Microsoft Word macro, setting up Microsoft Excel pivot table, or creating forms in Adobe Acrobat. Analyze the application usage data based on frequency of application program operations to identify skilled users within an organization. These skilled users are proficient in utilizing certain application program functionalities and can be potential assistants or support resources to other users in the organization.

In an implementation, one may choose the top ten skilled users in the list and make them mentors of the subject matter. In another implementation, one may ask some of the skilled users in the list to join a mentor or support pool.

Once a group of skilled users and their skill sets are identified, the information can be published within the organization in print, electronic, or any other forms convenient to users in the organization, so that the group of skilled users will be available to mentor other users in the organization.

A further implement can incorporate the skilled users data into a system of the invention or helpdesk application to further automate (a) the identification of need as described in (1) above, (b) locating a matching skilled user or mentor, and (c) automatically contacting the mentor (e.g., via e-mail or instant messenger).

(4) Collect application usage data on specific sets of documents. These sets of documents are selected as samples for identifying domain experts (or knowledge domain experts or users with specific type of knowledge). Analyze the application usage data to identify users who had accessed these sets of documents. Count the number of times a user opened or saved these documents to identify which user may be a potential domain expert.

For example, if a user performs frequent save operation on these documents (e.g., authored or reviewed the documents), the user may be very knowledgeable about the subject matter represented in the documents. If a user performs frequent open but not save operations on the documents, the user may be somewhat knowledgeable about the subject matter represented in the documents.

In a specific implementation, the analysis step may also consider the amount of time a user spend reading (i.e., open operation) or writing (i.e., save operation) the documents as a factor that helps rank a user's level of expertise in a specific knowledge domain.

In an embodiment, a system of the invention collects activity data regarding policy evaluation and stores the activity data in a central database. The policy enforcement activity data collected is analyzed to perform at least one of reporting policy enforcement activities, evaluating correctness of a policy, identifying inefficient policies, and identifying ineffective policies.

In a specific implementation, the information management system collects activity usage data regarding policy evaluation and stores the activity data in a local database. Application usage activity may also be referred to as information usage activity.

In an embodiment, a system of the invention collects policy enforcement activity data to identify inefficient policies including:

(1) Identify policies that resulted in large percentage of denies during policy evaluation, where such policies may contribute to lowering of workforce productivity.

If users are frequently denied access to information, some policies may have introduced unintended side effects that negatively affect productivity of those users who have legitimate reasons to access such information. By collecting policy enforcement activity data and correlating the data based on policy effect and document or information that the policies were applied on, a data analysis process can discover the problem described in this example.

(2) Identify policies that had never been evaluated, where such policies may increase policy evaluation time but not implement any useful function.

If policy enforcement data is collected on all policies being evaluated, or counter data is collected periodically that indicate how many times each policy is being evaluated within a period of time, or a bit vector is collected periodically indicating which policy is being evaluated within a period of time, a data analysis process can compare the collected data with a set policy identifying which policy is ineffective.

(3) Identify policies that had the worse evaluation time, where such policies may be indicative of poor policy specification.

By collecting time spent on evaluating policies, a data analysis process can identify a policy or a set of policies that causes degradation of policy evaluation performance. Once such policy or set of policies is identified, a policy administrator can optimize or rewrite the policy or set of policies to improve its evaluation performance.

(4) Identify policies that were evaluated on behalf of same policy evaluation request but had produced contradicting results, where a conflict may exist among different policies.

Below is an example illustrating typical information usage activity data available for collection at a workstation (i.e., point-of-use) when a user opens a file stored on a file server. The example assumes that an application program "Microsoft PowerPoint" is used to open a file "product-demo.ppt" on file server "server 123." The example further assumes that a policy enforcer or data collection agent is installed on the workstation along with interceptor installed in Microsoft PowerPoint.

The following information usage activity data (or information usage data or application usage activity data) is collected by the policy enforcer or data collection agent at the workstation.

| Description | Value |
|---|---|
| Event | OPEN |
| Time | 2005-01-01 16:08:30 |
| File name | \\server123\products\docs\product-demo.ppt |
| File owner | Tsmith |
| Application program | Microsoft PowerPoint |
| Application program version | 11.5604.5606 |
| User | Mjones |
| Host | sales0001 |
| IP address | 123.12.122.10 |
| Operating system | Window XP |
| Host type | Laptop |
| Policy effect | DENY |

A policy enforcer or data collection agent may collect additional data including file size, file timestamps, what other applications are running on the workstation, what policies deny the access, and so forth.

In a specific implementation, the amount of data to collect may be controlled by a configuration associated with a policy enforcer or data collection agent. Information usage data may be presented or gathered at different levels of granularity. For example, information usage data may be at the file level for operations such as open, close, save, delete, rename, print, change a file attribute, or others. Information usage data may be at a finer level of granularity where operations within an application program can be tracked or logged. Examples of this finer level of granularity include cut and paste, drag and drop, editing a region in a document, changing a document header, editing a cell in a spreadsheet, editing a formula in a cell, using an instant messenger program to connect to another user, sending an e-mail message, forwarding an e-mail message, attaching a document to an e-mail, or other similar operation. These operations may be logged or tracked.

In a specific implementation, the amount of data to collect may be specified in a policy that is evaluated by a policy enforcer.

Below is another example on information usage activity data that can be collected by a policy enforcer or data collection agent when a user sends an e-mail to a recipient outside a company.

| Description | Value |
|---|---|
| Event | SEND |
| Time | 2005-04-15 08:40:03 |
| Recipients | jones@another-company.com |
| Subject | This is our internal memo |
| Application program | Microsoft Outlook |
| Application program version | 1001 |
| User | Katemorris |
| Host | Desktop113 |
| IP address | 101.1.12.35 |
| Operating system | Window XP |
| Host type | Desktop |
| Policy effect | ALLOW |

The example below illustrates information usage activity data collected when a user changes a formula on an important spreadsheet file.

| Description | Value |
|---|---|
| Event | EDIT-FORMULA |
| Time | 2005-03-10 11:41:37 |
| File | \\server1\reports\sales-forecast.xls |
| Application program | Microsoft Excel |
| Application program version | 11.5612.5606 |
| Cell | R459C26 |
| Old Value | =R23C3*9/R34C11 |
| New Value | 1234 |
| User | Tmartin |
| Host | denver32 |
| IP address | 10.11.121.35 |
| Operating system | Window XP |
| Host type | Desktop |

Below is an example on information usage activity data analysis which is applied to detect information fraud. This example correlates information usage activity data based on user and identifies an abnormal activity patent using time and location data on two activity entries.

| Event | Time | User | File | Application | Host | Host Location |
|---|---|---|---|---|---|---|
| OPEN | 2005-12-02 10:10:00 | Sandy | c:\releasenotes.txt | Notepad | sj001 | San Jose |
| COPY | 2005-12-02 10:12:11 | Dennis | \\serv1\product-plan.doc | Windows Explorer | sj322 | San Jose |
| COPY | 2005-12-02 10:17:09 | Dennis | \\mktserv\product-roadmap.doc | DOS Copy | uk33 | London |
| SAVE | 2005-12-02 11:03:12 | Sandy | c:\releasenotes.txt | Notepad | sj001 | San Jose |

The above table shows a few entries of activity data in a central activity database. To simplify explanation, only a selected subset of data fields in each activity entry is shown in the table.

The data in the table shows that there are two document access operations by the same user happened at close interval but performed at two locations that are far apart. Such activity pattern is indicative of information fraud.

To automatically detect this type of activity pattern an activity analysis process should correlate activity data based on user; then identify activities by the same user that took place at different locations but happened in a close interval. Correlating activity data by user will cause the activity entries by the same user to be clustered. According to the activity data shown in the table, there are two activity entries by the same user "Sandy." Further examining the data shows that both activity entries happened in the same location therefore not a candidate for the type of fraud pattern of interest here. For the next user "Dennis" there are two activity entries. Further examination of the two activity entries uncovers the different locations. The activity analysis process calculates a minimum travel time based on the distance between two locations and uses it as a threshold for detecting anomaly. In this case, the two locations that user "Dennis" had performed document access were San Jose and London. A simple calculation yields a time threshold of less than 6 hours being abnormal. The time difference between occurrences of the two document access events is 4 minute 58 seconds which indicates an anomaly.

Below is an example that uses information usage activity data to optimize resource utilization. In this case, information usage activity data is collected on how much time an application program on the desktop is active. For example, this activity data gives an IT administrator the information required to determine the number of software licenses required in a company and how to allocate resources for training end-users.

tion, an IT administrator can make decision on resource allocation and identify areas if improvement on resource utilization including:

(1) How many software licenses are needed for each application?

(2) Is the usage of an application increasing or decreasing? Less software licenses may be needed for an application where usage has dropped substantially.

(3) Which are the most heavily used applications? User of the most heavily used applications may benefit from more support and training.

(4) And, how much time do users spend on e-mail client? How much time do users spend on instant messenger? Is there a changing trend on application utilization pattern? It may be desirable to realign IT infrastructure to support the changing trend.

Activity data is analyzed or evaluated to detect behavioral patterns and anomalies. When a particular pattern or anomaly is detected, a system may send a notification or perform a particular task. This activity data may be collected in an information management system, which may be policy based. Notification may be by way e-mail, report, pop-up message, or system message. Some tasks to perform upon detection may include implementing a policy in the information management system, disallowing a user from connecting to the system, and restricting a user from being allowed to perform certain actions. To detect a pattern, activity data may be compared to a previously defined or generated activity profile.

An example of a behavioral pattern that may be detected by the system includes a frequency at which a user attempts to access information. A relationship that may be used is when an entity has attempted to access information more than X times in a Y time period. Values for X and Y may be selected by the administrator user. So, for example, if a person or

| Event | Time | User | Application | Version | Active Hour | Host |
| --- | --- | --- | --- | --- | --- | --- |
| ACTIVE | 2005-03-03 12:10:04 | mjones | Mozilla Firefox | 1.0.4 | 0.33 | wkst002 |
| ACTIVE | 2005-03-03 12:40:00 | mjones | Yahoo Messenger | 8.0 | 1.50 | wkst0002 |
| ACTIVE | 2005-03-04 08:04:05 | gmason | Internet Explorer | 6.0.3 | 2.50 | wkst372 |
| ACTIVE | 2005-03-04 08:34:06 | jcook | Microsoft Excel | 10.0 | 5.83 | wkst802 |
| ACTIVE | 2005-03-04 10:19:05 | gmason | Mozilla Firefox | 1.0.4 | 2.74 | wkst033 |
| ACTIVE | 2005-03-05 02:40:00 | pallen | Microsoft Word | 10.0 | 2.46 | wkst087 |

Data in the above table shows the amount of time each application stay active. By grouping based on Application and aggregating the number of ACTIVE events associated each application, an IT administrator can obtain one measurement on application utilization that indicates how often do users start each application over a period of time. If aggregation is applied to Active Hour based on Application, an IT administrator can obtain another measure on how much time users spend on each application over a period of time. If grouping is done on User and Application and aggregation is applied to Active Hour, an IT administrator can quickly identify who are the heavy users of certain applications.

This example illustrates the type of information that can be produced by analyzing information usage activity data. Using this type of information along with other available informadevice attempts to access or accesses a file more than one time every six seconds, this may be potentially flagged as something to investigate further.

There may be a value or threshold value that is used to evaluate whether a situation should be identified as a potential problem. For example, a potential problem may occur if X/Y exceeds Z or if X/Y is less than Z, or any other desired relationship. Furthermore, different threshold values may be used in one circumstance while another threshold value may be used in another. In fact, there may be no threshold for one circumstance and a threshold for another circumstance.

One example of a situation where there may be different threshold is attempting to detect problems during a critical time period, such as close to earnings release for a public company. During the critical time period, there may be one threshold value that may be used to detect potential problems while another threshold value is used during other times periods. Other factors where different thresholds may be used includes time of day, location of the user, location of a file or document, time period, which application problem is used to access, type of device, type of connectivity, and others.

An example of a behavioral pattern that may be detected by the system includes when a user or username has accessed a system from different locations within a short time period. There is a potential another person has compromised another user's sign in information. A formula that may be used is when a username has connected to the system from a first location X at a first time T1 and the username has connected to the system from a second location Y at second time T2, and a distance between X and Y divided by (T2−T1) is greater than Z.

The value of T2−T1 may be arranged (e.g., T1−T2 or T2−T1) so the result is positive or an absolute value (i.e., |T2−T1|) may be used. The term Z is a value that may be selected by an administrator user of the system. And by selecting an appropriate value of Z, potential security breaches of the system may be detected. For example, if a value of Z is selected so the user must travel more than, for example, 600 or 700 miles per hour to log in at two locations, then there may be a potential problem. Any speed may be selected as a value, which may be considered a threshold at which a potential problem is detected. If the setting of the threshold is too low, there may be many false positives while setting the threshold too high will result in not catching security violations.

In an implementation, the invention is a method of managing information of a system including providing a number of information management rules, providing a historical database, gathering historical data from a first target in the historical database, and gathering historical data from a second target in the historical database. The method further includes associating at least a first rule of the information management rules to the first target, evaluating the data stored in the historical database according to a detection algorithm, and based on the detection algorithm, associating a second rule to the first target. For the first target, usage of information will be controlled based on the at least first rule of information management rules and the second rule.

In an implementation, the invention is a method of operating a system including providing a number of devices, providing an activity database, and collecting information usage data from the devices in the activity database. The method includes analyzing the information usage data in the activity database to detect a condition and, when the condition is detected, generating a notification of the condition. Alternatively, the invention may collect and analyze external event data from outside the system.

In an implementation, the invention is a method of an information management system including providing a number of devices, providing an activity database, providing a first activity profile, collecting information usage data from the number of devices and storing in the activity database, and analyzing the information usage data in the activity database to generate a second activity profile. The method further includes comparing the second activity profile with first activity profile to determine a set of differences; using the set of differences, detecting whether a condition has occurred; and when the condition has occurred, generating a notification of the condition.

The condition may occur when (X−Y) is greater than a threshold value Z, where X is a value in the first activity profile and Y is a value in the second activity profile. The condition may occur when (X−Y) is greater than a threshold value Z, where X is a value derived from the first activity profile and Y is a value derived from the second activity profile. In a specific embodiment, the condition will not occur when the difference is zero.

In an embodiment of the invention, an activity profile may be created from data collected in an information management system. For example, activity data may be gathered for a particular department and an average or median is found. Then when a group or a user deviates from the average by more than a threshold amount, the situation will be flagged. As a further example, an "average" profile for user may be created by gathering real-time activity data. An example is that it is determined a user has an average typing speed or uses particular applications. Then when there is a deviation from this average or usual activity, the situation will be flagged.

In another embodiment of the invention, an activity profile may be predefined by an administrative user of the system, such as directed by management of an organization. The management may want to know when users or groups of users exceed of vary significantly from the activity profile they specified. This correlation data may be used to improve workforce productivity or detect fraudulent activity.

In an information management system, activity data is collected and analyzed for patterns. The information management system may be policy based. Activity data may be organized as entries including information on user, application, machine, action, object or document, time, and location. When checking for patterns in the activity or historical data, techniques may include inferencing, frequency checking, location, and distance checking, and relationship checking, and any combination of these. Analyzing the activity data may include comparing like types or categories of information for two or more entries.

For example, entries in an activity data or historical data log may be have information on event, time, user, application, version, active hour, and host like the table above. Then analysis of the activity data would be to compare the same parameter of two different entries or events. Items may be matched in the user category, so analysis may be performed on a single user.

When a particular pattern is detected, a system may perform a task such as provide a notification. Notification may be by way e-mail, report, pop-up message, or system message. Some tasks to perform upon detection may include implementing a policy in the information management system, disallowing a user from connecting to the system, and restricting a user from being allowed to perform certain actions. To detect a pattern, activity data may be compared to a previously defined or generated activity profile.

In an implementation, the invention includes a method of operating an information management system including providing a number of devices connected to a network of the information management system, where a number of users can log into the information management system using the devices; collecting usage information on operations performed by users using the devices; and analyzing the usage information to detect when a user has attempted to access a specific document of the information management system more than X times during a Y time period, where X divided by Y is a value Z.

In an implementation, the invention includes a method of operating an information management system including providing a number of devices connected to a network of the information management system, where a number of users can log into the information management system using the devices; collecting usage information on operations performed by users using the devices; and analyzing the usage information to detect when a user has attempted to access a specific document of the information management system less than X times during a Y time period, where X divided by Y is a value Z.

In an implementation, the invention includes a method of operating an information management system including providing a number of devices connected to a network of the information management system; collecting usage information including application program operations which occur at the devices; and analyzing the usage information to detect when an application program operation is performed more than X times during a Y time period, where X divided by Y is a value Z.

Inferencing or an inference engine may be used to determine if there is a relationship violation even though a policy has not necessary violated. For example, a policy may state a user A is not allowed to send e-mail to a user B. However, user A may send an e-mail to user C, who forwards the e-mail to user B. There is not strict violation of a policy. However, with a correlation engine of the invention, inferencing may be used to detect such potential relationship violation. The inference engine will examine the policies of the system and then go through the activity data, and then flag or identify potential violations. The inferencing engine will be able to detect potential satisfaction of conditions presented in a policy, even if an event has occurred which is not a direct satisfaction of the condition.

In an implementation, the invention includes a method of operating an information management system including providing a number of policies to manage information of the information management system, where a first policy includes a condition between a first entity and a second entity; and providing activity data associated with the first and second entities. The method further includes inspecting at least the first policy to extract the condition between the first and second entities; analyzing the activity data to derive a relationship between the first and second entities; and detecting a potential satisfaction of the condition because of the relationship.

In an implementation, the invention includes a method of operating an information management system including providing a first policy including a condition between a first entity and a second entity; providing activity data associated with the first and second entities; and inspecting at least the first policy to extract the condition between the first and second entities. The method further includes analyzing the activity data to derive a relationship between the first and second entities and detecting a potential satisfaction of the condition because of the relationship.

In an implementation, the invention includes a method of operating an information management system including providing a number of policies to manage information of the information management system, where a first policy includes a condition between a first action and a second action; providing activity data associated with the first and second actions; and inspecting at least the first policy to extract the condition between the first and second actions. The method further includes analyzing the activity data to derive a relationship between the first and second actions and detecting a potential satisfaction of the condition because of the relationship.

In an implementation, the invention includes a method of operating an information management system including providing a number of devices connected to a network of the information management system, where a number of users can log into the information management system using the devices; providing a number of policies to manage information of the system; collecting usage information including denials of access to information by users using the devices; and analyzing the usage information to detect when a user has been denied access to information by a policy more than X times during a Y time period, where X divided by Y is a value Z.

In an implementation, the invention includes a method of operating an information management system including providing a number of devices connected to a network of the information management system, where a number of users can log into the information management system using the devices; providing a number of policies to manage information of the system; and collecting usage information including denials of access to information by users using the devices. The method further includes analyzing the usage information to detect when a user has been denied access to information by a first policy and the user has been denied access to information by a second policy, where the first and second policies are different.

In an implementation, the invention includes a method of operating an information management system including providing a number of devices connected to a network of the information management system, where a number of users can log into the information management system using the devices; providing a number of policies to manage information of the system; and collecting usage information including outcomes of applying policies to access of information by users using the devices. The method further includes analyzing the usage information to detect when a user has a first outcome of a first policy when accessing information and the user has a second outcome of a second policy when accessing information, where the first and second policies are different.

In an implementation, the invention includes a method of operating an information management system including providing a number of devices connected to a network of the information management system, where a number of users can log into the information management system using the devices. The method includes collecting usage information on operations performed by users using the devices, where the usage information includes a first entry having a first parameter and a second parameter, and a second entry having a first parameter and a second parameter. The method includes analyzing the usage information to detect a condition based on an inspection of at least one of the first parameter of the first entry to the first parameter of the second entry, or the second parameter of the first entry to the second parameter of the second entry.

In an implementation, the invention includes a method of operating an information management system including providing a number of devices connected to a network of the information management system, where a number of users can log into the information management system using the devices. The method includes collecting usage information on operations performed by users using the devices, where the usage information includes a number of entries, each having a first parameter and a second parameter. The method includes analyzing the usage information to detect entries matching at least one condition based on an inspection of at least one of the first parameter or the second parameter of each entry.

This description of the invention has been presented for the purposes of illustration and description. IT is not intended to be exhaustive or to limit the invention to the precise form described, and many modifications and variations are possible in light of the teaching above. The embodiments were chosen and described in order to best explain the principles to the invention and its practical applications. This description will enable other skilled in the art to best utilize and practice the invention in various embodiments and with various modifications as are suited to a particular use. The scope of the invention is defined by the following claims.

The invention claimed is:

1. A method of managing information of a system comprising:
providing a plurality of information management rules;
providing an activity database wherein the activity database comprises activity data including a plurality of results and each result comprises an allow or a deny to information of the system based on the plurality of information management rules;
gathering first activity data from a first target in the activity database;
gathering second activity data from a second target in the activity database;
associating at least a first rule of the information management rules to the first target;
evaluating the activity data stored in the activity database in view of the gathered first and second activity data and according to a detection algorithm, executing separately from the first and second targets, wherein the detection algorithm detects:
a first condition comprising the first target has attempted to access a unit of information more than X1 times in a Y1 time period;
a second condition comprising the first target has attempted to access more than X2 units of information in a Y2 time period; and
a third condition comprising the first target has an aggregated usage time in a program above a time value X3 in a Y3 time period;
based on the detection algorithm, determining at least one of the first, second, or third conditions occurring, associating an additional second rule to the first target; and
for the first target, controlling usage of information based on the at least first rule of information management rules and the additional second rule further comprising:
for a first activity at the first target, evaluating whether the at least first rule of information management rules applies based on the first activity; and
for the first activity at the first target, evaluating whether the additional second rule applies based on the first activity, wherein the additional second rule comprises a first abstraction, the first abstraction is defined in a first definition statement stored separately from the additional second rule and the first abstraction, and the evaluating whether the additional second rule applies comprises:
retrieving the first definition statement;
when evaluating the second rule, replacing the first abstraction of the additional second rule by the first definition statement; and
evaluating the additional second rule with the replaced first definition statement.

2. The method of claim 1, wherein the activity database is stored on the first target.

3. The method of claim 1, wherein the activity database is stored on a server where the plurality of information management rules is stored.

4. The method of claim 1, wherein the activity database is stored on an intelligence server and the plurality of information management rules are stored on a policy server, where the policy and intelligence servers are separate.

5. The method of claim 1, further comprising:
based on the detection algorithm, adding the additional second rule to the plurality of information management rules.

6. The method of claim 1, further comprising:
based on the detection algorithm, activating the additional second rule of the plurality of information management rules.

7. The method of claim 1, wherein the associating the additional second rule to the first target further comprises altering a third rule of the plurality of information management rules and associating the third rule to the first target.

8. The method of claim 1, wherein the associating the additional second rule to the first target further comprises altering a value of a variable incorporated in an expression of a third rule of the plurality of information management rules; and associating the third rule to the first target.

9. The method of claim 1, wherein the detection algorithm comprises executing an online analytical processing (OLAP) task of the first target.

10. The method of claim 1, wherein the detection algorithm detects the first target has attempted to access information more than X4 times in a Y4 rolling time period.

11. The method of claim 10, wherein values of X1 and Y1 are user-selectable.

12. The method of claim 11, wherein value of X1 is an integer.

13. The method of claim 1, wherein the detection algorithm detects the first target has attempted to transfer a document classified as confidential to the second target.

14. The method of claim 1, wherein the detection algorithm detects the first target has attempted to transfer a document classified as confidential to a removable medium.

15. The method of claim 14, wherein the removable medium includes at least one of CD-ROM, CD-RW, DVD-ROM, DVD-RW, USB device, and floppy disk.

16. The method of claim 1, wherein the detection algorithm detects the first target has attempted to transfer a document classified as confidential to a recipient outside the information management system.

17. The method of claim 1, further comprising:
logging in the activity database a denial of access at the first target for an unsuccessful attempt to access information of the system by the first target.

18. The method of claim 1, further comprising:
generating a report based on the detection algorithm.

19. The method of claim 1, wherein the detection algorithm comprises at least one rule.

20. The method of claim 1, wherein the evaluating the activity data stored in the activity database according to the detection algorithm detects at least one of information fraud, information misuse, operational inefficiency, potential improvement in workforce productivity, potential improvement in resource utilization, abnormal or suspicious activity pattern, or policy effectiveness.

21. The method of claim 1, wherein the retrieving the first definition statement comprises the first definition statement stored on a separate device than the first target.

22. The method of claim 1, wherein the second rule comprises a first conditional statement and the first definition statement comprises a second conditional statement.

23. The method of claim 1, wherein the retrieving the first definition statement occurs before the first activity at the first target.

24. The method of claim 1, wherein the first abstraction evaluates to a constant and, when evaluating the additional second rule, the first abstraction is replaced by the constant.

25. The method of claim 24, wherein the constant is a Boolean true.

26. The method of claim 1, wherein the first abstraction evaluates to a constant and, when evaluating the additional second rule, the first abstraction is not evaluated from the additional second rule.

27. The method of claim 1, wherein evaluating whether the second rule applies further comprises determining a first result for a first conditional statement and a second result for a second conditional statement of the second rule.

28. A method of managing information of a system comprising:
providing a plurality of information management rules;
providing an activity database, wherein the activity database is stored on a server and comprises activity data including a plurality of results and each result comprises an allow or a deny to information of the system based on the plurality of information management rules;
upon a first operation requested by a first user at a first device of a plurality of devices, evaluating at the first device a first rule of a first set of rules stored at the first device;
upon a second operation requested by a second user at a second device of the plurality of devices, evaluating at the second device a second rule of a second set of rules stored at the second device;
collecting information usage data from first and second devices for the activity database, wherein the information usage data comprises data associated with the first operation requested by the first user at the first device that caused evaluating at the first device the first rule of the first set of rules stored at the first device and data associated with the second operation requested by the second user at the second device that caused evaluating at the second device the second rule of the second set of rules stored at the second device;
analyzing the activity data stored in the activity database in view of the collected information usage data and according to a detection algorithm, wherein the detection algorithm detects:
a first condition comprising the first target has attempted to access a unit of information more than X1 times in a Y1 time period;
a second condition comprising the first target has attempted to access more than X2 units of information in a Y2 time period; and
a third condition comprising the first target has an aggregated usage time in a program above a time value X3 in a Y3 time period;
based on the detection algorithm determining at least one of the first, second, or third conditions occurring at the first device, selecting a second rule based on the at least one of the first, second, or third conditions occurring; and
in response to the second rule being selected, preventing the first rule of the first set of rules stored at the first device from being evaluated, wherein evaluating the first rule comprises:
retrieving a first definition statement, corresponding to a first abstraction referred to in the first rule, wherein the definition statement is stored separately from the first rule; and
when evaluating the first rule, replacing the first abstraction with the definition statement.

29. The method of claim 28, wherein the preventing the first rule of the first set of rules stored at the first device from being evaluated comprises altering the first rule.

30. The method of claim 28, wherein the preventing the first rule of the first set of rules stored at the first device from being evaluated comprises replacing the first rule with a third rule, where the third rule is different from the first rule.

31. The method of claim 28, wherein the preventing the first rule of the first set of rules stored at the first device from being evaluated comprises supplementing the first rule with a third rule, where the third rule is different from the first rule.

32. The method of claim 28, wherein the preventing the first rule of the first set of rules stored at the first device from being evaluated comprises removing at least a portion of the first rule to obtain a third rule, where the third rule is different from the first rule.

33. The method of claim 28, wherein the preventing the first rule of the first set of rules stored at the first device from being evaluated comprises adding code to the first rule to obtain a third rule, where the third rule is different from the first rule.

34. The method of claim 28, further comprising:
determining the second rule of the plurality of information management rules is in a first syntax format not supported by the first device;
converting the second rule into a second syntax format to produce a translated second rule, wherein the first device supports the second syntax format but not the first syntax format; and
transferring the translated second rule to the first device, without transferring the second rule.

35. A method of managing information of a system comprising:
providing a plurality of information management rules;
providing an activity database wherein the activity database comprises activity data including a plurality of results and each result comprises an allow or a deny to documents stored on devices managed by the system based on the plurality of information management rules;
gathering first activity data from a first target in the activity database, wherein the activity database executes at a computer separate from the first target;
gathering second activity data from a second target in the activity database, wherein the activity database executes at a computer separate from the second target;
associating at least a first rule of the information management rules to the first target but not the second target;
evaluating the activity data stored in the activity database in view of the gathered first and second activity data and according to a detection algorithm, executing separately from the first and second targets, determining based on the detection algorithm to associate another rule to the first target but not the second target;
retrieving a second rule to associate to the first target based on the detection algorithm; and
for the first target, controlling usage of information based on the second rule further comprising:
for a first activity at the first target, evaluating whether the at least the first rule of information management rules applies based on the first activity;
for the first activity, determining a mapped function from a first application program executing on the first target, wherein the mapped function corresponds to an operating system library function; and
for the first activity at the first target, evaluating whether the second rule applies based on the first activity, wherein the second rule comprises a first abstraction, the first abstraction is defined in a first definition statement stored separately from the second rule and the first abstraction, and the evaluating whether the second rule applies comprises:

retrieving the first definition statement;

when evaluating the second rule, replacing the first abstraction of the second rule by the first definition statement;

evaluating the second rule with the replaced first definition statement;

when the second rule is to allow the first activity, allow the mapped function to execute; and when the second rule is to disallow the first activity, disallow the mapped function to execute.

36. The method of claim 35, wherein the evaluating whether the at least the first rule of information management rules applies based on the first activity occurs after the determining the mapped function.

37. The method of claim 35, wherein the operating system library function corresponds to a file access operation.

38. The method of claim 35, wherein the detection algorithm detects:

a first condition comprising the first target has attempted to access a unit of information more than X1 times in a Y1 time period;

a second condition comprising the first target has attempted to access more than X2 units of information in a Y2 time period; and a third condition comprising the first target has an aggregated usage time in a program above a time value X3 in a Y3 time period.

* * * * *